(12) United States Patent
Arunachalam

(10) Patent No.: US 7,930,340 B2
(45) Date of Patent: Apr. 19, 2011

(54) NETWORK TRANSACTION PORTAL TO CONTROL MULTI-SERVICE PROVIDER TRANSACTIONS

(76) Inventor: Lakshmi Arunachalam, Menlo Park, CA (US)

( * ) Notice: Subject to any disclaimer, the term of this patent is extended or adjusted under 35 U.S.C. 154(b) by 577 days.

(21) Appl. No.: 09/863,704

(22) Filed: May 23, 2001

(65) Prior Publication Data

US 2003/0069922 A1     Apr. 10, 2003

Related U.S. Application Data

(60) Continuation-in-part of application No. 09/792,323, filed on Feb. 23, 2001, now Pat. No. 7,340,506, which is a continuation-in-part of application No. 08/879,958, filed on Jun. 20, 1997, now Pat. No. 5,987,500, which is a division of application No. 08/700,726, filed on Aug. 5, 1996, now Pat. No. 5,778,178.

(60) Provisional application No. 60/006,634, filed on Nov. 13, 1995.

(51) Int. Cl.
*G06F 15/16* (2006.01)

(52) U.S. Cl. ........ 709/203; 709/202; 709/206; 709/217; 709/219

(58) Field of Classification Search .................. 709/200, 709/201, 202, 203, 204, 205, 217, 218, 219; 705/8
See application file for complete search history.

(56) References Cited

U.S. PATENT DOCUMENTS

| | | |
|---|---|---|
| 4,829,372 A | 5/1989 | McCalley et al. |
| 4,851,988 A | 7/1989 | Trottier et al. |
| 4,984,155 A | 1/1991 | Geier et al. |
| 5,125,091 A | 6/1992 | Staas, Jr. et al. |
| 5,148,474 A | 9/1992 | Haralambopoulos et al. .............................. 379/111 |
| 5,159,632 A | 10/1992 | Crandall |
| 5,231,566 A | 7/1993 | Blutinger et al. |
| 5,239,662 A * | 8/1993 | Danielson et al. ............ 709/246 |
| 5,285,383 A | 2/1994 | Lindsey et al. |
| 5,297,249 A | 3/1994 | Bernstein et al. |
| 5,329,589 A | 7/1994 | Fraser et al. |
| 5,329,619 A * | 7/1994 | Page et al. ..................... 709/203 |
| 5,347,632 A | 9/1994 | Filepp et al. |
| 5,367,635 A | 11/1994 | Bauer et al. |
| 5,383,113 A | 1/1995 | Kight et al. |

(Continued)

FOREIGN PATENT DOCUMENTS

WO     97/18515 A1     5/1997

(Continued)

OTHER PUBLICATIONS

Banks, Michael A., "America Online: A Graphics-based Success" Link-Up, Jan./Feb. 1992.

(Continued)

*Primary Examiner* — Hassan Phillips
(74) *Attorney, Agent, or Firm* — Lakshmi Arunachalam

(57) ABSTRACT

The present invention provides a system and method for providing controlled service transactions involving multiple service providers on a service network. A client access device links to the service network via a network entry point and performs the multi-service provider transaction under the control of a network transactional application at a hub that holds the transaction captive and includes a router to route to remote distributed software objects at nodes of the service providers. The software objects include methods that may be remotely executed under the control of the transactional application at the hub.

40 Claims, 33 Drawing Sheets

U.S. PATENT DOCUMENTS

| | | | |
|---|---|---|---|
| 5,404,523 A | 4/1995 | DellaFera et al. | |
| 5,408,619 A | 4/1995 | Oran | |
| 5,414,812 A | 5/1995 | Filip et al. | |
| 5,428,792 A | 6/1995 | Conner et al. | |
| 5,432,937 A | 7/1995 | Tevanian et al. | |
| 5,434,974 A | 7/1995 | Loucks et al. | |
| 5,440,744 A | 8/1995 | Jacobson et al. | |
| 5,442,771 A | 8/1995 | Filepp et al. | |
| 5,442,791 A | 8/1995 | Wrabetz et al. | |
| 5,444,192 A | 8/1995 | Shetye et al. | |
| 5,446,896 A | 8/1995 | Hegarty et al. | |
| 5,452,433 A | 9/1995 | Nihart et al. | |
| 5,455,903 A | 10/1995 | Jolissaint et al. | |
| 5,475,819 A | 12/1995 | Miller et al. | |
| 5,491,800 A | 2/1996 | Goldsmith et al. | |
| 5,517,645 A | 5/1996 | Stutz et al. | |
| 5,519,868 A | 5/1996 | Allen et al. | |
| 5,537,464 A | 7/1996 | Lewis et al. | 379/114 |
| 5,539,909 A | 7/1996 | Tanaka et al. | |
| 5,557,780 A | 9/1996 | Edwards et al. | 395/500.48 |
| 5,560,005 A | 9/1996 | Hoover et al. | |
| 5,577,251 A | 11/1996 | Hamilton et al. | |
| 5,592,378 A | 1/1997 | Cameron et al. | |
| 5,604,905 A | 2/1997 | Tevanian et al. | |
| 5,613,148 A | 3/1997 | Bezviner et al. | |
| 5,664,111 A | 9/1997 | Nahan et al. | |
| 5,671,279 A | 9/1997 | Elgamal | |
| 5,677,708 A * | 10/1997 | Matthews et al. | 345/684 |
| 5,694,549 A | 12/1997 | Carlin et al. | |
| 5,703,344 A | 12/1997 | Bezy et al. | |
| 5,706,442 A | 1/1998 | Anderson et al. | |
| 5,708,780 A | 1/1998 | Levergood et al. | |
| 5,710,887 A * | 1/1998 | Chelliah et al. | 705/26 |
| 5,712,913 A | 1/1998 | Chaum | |
| 5,715,314 A | 2/1998 | Payne et al. | 380/24 |
| 5,715,444 A | 2/1998 | Danish et al. | |
| 5,724,424 A | 3/1998 | Gifford | 380/24 |
| 5,742,762 A | 4/1998 | Scholl et al. | |
| 5,742,768 A | 4/1998 | Gennaro et al. | |
| 5,745,681 A | 4/1998 | Levine et al. | |
| 5,754,939 A | 5/1998 | Herz et al. | |
| 5,757,917 A | 5/1998 | Rose et al. | |
| 5,758,072 A | 5/1998 | Filepp et al. | |
| 5,758,327 A | 5/1998 | Gardner et al. | |
| 5,771,354 A | 6/1998 | Crawford | |
| 5,778,178 A | 7/1998 | Arunachalam | |
| 5,780,780 A | 7/1998 | Ahmed | |
| 5,781,631 A | 7/1998 | Chaum | |
| 5,793,964 A | 8/1998 | Rogers et al. | |
| 5,794,234 A | 8/1998 | Church et al. | 707/4 |
| 5,809,483 A | 9/1998 | Broka et al. | |
| 5,812,779 A | 9/1998 | Ciscon et al. | |
| 5,822,569 A | 10/1998 | McPartlan et al. | |
| 5,826,085 A | 10/1998 | Bennett et al. | |
| 5,826,241 A | 10/1998 | Stein et al. | |
| 5,828,666 A | 10/1998 | Focsaneanu et al. | 370/389 |
| 5,835,726 A | 11/1998 | Shwed | |
| 5,845,061 A * | 12/1998 | Miyamoto et al. | 709/203 |
| 5,845,073 A | 12/1998 | Carlin et al. | |
| 5,845,265 A | 12/1998 | Woolston | |
| 5,856,974 A | 1/1999 | Gervais et al. | |
| 5,859,978 A | 1/1999 | Sonderegger et al. | |
| 5,864,866 A | 1/1999 | Henckel et al. | 707/103 |
| 5,870,473 A | 2/1999 | Boesch et al. | 580/21 |
| 5,870,724 A * | 2/1999 | Lawlor et al. | 705/42 |
| 5,873,072 A | 2/1999 | Kight et al. | |
| 5,873,093 A | 2/1999 | Williamson et al. | |
| 5,878,043 A | 3/1999 | Casey | |
| 5,878,140 A | 3/1999 | Chaum | |
| 5,878,141 A | 3/1999 | Daly et al. | |
| 5,878,403 A | 3/1999 | DeFrancesco et al. | 705/38 |
| 5,884,301 A | 3/1999 | Takano | |
| 5,889,957 A | 3/1999 | Ratner et al. | |
| 5,890,137 A | 3/1999 | Koreeda | |
| 5,890,161 A | 3/1999 | Helland et al. | |
| 5,892,821 A | 4/1999 | Turner | 379/220 |
| 5,893,076 A | 4/1999 | Hafner et al. | 705/28 |
| 5,895,454 A | 4/1999 | Harrington | |
| 5,897,621 A | 4/1999 | Boesch et al. | |
| 5,901,228 A | 5/1999 | Crawford | |
| 5,909,492 A | 6/1999 | Payne et al. | 380/24 |
| 5,910,987 A | 6/1999 | Ginter | |
| 5,913,061 A | 6/1999 | Gupta et al. | 395/680 |
| 5,931,967 A | 8/1999 | Shimizu et al. | |
| 5,946,509 A | 8/1999 | Morton | |
| 5,956,400 A | 9/1999 | Chaum et al. | |
| 5,956,509 A * | 9/1999 | Kevner | 709/219 |
| 5,958,004 A | 9/1999 | Helland et al. | |
| 5,960,411 A | 9/1999 | Hartman et al. | |
| 5,987,500 A | 11/1999 | Arunachalam | |
| 6,003,085 A | 12/1999 | Ratner et al. | |
| 6,014,651 A | 1/2000 | Crawford | |
| 6,014,666 A | 1/2000 | Helland et al. | |
| 6,049,785 A | 4/2000 | Gifford | 705/39 |
| 6,049,819 A | 4/2000 | Buckle et al. | 709/202 |
| 6,055,514 A * | 4/2000 | Wren | 705/27 |
| 6,055,567 A | 4/2000 | Ganesan et al. | |
| 6,073,237 A | 6/2000 | Ellison et al. | |
| 6,092,053 A | 7/2000 | Boesch et al. | 705/26 |
| 6,094,673 A | 7/2000 | Dilip et al. | |
| 6,101,482 A | 8/2000 | DiAgelo et al. | |
| 6,101,527 A | 8/2000 | Lejeune et al. | |
| 6,119,152 A | 9/2000 | Carlin et al. | |
| 6,125,185 A | 9/2000 | Boesch | |
| 6,125,352 A | 9/2000 | Franklin et al. | |
| 6,128,315 A | 10/2000 | Takeuchi | 370/466 |
| 6,134,594 A | 10/2000 | Helland et al. | |
| 6,135,646 A | 10/2000 | Kahn et al. | |
| 6,145,090 A * | 11/2000 | Yamaguchi et al. | 714/4 |
| 6,185,609 B1 | 2/2001 | Rangarajan et al. | 709/219 |
| 6,192,250 B1 | 2/2001 | Buskens et al. | 455/463 |
| 6,205,433 B1 | 3/2001 | Boesch et al. | |
| 6,212,556 B1 | 4/2001 | Arunachalam | |
| 6,212,634 B1 | 4/2001 | Gerr, Jr. et al. | 713/156 |
| 6,249,291 B1 | 6/2001 | Popp et al. | |
| 6,279,001 B1 | 8/2001 | DeBettencourt et al. | |
| 6,289,322 B1 | 9/2001 | Kitchen et al. | |
| 6,295,522 B1 | 9/2001 | Boesch | |
| 6,301,601 B1 | 10/2001 | Helland et al. | |
| 6,327,577 B1 | 12/2001 | Garrison et al. | |
| 6,327,579 B1 | 12/2001 | Crawford | |
| 6,334,116 B1 | 12/2001 | Ganesan et al. | |
| 6,360,262 B1 | 3/2002 | Guenthner et al. | |
| 6,363,362 B1 | 3/2002 | Burfield et al. | |
| 6,411,943 B1 | 6/2002 | Crawford | |
| 6,453,426 B1 | 9/2002 | Gamache et al. | |
| 6,457,066 B1 | 9/2002 | Mein et al. | |
| 6,473,740 B2 | 10/2002 | Cockrill et al. | |
| 6,473,791 B1 | 10/2002 | Al-Ghosein et al. | |
| 6,490,567 B1 | 12/2002 | Gregory | |
| 6,553,427 B1 | 4/2003 | Chang et al. | |
| 6,574,607 B1 | 6/2003 | Carter et al. | |
| 6,625,581 B1 | 9/2003 | Perkowski | |
| 6,678,664 B1 | 1/2004 | Ganesan | |
| 6,678,696 B1 | 1/2004 | Helland et al. | |
| 6,714,962 B1 | 3/2004 | Helland et al. | |
| 6,839,677 B2 * | 1/2005 | Mathur et al. | 705/1 |
| 6,850,996 B2 | 2/2005 | Wagner | |
| 6,856,974 B1 | 2/2005 | Ganesan et al. | |
| 6,932,268 B1 | 8/2005 | McCoy et al. | |
| 6,948,063 B1 | 9/2005 | Ganesan et al. | |
| 7,076,784 B1 | 7/2006 | Russell et al. | |
| 7,080,051 B1 | 7/2006 | Crawford | |
| 7,107,244 B2 | 9/2006 | Kight et al. | |
| 7,120,602 B2 | 10/2006 | Kitchen et al. | |
| 7,146,338 B2 | 12/2006 | Kight et al. | |
| 7,175,074 B2 | 2/2007 | Mejias et al. | |
| 7,177,846 B2 | 2/2007 | Moenickheim et al. | |
| 7,213,003 B1 | 5/2007 | Kight et al. | |
| 7,240,031 B1 | 7/2007 | Kight et al. | |
| 7,251,656 B2 | 7/2007 | Keown et al. | |
| 7,296,004 B1 | 11/2007 | Garrison et al. | |
| 7,302,408 B2 | 11/2007 | Engdahl et al. | |
| 7,302,411 B2 | 11/2007 | Ganesan et al. | |
| 7,330,831 B2 | 2/2008 | Biondi et al. | |
| 7,334,128 B2 | 2/2008 | Ganesan et al. | |
| 7,340,506 B2 | 3/2008 | Arunachalam | |

| | | | |
|---|---|---|---|
| 7,366,696 | B1 | 4/2008 | Ganesan et al. |
| 7,366,697 | B2 | 4/2008 | Kitchen et al. |
| 7,383,226 | B2 | 6/2008 | Kight et al. |
| 7,389,514 | B2 | 6/2008 | Russell et al. |
| 7,392,223 | B1 | 6/2008 | Ganesan et al. |
| 7,395,243 | B1 | 7/2008 | Zielke et al. |
| 7,395,319 | B2 | 7/2008 | Harris et al. |
| 2002/0152200 | A1* | 10/2002 | Krichilsky et al. ............... 707/3 |
| 2003/0069922 | A1 | 4/2003 | Arunachalam |
| 2008/0091801 | A1 | 4/2008 | Arunachalam |

FOREIGN PATENT DOCUMENTS

WO 00/63781 A1 10/2000

OTHER PUBLICATIONS

Hickey, "Shopping at Home: One Modem Line, No Waiting," Home PC, Dec. 1, 1994, p. 307, Dialog, File 647, Acc# 01038162.
Lang, "Cashing In: The Rush is on to Buy and Sell on the Internet But Conflicting Schemes Leave Marketers on Sidelines for Now," Advertising Age, Dec. 19, 1994, p/ 11, Dialog, File 16, Acc# 05419137.
Lichty, Tom, "America Online Tour Guide," MacIntosh Edition, Version 2, Preface, Chapter 1, Ventana Press, 1992.
Lichty, Tom, "America Online Tour Guide," MacIntosh Edition, Version 2, Preface, Chapter 3, Ventana Press, 1992.
Lichty, Tom, "America Online Tour Guide," MacIntosh Edition, Version 2, Preface, Chapter 8, Ventana Press, 1992.
Lichty, Tom, "America Online Tour Guide," MacIntosh Edition, Version 2, Preface, Chapter 10, • Ventana Press, 1992.
"Tymnet," Wikipedia, the free encyclopedia, http://en.wikipedia.org/wiki/tymnet, Oct. 2006.
"Tymnet", Wikipedia, the free encyclopedia, http://en.wikipedia.org/wiki/tymnet, May 2007.
Cox, Benjamin et al., "NetBill Security and Transaction Protocol", Carnegie Millon University, Pittsburgh, PA 15212-3890.
Lamond, Keith, "Credit Card Transactions Real World and Online", http://www.virtualschool.edu/mon/ElectronProperty/klamond/credit_.card.htm, pp. 1-16, 1996.
"HotJava", Wikipedia, the free encylcopedia, http://en.wikipedia.org/wiki/HotJava. May 2007.
Microsoft Corporation's Notice of Motion and Motion for Leave to Amend (Complaint) US District Court—Northern Disctrict of California.
Order Granting Defendant'Motion to Dismiss—Northern District of California Feb. 17. 2009.
Complaint for Declaratory Judgment of Patent Non/Infringement, Invalidity, and Unenforceability; (Dated Jul. 2, 2009) Microsoft Docket #001 (219 pages).
'Defendant Webxchange Inc.'S Motion to Dismiss Microsoft's Complaint With Prejudice for Lack of Subject-Matter Jurisdiction, and for Attorneys' Fees (entered Aug. 26, 2009) Microsoft Docket #009.
'Microsoft's Opposition to WebXchange, Inc.'s Motion to Dismiss Microsoft's Complaint (dated Sep. 14, 2009) Microsoft Docket #012.
Order Dismissing Microsoft (Oct. 30, 2009) Judge Alsup Microsoft Docket #017.
Memorandum Opinion Microsoft (Oct. 30, 2009) Judge Farnan Microsoft Docket #018.
Complaint filed with Jury Demand against Allstate Corporation, Allstate Insurance Company, Allstate Life Insurance Company, Allstate Financial Services LLC, Allstate Financial LLC- . ( Filing fee $ 350, receipt No. 03110000000000419775.)—filed by WebXchange Inc.. (Attachments: # 1 Exhibit A, # 2 Exhibit B, # 3 Exhibit C, # 4 Civil Cover Sheet)(lid) (Entered: Mar. 5, 2008), Allstate Docket #1.
Answer to 1 Complaint, with Jury Demand, Counterclaim against WebXchange Inc. by Allstate Corporation, Allstate Insurance Company, Allstate Life Insurance Company, Allstate Financial Services LLC, Allstate Financial LLC. (McGeever, Elizabeth) (Entered: Apr. 25, 2008), Allstate Docket #15.
Answer to 15 Answer to Complaint, Counterclaim Plaintiff WebXchange Inc.'s Answer to Defendant Allstate's Counterclaims by WebXchange Inc..(Heaney, Julia) (Entered: May 19, 2008), Allstate Docket #26.

Claim Construction Opening Brief [Defendants' Opening Brief in Support of Their Proposed Claim Constructions] filed by Allstate Insurance Company, Allstate Life Insurance Company, Allstate Financial Services LLC. (Moore, David) (Entered: Oct. 29, 2008), Allstate Docket #61.
Claim Construction Opening Brief filed by WebXchange Inc.. (Attachments: # 1 Exhibits A-B)(Heaney, Julia) (Entered: Oct. 29, 2008), Allstate Docket #62.
First Amended Answer, Affirmative Defenses, and Counterclaims to 1 Complaint by Allstate Corporation, Allstate Insurance Company, Allstate Life Insurance Company, Allstate Financial Services LLC, Allstate Financial LLC. (nms) (nms). (Entered: Jan. 14, 2009), (Three Parts) Allstate Docket #90.
Answer to 90 Amended Answer to Complaint, Counterclaim by WebXchange Inc..(Heaney, Julia) (Entered: Feb. 2, 2009), Allstate Docket #96.
Motion to Bifurcate and for Early Trial on the Issue of Inequitable Conduct—filed by FedEx Corporation, FedEx Kinko's Office & Print Services, Inc., FedEx Corporate Services Inc.. (Gaza, Anne) Modified on Mar. 23, 2009 (nms). (Entered: Mar. 19, 2009), Allstate Docket #107.
Notice of Motion re 107 Motion to Bifurcate and for Early Trial on the Issue of Inequitable Conduct; Requesting the following Motion Day: Apr. 17, 2009 (Gaza, Anne) Modified on Mar. 23, 2009 (nms). (Entered: Mar. 19, 2009), Allstate Docket #108.
7.1.1 Statement re 107 Motion to Bifurcate and for Early Trial on the Issue of Inequitable Conduct by FedEx Corporation, FedEx Kinko's Office & Print Services, Inc., FedEx Corporate Services Inc.. (Gaza, Anne) Modified on Mar. 23, 2009 (nms). (Entered: Mar. 19, 2009), Allstate Docket #109.
Redacted Version of 110 Opening Brief in Support by,, FedEx Corporation, FedEx Kinko's Office & Print Services, Inc., FedEx Corporate Services Inc.. (Attachments: # 1 Exhibit 1, # 2 Exhibit 2, # 3 Exhibit 3, # 4 Exhibit 4, # 5 Exhibit 5, # 6 Exhibit 6, # 7 Exhibit 7, # 8 Exhibit 8, # 9 Exhibit 9, # 10 Exhibit 10, # 11 Exhibit 11, # 12 Exhibit 12, # 13 Exhibit 13)(Gaza, Anne) (Entered: Mar. 23, 2009), (Four Parts) Allstate Docket #111.
Claim Construction Opening Brief Defendants' Opening Brief in Support of Their Proposed Claim Constructions filed by Allstate Insurance Company, Allstate Life Insurance Company, Allstate Financial Services LLC. (McGeever, Elizabeth) (Entered: Mar. 23, 2009), Allstate Docket #112.
Claim Construction Opening Brief filed by WebXchange Inc.. (Attachments: # 1 Exhibits A-B)(Heaney, Julia) (Additional attachment(s) added on Mar. 25, 2009: # 2 Main Document) (nms). (Entered: Mar. 23, 2009), (Two Parts) Allstate Docket #114.
Plaintiff WebXchange Inc.'s Corrected Answering Brief in Opposition to Defendants' Motion to Bifurcate, and for Early Trial on, the Issue of Ineouitable Conduct /// Certificate of Service I, the undersigned, hereby certify that on May 13, 2009, I electronically filed the foregoing with the Clerk of the Court using CM/ECF, which will send notification of such filing(s) to the following: /// Certificate of Service I, the undersigned, hereby certify that on May 13, 2009, I electronically filed the foregoing.
"Declaration of Eric 3. Stieglitz in Support Ofplaintiff WebXchange Inc.'s Answering Brief in Oppositionto Defendants' Motion to Bifurcate, and for Early Trial on,the Issue of Inequitable Conduct // Redacted—Public Version / signed Apr. 27, 2009Certificate of ServiceI, the undersigned, hereby certify that on May 13, 2009, I electronically filed the foregoing with the Clerk of the Court using CM/ECF, which will send notification of such filing(s) to the following: (Two Parts)", Allstate Docket #132.
Case 1:08-cv-00131-JJF Document 142 Filed Jun. 1, 2009 p. 1 of 19 // Reply Brief in Support of Defendants' Motion to Bifurcate, and 11011 Early Trial on, the Issue of Inequitable Conduct /// Redacted Public Version /// Certificate of Service I hereby certify that on Jun. 1, 2009, I caused to be served by electronic mail the foregoing document and electronically filed the same with the Cleric of Court using CM/ECF which will send notification of such filing(s) to the following: 'Exhibits A-W to Redacted Reply.
"Case 1:08-cv-00131-JJF Document 146 Filed Jun. 18, 2009 p. 1 of 5 // Motion for Leave to Amend Answer,Affirmative Defenses, and Counterclaims // Filed: Jun. 18, 2009", Allstate Docket #146.

"Defendants' Opening Brief in Support of Its Motion for Leave Toamend Answer, Affirmative Defenses, and Counterclaims // Case 1:08-cv-00131-JJF, Filed Jun. 18, 2009 p. 1 of 12 ", Allstate Docket #147.

Plaintiff WebXchange Inc.'s Answering Brief in Opposition to Allstate's Second Motion for Leave to Amend Its Answer, C.A. No. 08-131 (JJF), Allstate Docket #148.

Complaint filed with Jury Demand against Dell Inc.—. ( Filing fee $ 350, receipt No. 03110000000000419782.)—filed by WebXchange Inc.. (Attachments: # 1 Exhibit A, # 2 Exhibit B, # 3 Exhibit C, # 4 Civil Cover Sheet)(lid) (Entered: Mar. 5, 2008), Dell Docket #1.

Answer to 1 Complaint with Jury Demand, Counterclaim [Dell Inc.'s Answer, Defenses and Counterclaims to WebXchange Inc.'s Complaint for Patent Infringement] against Dell Inc. By Dell Inc.. (Horwitz, Richard) (Entered: Mar. 26, 2008), Dell Docket #8.

Answer to 8 Answer to Complaint, Counterclaim Plaintiff WebXchange Inc.'s Answer to Defendant Dell's Counterclaims by WebXchange Inc..(Heaney, Julia) (Entered: Apr. 18, 2008), Dell Docket #11.

Claim Construction Opening Brief [Defendants' Opening Brief in Support of Their Proposed Claim Constructions] filed by Dell Inc.. (Moore, David) (Entered: Oct. 29, 2008), Dell Docket #45.

Claim Construction Opening Brief filed by WebXchange Inc.. (Attachments: # 1 Exhibits A-B)(Heaney, Julia) (Entered: Oct. 29, 2008), Dell Docket #46.

Reply Brief re 37 Motion for Discovery filed by Dell Inc.. (Attachments: # 1 Exhibit A-L, # 2 Exhibit M-S)(Gaza, Anne) (Entered: Oct. 31, 2008), Dell Docket #47.

Motion to Amend/Correct Answer and Counterclaims to Complaint (Unopposed)—filed by Dell Inc.. (Attachments: # 1 Notice of Motion, # 2 Text of Proposed Order, # 3 Exhibit A (First Amended Answer), # 4 Exhibit B (Blackline of First Amended Answer))(Moore, David) Modified on Jan. 13, 2009 (nms). (Entered: Jan. 12, 2009), Dell Docket #72.

Order Granting 72 Defendant Dell Inc.'s Unopposed Motion to Amend its Answer and Counterclaims to Webexchange Inc's Original Complaint for Patent Infringement. Signed by Judge Joseph J. Farnan, Jr. on Jan. 13, 2009. (nms) (Entered: Jan. 14, 2009), Dell Docket #74.

Dell Inc.'s First Amended Answer and Counterclaims to 1 Complaint by Dell Inc.. (nms) (Entered: Jan. 14, 2009), Dell Docket #75.

Answer to 75 Amended Answer to Complaint, Counterclaim by WebXchange Inc..(Heaney, Julia) (Entered: Feb. 2, 2009), Dell Docket #79.

Motion to Bifurcate and for Early Trial on, the Issue of Inequitable Conduct—filed by FedEx Corporation, FedEx Kinko's Office & Print Services, Inc., FedEx Corporate Services Inc.. (Gaza, Anne) Modified on Mar. 23, 2009 (nms). (Entered: Mar. 19, 2009), Dell Docket #85.

Notice of Motion re 85 Motion to Bifurcate and for Early Trial on the Issue of Inequitable Conduct; Requesting the following Motion Day: Apr. 17, 2009 (Gaza, Anne) Modified on Mar. 23, 2009 (nms). (Entered: Mar. 19, 2009), Dell Docket #86.

7.1.1 Statement re 85 Motion to Bifurcate and for Early Trial on the Issue of Inequitable Conduct by FedEx Corporation, FedEx Kinko's Office & Print Services, Inc., FedEx Corporate Services Inc.. (Gaza, Anne) Modified on Mar. 23, 2009 (nms). (Entered: Mar. 19, 2009), Dell Docket #87.

Redacted Version of 88 Opening Brief in Support by FedEx Corporation, FedEx Kinko's Office & Print Services, Inc., FedEx Corporate Services Inc.. (Attachments: # 1 Exhibit 1, # 2 Exhibit 2, # 3 Exhibit 3, # 4 Exhibit 4, # 5 Exhibit 5, # 6 Exhibit 6, # 7 Exhibit 7, # 8 Exhibit 8, # 9 Exhibit 9, # 10 Exhibit 10, # 11 Exhibit 11, # 12 Exhibit 12, # 13 Exhibit 13)(Gaza, Anne) (Entered: Mar. 23, 2009), (Three Parts) Dell Docket #89.

Claim Construction Opening Brief Defendants' Opening Brief in Support of Their Proposed Claim Constructions filed by Dell Inc.. (McGeever, Elizabeth) (Entered: Mar. 23, 2009), Dell Docket #90.

Claim Construction Opening Brief filed by WebXchange Inc.. (Attachments: # 1 Exhibits A-B)(Heaney, Julia) (Additional attachment(s) added on Mar. 25, 2009: # 2 Main Document) (nms). (Entered: Mar. 23, 2009), (Two parts) Dell Docket #92.

Defendant Dell Inc.'s Motion for Leave to Amend Its Answer (to file a Second Amended Answer); Jury Trial Demanded (entered Jul. 23, 2009) Dell Docket #130.

Plaintiff WebXchanges Inc.'s Answering Brief in Opposition to Dell's Second Motion for Leave to Amend its Answer (entered Aug. 10, 2009) Dell Docket #134.

Defendant Dell Inc.'s Opening Brief in Support of Its Motion for Leave to Amend Answer (entered Aug. 11, 2009) Dell Docket #136.

Declaration of Charlotte Pontillo in Support of WebXchange Inc.'s Answering Brief in Opposition to Dell's Second Motion for Leave to Amend Its Answer; (entered Aug. 12, 2009) Dell Docket #137.

Defendant Dell Inc.'s Reply Brief in Support of Its Motion for Leave to Amend Answer (entered Aug. 20, 2009) Dell Docket #138.

Order, Judge Stark, Dell Docket #139.

Complaint filed with Jury Demand against FedEx Corporation, FedEx Kinko's Office & Print Services Inc., FedEx Corporate Services Inc.—. (Filing fee $ 350, receipt number 03110000000000419793.)—filed by WebXchange Inc., (Attachments: # 1 Exhibit A, # 2 Exhibit B, # 3 Exhibit C, # 4 Civil Cover Sheet)(lid) (Entered: Mar. 5, 2008), FedEx Docket #1.

Answer to 1 Complaint with Jury Demand, COUNTERCLAIM against WebXchange Inc. by FedEx Corporation, FedEx Kinko's Office & Print Services Inc., FedEx Corporate Services Inc..(Gaza, Anne) (Entered: Apr. 25, 2008), FedEx Docket #13.

Answer to 13 Answer to Complaint, Counterclaim Plaintiff WebXchange Inc.'s Answer to Defendant FedEx's Counterclaims by WebXchange Inc..(Heaney, Julia) (Entered: May 19, 2008), FedEx Docket #24.

Claim Construction Opening Brief [Defendants' Opening Brief in Support of Their Proposed Claim Constructions] filed by FedEx Corportation, FedEx Kinko's Office & Print Services Inc., FedEx Corporate Services Inc.. (Moore, David) (Entered: Oct. 29, 2008), FedEx Docket #58.

Claim Construction Opening Brief filed by WebXchange Inc.. (Attachments: # 1 Exhibits A-B)(Heaney, Julia) (Entered: Oct. 29, 2008), FedEx Docket #59.

Motion to Amend/Correct 13 Answer to Complaint, Counterclaim— filed by FedEx Corporation, FedEx Kinko's Office & Print Services Inc., FedEx Corporate Services Inc.. (Attachments: # 1 Exhibit A, # 2 Exhibit B, # 3 Exhibit C)(Gaza, Anne) (Entered: Jan. 12, 2009), FedEx Docket #89.

Notice of Motion by FedEx Corporation, FedEx Kinko's Office & Print Services Inc., FedEx Corporate Services Inc. re 89 Motion to Amend/Correct 13 Answer to Complaint, Counterclaim Motion to Amend/Correct 13 Answer to Complaint, Counterclaim ; Requesting the following Motion Day: Feb. 19, 2009 (Gaza, Anne) (Entered: Jan. 12, 2009), FedEx Docket #90.

Sealed Opening Brief in Support re 89 Motion to Amend/Correct 13 Answer to Complaint, Counterclaim Motion to Amend/Correct 13 Answer to Complaint, Counterclaim filed by FedEx Corporation, FedEx Kinko's Office & Print Services Inc., FedEx Corporate Services Inc..Answering Brief/Response due date per Local Rules is Jan. 30, 2009. (Gaza, Anne) (Entered: Jan. 12, 2009), FedEx Docket #91.

Order Granting 89 Unopposed Motion for Leave to Amend Answer. Signed by Judge Joseph J. Farnan, Jr. on Jan. 13, 2009. (nms) (Entered: Jan. 14, 2009), FedEx Docket #96.

First Amended Answer, Affirmative Defenses, and Counterclaims to Plaintiff re 1 Complaint, with Jury Demand by FedEx Corporation, FedEx Kinko's Office & Print Services Inc., FedEx Corporate Services Inc..(nms) (Entered: Jan. 14, 2009), FedEx Docket #97.

Redacted Version of 91 Opening Brief in Support, by FedEx Corporation, FedEx Kinko's Office & Print Services Inc., FedEx Corporate Services Inc.. (Attachments: # 1 Exhibit A-D)(Gaza, Anne) (Entered: Jan. 21, 2009), FedEx Docket #98.

Amended Answer to 97 Answer to Complaint, Counterclaim by WebXchange Inc..(Heaney, Julia) (Entered: Feb. 02, 2009), FedEx Docket #100.

Motion to Bifurcate and for Early Trial on, The Issue of Inequitable Conduct—filed by FedEx Corporation, FedEx Kinko's Office & Print Services Inc., FedEx Corporate Services Inc.. (Gaza, Anne) Modified on Mar. 23, 2009 (nms). (Entered: Mar. 19, 2009), FedEx Docket #108.

Notice of Motion re 108 Motion to Bifurcate and for Early Trial on, The Issue of Inequitable Conduct; Requesting the following Motion Day: Apr. 17, 2009 (Gaza, Anne) Modified on Mar. 23, 2009 (nms). (Entered: Mar. 19, 2009), FedEx Docket #109.

Statement re 108 Motion to Bifurcate and for Early Trial on, The Issue of Inequitable Conduct by FedEx Corporation, FedEx Kinko's Office & Print Services Inc., FedEx Corporate Services Inc.. (Gaza, Anne) Modified on Mar. 23, 2009 (nms). (Entered: Mar. 19, 2009), FedEx Docket #110.

Claim Construction Opening Brief Defendants' Opening Brief in Support of Their Proposed Claim Constructions filed by FedEx Corporation, FedEx Kinko's Office & Print Services Inc., FedEx Corporate Services Inc.. (McGeever, Elizabeth) (Entered: Mar. 23, 2009), FedEx Docket #113.

Claim Construction Opening Brief filed by WebXchange Inc.. (Attachments: # 1 Exhibits A-B)(Heaney, Julia) (Additional attachment(s) added on Mar. 25, 2009: # 2 Main Document) (nms). (Entered: Mar. 23, 2009), (Two parts) FedEx Docket #115.

Defendants' Motion for Leave to Amend Its Answer, FedEx Docket #145.

Defendants' Brief in Support of Its Motion for Leave to Amend Answer // C.A No, 08-133 (JIF) // Dated: Jun. 12, 2009, FedEx Docket #147.

UIUC , "The Common Gateway Interface", pp1_4, http:/hoohoo.ncsa.uiuc.edu/cgi/primer.html, Retrieved on May 22, 2001 , WBX000.

Arnold, K et al. , "Media-Independent Interfaces in a Media-Dependent World", Proceedings of the USENIX Conference on Object-Oriented Technologies, Monterey, CA, Jun. 1995 , WBX001.

Arshad, K.M et al. , "A Corba based framework for trusted E-Commerce Transactions", Enterprise Distributed Object Computing Conference, pp. 18-25, EDOC '99. Proceedings, 3rd International, Sep. 27, 1999 , WBX002.

Atkinson, R. , RFC 1825: "Security Architecture for the Internet Protocol", Naval Research Laboratory, Category: Standards Track, Network Working Group, Aug. 1, 1995 , WBX007.

Banks, M. , "America Online: A Graphics-based Success", Link-Up, Jan./Feb. 1992 , WBX008.

Banks, M. , "Compuserve for Windows", M.I.S Press, 1994, WBX009.

Baquero, C. et al. , "Integration of Concurrency Control in a Language with Subtyping and Subclassing", Proceedings of the USENIX Conference on Object-Oriented Technologies, Monterey, CA, Jun. 1995 , WBX010.

Barron, C. and Weil, B., "Dr. Dobbs Portal: Implementing a Web Shopping Cart", Online Transactions in PERL, Sep. 1, 1996 WBX011.

Bharat, K. et al. , "Visual Obliq: A System for Building Distributed, Multi-User Applications by Direct Manipulation", SRC 130a, DEC, Oct. 31, 1995, WBX012.

Bharat, K. et al. , "Distributed Applications in a Hypermedia Setting", Proc. of the International Workshop on Hypermedia Design, Montpellier, http.www.cc.gatech. edugvupeoplePhdKrishnalWHD.html, Jun. 1, 1995 , WBX013.

Birrell A. et al., "Network Objects", SRC Research Report, Feb. 28, 1994, WBX014.

Birrell A. et al., "Implementing Remote Procedure Calls", Xerox Palo Alto Research Center, ACM Transactions, Feb. 1, 1994 , WBX015.

Bowen, C. et al. , "How to Get the Most out of CompuServe" 5th Ed. 1991, Random House, Inc. 1991, WBX016.

Braden, R. et al. , RFC 1122: "Requirements for Internet Hosts—Communication Layers" Oct. 1, 1989, WBX017.

Brando, T., "Comparing DCE and CORBA", Mitre Document MP 95B-93, Mar. 1, 1995, WBX018.

Microsoft, 7,340,506—Appendix A to the Request for Inter Partes Re-examination of, Payne, Dec. 2008, WBX019.

Broadvision, "Broadvision One-to-One: On-line Marketing and Selling Application System Developers' Guide", 1995, WBX020.

Broadvision, "Broadvision One-to-One: On-Line Marketing and Selling Application System: Dynamic Command Center User's Guide", 1995, WBX021.

Broadvision, "Broadvision One-to-One: On-Line Marketing and Selling Application System: Installation and System Administration Guide" 1995, WBX022.

Broadvision, "Broadvision One-to-One: On-Line Marketing and Selling Application System: Technical Overview", 1995, WBX023.

Microsoft, 7,340,506—Appendix B to the Request for Inter Partes Re-examination of, Ginter, Dec. 2008, WBX024.

Business Wire , "Open Market releases first complete software solution" 1995, WBX025.

Business Wire, "Sunsoft delivers early access release of Distributed Objects Environment", Jun. 14, 1995, WBX026.

Case, J. et al. , "Network Management and the Design of SNMP", Connexxions (ISSN 0894-5926), vol. 3, No. 3, Mar. 1989, WBX027.

Microsoft, 7,340,506—Appendix C to the Request for Inter Partes Re-examination of, Popp, Dec. 2008, WBX028.

Chung, S. et al., "A Heterogeneous Distributed Information System", IEEE, pp. 443-447, 1993, WBX029.

Courtney, A. , "Phantom: An Interpreted Language for Distributed Programming", Proceedings of the USENIX Conference on Object-Oriented Technologies, Monterey, CA, Jun. 1995, WBX030.

Cybercash, "Affiliate Marketing Service", http://www.cybercash.com/products/affiliatemarketing.html [retrieved on May 23, 2001] 1996, WBX031.

"CyberCash B2B Payment Services", http://www.cybercash.com/b2b pp. 1-2[retrieved May 23, 2001] 1996, WBX032.

"CyberCash B2BServices", 1996, WBX033.

"CyberCash Cash Register Internet Payment Service". Web Page [online]. Cybercash Cash Register—Online Secure Payment Service. [retrieved on May 23, 2001] Retrieved from the Internet:<URL:http://www.cybercash.com/cashregister pp. 1-2, 1996, WBX034.

"CyberCash—Cash Register—How it Works" [retrieved on May 23, 2001] Retrieved from the Internet:<URL:http://www.cybercash.com/cashregister/howitworks.html pp. 1-3. 1996, WBX035.

"CyberCash—Industry Leading Features" Web Page [online]. [retrieved on May 23, 2001] Retrieved from the Internet:<URL:http://www.cybercash.com/cashregister/features.html pp. 1-4. 1996, WBX036.

"CyberCash Cash Register—Online Secure Payment Services" CashRegister Demos. Web Page [online]. [retrieved on May 23, 2001] Retrieved from the Internet:<URL:http://www.webdata.cybercash.com/demos/ pp. 1-2. 1996, WBX038.

"CyberCash FraudPatrol,TM. Service" Web Page [online]. [retrieved on May 23, 2001] Retrieved from the Internet:<URL:http://www.cybercash.com/fraudpatrol/ pp. 1-2 1996, WBX039.

"CyberCash FraudPatrol—How It Works" Web Page [online]. [retrieved on May 23, 2001] Retrieved from the Internet: <URL:http://www.cybercash.com/fraudpatrol/howitworks.html pp. 1-2 1996, WBX040.

"CyberCash Home", http://www.cybercash.com [retrieved on May 23, 2001] 1996, WBX041.

Microsoft, 7,340,506 Inter Partes Re-examination Exhibit 2, File History, Dec. 2008, (Two parts) WBX042.

"CyberCash ICVerify for Windows" Version 2.5 Upgrade, http://www.cybercash.com/icverify/upgrade.html pp. 1-2 [retrieved on May 23, 2001] 1996 , WBX043.

Cybercash, "ICVERIFY—Features" Web Page [online] [retrieved on May 23, 2001] Retrieved from the Internet: <URL:http://www.cybercash.com/icverify/features.html, 1996, pp. 1-3, WBX044.

Cybercash, "Payment Software for Brick and Mortar Merchants" http://www.cybercash.com/pcauthorize 1996-2001, WBX046.

Delaware WebXchange Claim Construction Introductory Brief, Mar. 26, 2009, WBX047.

Cybercash, "Products" Web Page[online]. CyberCash, 1996. [retrieved on May 23, 2001]. Retrieved from the Internet<URL:http://www.CyberCash.com/products/, 1996, pp. 1-2, cited by other, WBX048.

Microsoft, 7,340,506 Inter Partes Re-examination Request, Dec. 2008, WBX049.

Cybercash, "WebAuthorize—Enterprise and Hosting Payment Processing". Web Page [online].[retrieved on May 23, 2001] Retrieved from the Internet<URL:http://www.cybercash. com/webauthorize/, 1996, pp. 1-2, WBX050.

Davis et al., "A Protocol and Server for a Distributed Digital Technical Report Library", Apr. 25, 1994, WBX051.
Davison, A., "Coding with HTML forms HTML goes interactive", (hypertext markup language)(Tutorial), Dr. Dobb's Journal, Jun. 6, 1995, vol. 20, No. 6, 19 pages, WBX052a.
Davison, A., "Coding with HTML forms: HTML goes interactive", Dr. Dobb's Journal, Jun. 6, 1995, vol. 20, No. 6, pp. 70-79, WBX052b. .
"Distributed Object Technology in the Financial Services Industry: Trading and Risk Management", A White Paper, Sun Microsystems, 1995, WBX053.
Deng, R.H. et al., "Integrating Security in CORBA-based Architectures", IEEE, Jun. 1995, pp. 50-61, WBX054.
Detlefs, D. et al., Debugging Storage Management Problems in Garbage Collected Environments, Proceedings of the USENIX Conference on Object-Oriented Technologies, Monterey, CA, Jun. 1995, WBX055.
Dietinger, T., Object-Oriented Implementation of a Multiprotocol Hyper-G client for MS-Windows, Diplomarbeit inTelematik, TU Graz, Sep. 1, 1995, WBX056.
Dr. Gui on Components, COM and ATL, http://msdn.microsoft.com/library/welcome/dsmsdn/msdn_drguion020298.htm, Feb. 2, 1998, pp. 1-61 [retrieved on May 22, 2001], WBX057.
Edwards, N., Object Wrapping (for WWW)—The Key to Integrated Services, ANSA Phase III, Apr. 25, 1995, WBX058.
Ehikioya, S.A., "An Agent-Based System for Distributed Transactions: a Model for Internet-Based transactions", Electrical and Computer Engineering, 1999 IEEE Canadian Conference on, vol. 1, May 9, 1999, pp. 289-294, WBX059.
Microsoft DJ Order, C-08-05149 WHA "Order Granting Defendant's Motion to Dismiss", Federal Court of Northern California, Feb. 17, 2009, WBX060.
"Portal Solutions, an Open Market eBusiness Solution Brief". White Paper. Open Market, Forrester Research TechRankings, Feb. 2001, WBX061.
"Wireless Solutions, An Open Market eBusiness Solution Brief", WhitePaper. Open Market, Forrester Research TechRankings, Feb. 2001, WBX062.
Fraga, J. et al., "A Programming Model for Real-Time Applications in Open Distributed Systems", IEEE, 1995, pp. 104-111, WBX063.
Dell, Fedex, Allstate, Delaware Claim Construction Introductory Brief_Defendants_Opening Brief in Support of Their Proposed Claim Constructions Mar. 23, 2009, Mar. 27, 2009, WBX064.
Glossbrenner, A., "MasterGuide to Compuserve", "Chapter 15: Travel Services: Join CompuServe and See the World", Prentice Hall, 1987, WBX065.
Gross, C., "Taking the Splash Diving into ISAPI Programming", ISAPI Programming, Microsoft Interactive Developer, <URL:http://www.Microsoft.com/mind/0197/ISAPI.htm, Jan. 1, 1997, pp. 1_10 [retrieved on May 22, 2001], WBX066.
"Open Market Inc, Managing in a Turbulent Environment", Harvard Business School, 9-196-097, Aug. 29, 1996, WBX067.
Hickey, M., "Shopping at Home: One Modem Line, No Waiting", Home PC, Dec. 1, 1994, p. 307, Dialog, File 647, Acc# 01038162, WBX068A.
Lang, "Cashing in: The Rush is on to Buy and Sell on the Internet But on Sidelines for Now", Advertising Age, Dec. 19, 1994, p. 11, Dialog, File 16, Acc# 05419137, WBX068B.
Lichty, T., "America Online Tour Guide", MacIntosh Edition, Version 2, Chapter 1, 3, 8,10, 1992, WBX068C.
Tymnet, Wikipedia, the free encyclopedia, http://en.wikipedia.org/wiki/tymnet, Retrieved on May 1, 2007, WBX068D.
Cox, B. et al., "NetBill Security and Transaction Protocol", Carnegie Millon University, Pittsburgh, PA 15212-3890, undated, WBX068E.
Lamond, K. et al., "Credit Card Transactions Real World and OnLine", http://www.virtualschool.edu/mon/ElectronProperty/klamond/credit_card.htm, 1996, pp. 1-16, WBX068F.
"Open Market Catalog Centre", Page online. Open Market, Inc.—Enterprise Content Manangement & Delivery. Retrieved on the Internet<URL:http://www.openmarket.com/cgi-bin/gx.cgi/AppLogic+FT-ContentServer?pagename=FutureTense/Apps/Xcelerate/Render&c=Arti_ZZZ, WBX069.
Business Wire, High Beam Wire, "Open Market releases first complete software solution" Oct. 16, 1995, WBX070.
McCloghrie, K. et al., RFC 1156, "Management Information Base for Network Management of TCP/IP-based internets", May 1, 1990, WBX071.
Case, J. et al., RFC 1157 May 1, 1990, WBX072.
Rose, M.. RFC 1283:"SNMP over OSI", Dec. 1, 1991, WBX073.
Rose, M. et al., RFC 1155: "Structure and Identification of Management Information for TCP/IP-based internets", May 1, 1990, WBX074.
Case, J. et al., RFC 1442: "Structure of Management Information for version 2 of the Simple Network Management Protocol (SNMPv2)", AllState 00011394 Apr. 1, 1993, WBX075.
"ORBIX Programmer's Guide", IONA Technologies, Oct. 1, 1997, WBX076.
"ORBIX Programmer's Guide", Release 1.3.1, IONA Technologies, Feb. 1, 1995, WBX077.
Ito, J. et al., "Using meta-objects to support optimization in the Apertos Operating System", Proceedings of the USENIX Conference on Object-Oriented Technologies, Monterey, CA, Jun. 1995, WBX078.
Jordan, M. et al., "Software Configuration Management in an Object-Oriented Database", Proceedings of the USENIX Conference on Object-Oriented Technologies, Monterey, CA, Jun. 1995, WBX079.
Kane, P., "Prodigy Made Easy", "Chapter 6, Shopping Made Easy", 2nd ed., 1993, WBX080.
Lagoze, C. et al., "Dienst: Implementation Reference Manual", May 5, 1995, WBX081.
Open Market Commerce Products, Web Page[online], Open Market Inc.—Enterprise Content Management Delivery. Retrieved on the Internet:<URL:http://www.openmarket.com/cgi-bin/gx.cgi/AppLogic+FTCont- entServer?pagename=FutureTense/Apps/Xcelerate/Render&c=A_ZZZ, WBX082.
Lange, D.B. et al., "Program Explorer: A Program Visualizer for C++", Proceedings of the USENIX Conference on Object-Oriented Technologies, Monterey, CA, Jun. 1995, WBX083.
Laufer. K., "A Framework for Higher Order Functions in C++", Proceedings of the USENIX Conference on Object-Oriented Technologies, Monterey, CA, Jun. 1995, WBX084.
Li, G. and Bacon, J., "Supporting Distributed Real-Time Objects", IEEE Jul. 1994, pp. 138-143, WBX085.
Limprecht, R., "Microsoft Transaction Server", IEEE, Compcon '97 Proceedings, 1997, pp. 14-18, WBX086.
Maffeis, S., "Adding Group Communication and Fault-Tolerance to CORBA", Proceedings of the USENIX Conference on Object-Oriented Technologies, Monterey,CA, Jun. 1995 , WBX087.
Mahindra, A. et al., "Dynamic Insertion of Object Services", Proceedings of the USENIX Conference on Object-Oriented Technologies, Monterey,CA, Jun. 1995, WBX088.
McCloghrie, K. et al., RFC 1213, "Management Information Base for Network Management of TCP/IP-based internets: MIB-II", SNMP Working Group, Mar. 1, 1991, WBX089.
McCloghrie, K. et al., RFC 1447, "Party MIB for version 2 of the SIMPLE Network Management Protocol", SNMP Security Working Group, Apr. 1, 1993, WBX090.
McKie, S., "ERP Meets Web E-Commerce", DBMS, Jul. 1, 1998, WBX091.
McMaster D. et al., RFC 1516: "802.3 Repeater devices—Definition of Managed Objects", Feb. 2, 1992, WBX092.
"Allstate Connects with Countrywide Producer Network in Seven Months Using Microsoft Visual Studio .NET and the NET Framework", Microsoft .NET Customer Solution, Jan. 2003, WBX093.
O'Brien Jones , U.S. Appl. No. 90/010,346 Application which is the 5,778,178 Re-exam doc, Exhibits Part 1-WBX101, Exhibits Part 2-WBX102, Nov. 21, 2008 Third Party Requests, WBX094.
"Microsoft Component Services, Server Operating System, A Technology Overview", http://www.microsoft.com/com/wpaper/compsvcs.asp, Aug. 15, 1998, [retrieved on May 22, 2001], WBX095.
Microsoft vs WebXchange Complaint CV 085149, Nov. 12, 2008, WBX096.

Microsoft vs WebXchange First Amended Complaint CV 085149, Mar. 3, 2009, WBX097.

Allstate Uses Web Services to Quickly Create Insurance Policy Management Solution, Microsoft .NET Customer Solution Case Study, Jan. 2005, WBX098.

Mitchell et al., "An Overview of the Spring System", Sun Microsystems, WBX099.

Muckelbauer, P. and Russo, V., "Lingua Franca: An IDL for Structured Subtyping Distributed Object Systems" Proceedings of the USENIX Conference on Object-Oriented Technologies, Monterey, CA., WBX100.

O'Brien Jones , 5,778,178 Request for Ex Parte Re-Exam with Exhibits Part 1, Nov. 21, 2008, WBX101.

Reynolds, J. Posting to comp doc USENET group, http://nyurl.com/53a95p, RFC 1212, 1213- Google groups on concise definitions MIB and MIBII, Exhibit G, Mar. 27, 1991, WBX045.

Relihan, L. et al., "Untangling the World-Wide Web." Proceedings of the 12th Annual International Conference on Systems Documentation, Oct. 1, 1994, pp. 17-24, published by the Association of Computing Machinery, WBX102A.

O'Brien Jones , 5,778,178 Request for Ex Parte Re-Exam with Exhibits Part 2, Nov. 21, 2008 , WBX102B.

Rose, M. T., "The Simple Book: An Introduction to Internet Management", 1994, pp. 14-15, 379-387 (2nd ed.) Exhibit F, WBX102C.

"Open Market Enterprise Content Management and Delivery: Content Server", <URL:http://www.openmarket.com/cgi-bin/gx.cgi/AppLogic+FTContentServer?pagename=FutureTense/Apps/Xcelerate/Render&c=Artic.., retrieved on May 15, 2001, pp. 1-4, WBX103.

"Open Market Enterprise Content Management and Delivery: Content Center", <URL:http://www.openmarket.com/cgi-bin/gx.cgi/AppLogic+FTContentServer?pagename=FutureTense/Apps/Xcelerate/Render&c=Artic., retrieved on May 15, 2001, WBX104.

"Open Market Enterprise Content Management and Delivery: Content-Driven eBusiness Solutions", Web site [retrieved on May 15, 2001] <URL:http://www.openmarket.com/cgi-bin/gx.cgi/AppLogic+FTContentServer?pagename=FutureTense/Apps/Xcelerate/Render&c=Artic..re, WBX105.

"Open Market ShopSite 5.0", Web Page[online]. [retrieved on May 15, 2001]. Retrieved on the Internet<URL:http://www.openmarket.com/cgi-bin/gx.cgi/AppLogic+FTContentServer?pagename=FutureTense/Apps/, retrieved on May 15, 2001, WBX112.

Orfali, R. et al., "Essential Client/Server Survival Guide"-John Wiley and Sons—Set 1, 1994, WBX114.

Orfali, R. et al., "Essential Client/Server Survival Guide"-John Wiley and Sons—Set 2, 1994, WBX115.

WBX116 Orfali, R.; Harkey, D.; Edwards, J., "Essential Client/Server Survival Guide" John Wiley and Sons, Sets 1-4, Jun. 16, 2005, WBX116.

Orfali, R. et al., "Essential Client/Server Survival Guide"-John Wiley and Sons—Set 4, 1994, WBX117.

Pavlou, G. et al. , "A Generic Management Information Base Browser", WBX119.

Peterson, L. et al. , "Computer Networks, A Systems Approach", Morgan Kaufmann Publishers, Inc., 1996, pp. 472-507, WBX120.

Pitkow, J. et al. , "Using the Web as a Survey Tool: Results from the Second WWW User Survey", conducted on Oct. 15 and Nov. 1994, presented at the Third International World-Wide-Web Conference in Darmstadt, Germany, Apr. 10-14, 1995 , WBX121.

Netscape Unveils New Versions of Commercial Applications for Enhanced Integration with Corporate Databases, NetScape Press Release, May 13, 1996, WBX122.

Raatikainen, K. , "Database Access in Intelligent Networks", Proceedings of IFIP TC6 Workshop on Intelligent Networks, pp. 163-183, WBX123.

Radia, S. R. et al. , "The Spring Object Model", Proceedings of the USENIX Conference on Object-Oriented Technologies, Monterey, CA, Jun. 1995, WBX124.

Rosenberry, et al. , "OSF Distributed Computing Environment—Understanding DCE"—O'Reilly & Associates, Jun. 1993, WBX126.

Rubin, C. "Wired: In the Bag", Jun. 1997, WBX127.

Schepp et al. , "The Complete Guide to CompuServe: Chapter 12: Travel Services: See the World Today the Compuserve Way", 1990, pp. 409-437, McGraw Hill, WBX128.

Schmidt, D. et al. , "Object-Oriented Components for High-Speed Network Programming", Proceedings of the USENIX Conference on Object-Oriented Technologies, Monterey, CA, Jun. 1995, WBX129.

Siegel, J., "Common Object Services Specification vol. 1, Rev 1, First Edition", OMG Doc 94-1-1, Mar. 1, 1994, WBX130.

"Common Desktop Environment: Product Glossary", SunSoft, 1994-1995, WBX131.

"Common Desktop Environment: Applications Builder User's Guide", SunSoft, 1994-1995, WBX132.

"OpenStep Development Tools", SunSoft, 1996, WBX133.

Porting NextStep 3.2/3.3 Applications to OpenStep on Solaris, Sunsoft, 1996, WBX134.

"Solstice X.500 Programming Reference", SunSoft, 1996 , WBX135.

Tatters, W. , "Navigating the Internet with Compuserve: Chapter 17: Business on the Net", 1995, pp. 352-374. Sams Publishing, WBX136.

Technical Staff , "The Conductor Financial Services Framework": Distributed Objects on the Internet, A Block Financial Corporation White Paper, BFC Technology Center, Oct. 17, 2005, WBX137.

US Patent 5,778,178, Re-exam Order Granted, Jan, 23, 2009, WBX142.

US Patent 7,340,506, Re-exam Order Mar. 6, 2009, WBX143.

Volger, H. et al.. , "The Transaction Internet Protocol in Practice: Reliability for WWW Applications", IEEE 1999 Internet Workshop IWS99, (ISSN-0-7803-5925-9), Feb. 18, 1999, WBX146.

7,340,506 Inter Partes Re-examination Exhibit 3—WebXchange Claim Construction Introductory Brief, in the US District Court for the District of Delaware, C.A. No. 08-131 (JJF), C. A. 08-132 (JJF), No. 08-133 (JJF), Microsoft, Oct. 29, 2008, WBX148.

Microsoft , 7,340,506 Inter Partes Re-examination Exhibit 5- 08-168,519 FH—'519 Application Final, WBX149.

Weich, C. , "Generic Containers for a Distributed Object Store", Proceedings of the USENIX Conference (Jun. 1995) on Object-Oriented Technologies, Monterey, CA, May 18 , 1995 , WBX150.

WBX151, "SmallTalk" Wikipedia SmallTalk http://www.objs.com/x3h7/smalltalk.htm and http://en.wikipedia.org/wiki/Smalltalk WBX151.

Wollrath, A. et al. , "Simple Activation for Distributed Objects", Proceedings of the USENIX Conference on Object-Oriented Technologies, Monterey, CA, Jun. 1995, WBX152.

USENIX , "Agenda of Proceedings of the USENIX Conference on Object-Oriented Technologies", Monterey, CA, Jun. 1995, WBX153.

"Common Desktop Environment: Desktop Kornshell User's Guide", Sun Microsystems, 1994-1995 , WBX154.

"Common Desktop Environment: Help System Author's and Programmer's Guide", Sun Microsystems, 1994-1995, (Three parts) WBX155.

"Common Desktop Environment: Internationalization Programmer's Guide", Sun Microsystems, 1994-1995, WBX156.

"Common Desktop Environment: Tooltalk Messaging Overview", Sun Microsystems, 1994-1995 , WBX157.

"Common Desktop Environment: Common StyleGuide and Certification CheckList", SunSoft, 1994-1995 , WBX158.

"Common Desktop Environment: Programmer's Overview", SunSoft, 1994-1995 , WBX159.

Developer's Guide to Internationalization, Sun Microsystems, 1994, WBX160.

"Dr. Gui's Gentle Guide to COM", http://www.microsoft.com/Com/news/drgui.asp [retrieved on May 22, 2001], Nov. 1, 1999, WBX161.

"iPIN Company Info", http://www.ipin.com/01comp.html [retrieved on May 23, 2001], iPIN Interactive Transaction Services, Inc., 2000, WBX162.

"iPIN Home", http://www.ipin.com [retrieved on May 23, 2001], iPIN Interactive Transaction Services, Inc., 2000, WBX163.

"iPIN Service Options", http://www.ipin.com/02prod_service.html [retrieved on May 23, 2001], iPIN Interactive Transaction Services, Inc., 2000, WBX164.

"iPIN Solutions", http://www.ipin.com/02prod_solution.html [retrieved on May 23, 2001], iPIN Interactive Transaction Services, Inc., 2000, WBX165.

"iPIN Partners", http://www.ipin.com/03part.html [retrieved on May 23, 2001], iPIN Interactive Transaction Services, Inc., 2000, WBX166.

"iPIN Technology", http://www.ipin.com/02prod_tech.html [retrieved on May 23, 2001], iPIN Interactive Transaction Services, Inc., 2000, WBX167.

NetScape Products: Open and Secure Internet Software, 1995, WBX168A.

NetScape Merchant System, Data Sheet 1995, WBX168B.

NetScape Internet Applications, Customer Showcase 1995, WBX168C.

NetScape Server API, 1995, WBX 168D.

NetScape Object-Oriented Pradigm of Server Configuration, 1995, WBX168E.

RSA: Verisign Redirection Information, Important Announcement 1995, WBX168F.

RSA: Verisign to Provide Digital IDs for Open Market's Secure WebServer, 1995, WBX168G.

Verisign Adds the Missing Component to Online Security Solutions 1995, WBX168H.

Hickman, K.E.B.; NETSCAPE, "The SSL Protocol", 1995, WBX168I.

NetScape iStore DataSheet, 1995, WBX168J.

Choudhury, A.K. et al., "Copyright Protection for Electronic Publishing over Computer Networks", 1995 IEEE Network, 9, May/Jun., vol. 3 pp. 12-20 (1995) WBX168L.

NSAPI Basics, (Chapter 1) http://developer.netscape.com/docs/manuals/enterprise/nsapi/svrop.htm [retrieved on May 22, 2001], 1997, WBX174.

"OpenStep User Interface Guidelines", SunSoft, 1996, WBX175.

"OpenStep Programming Reference", SunSoft, 1996, (12 parts) WBX176.

"QuickStart to Using the Open Step Desktop", SunSoft, 1996, WBX177.

Rose, M. et al., "RFC 1065:Structure and Identification of Management Informationfor TCP/IP-based internets", Aug. 1, 1988, WBX178.

Stewart, B., RFC 1318: "Definition of Managed Objects for Parallel-printer-like Hardware Devices", Apr. 1, 1992, WBX179.

Kane, P., "Prodigy Made Easy", "Chapter 6, Shopping Made Easy", 2nd ed., 1993, WBX080.

Lagoze, C. et al., "Dienst: Implementation Reference Manual", May 5, 1995, WBX081.

Rivest, R., "RFC 1321: The MD5 Message-Digest Algorithm", 1997, WBX180.

Solaris Common Desktop Envirnment: MOTIF Transition Guide, Sun Microsystems, 1997, WBX181.

"Solaris Common Desktop Environment: Programmer's Guide", Sun Microsystems, 1994-1995, WBX182.

"The iPin Approach", http://www.ipin.com/02prod.html, 2000, [retrieved on May 23, 2001], Interactive Transaction Services, Inc., WBX183.

USPTO, 7,340,506—Notice of assignment of inter partes reexamination request, Jan. 1, 2009, WBX200.

Orfali, R. et al., "The Essential Distributed Objects Survival Guide"-Part1-1, John Wiley and Sons, 1996, WBX201.

Orfali, R. et al., "The Essential Distributed Objects Survival Guide"-Part1-2, John Wiley and Sons, 1996, WBX202.

Orfali, R. et al., "The Essential Distributed Objects Survival Guide"-Part1-3, John Wiley and Sons, 1996, WBX203.

Orfali, R. et al., "The Essential Distributed Objects Survival Guide"-Part2-1, John Wiley and Sons, 1996, WBX204.

Orfali, R. et al., "The Essential Distributed Objects Survival Guide"-Part2-2, John Wiley and Sons, 1996, WBX205.

Orfali, R. et al., "The Essential Distributed Objects Survival Guide"-Part2-3, John Wiley and Sons, 1996, WBX206.

Orfali, R. et al., "The Essential Distributed Objects Survival Guide"-Part3-1, John Wiley and Sons, 1996, WBX207.

Orfali, R. et al., "The Essential Distributed Objects Survival Guide"-Part3-2, John Wiley and Sons, 1996, WBX208.

Orfali, R. et al., "The Essential Distributed Objects Survival Guide"-Part3-3, John Wiley and Sons, 1996, WBX209.

Orfali, R. et al., "The Essential Distributed Objects Survival Guide"-Part4-1, John Wiley and Sons, 1996, WBX210.

Orfali, R. et al., "The Essential Distributed Objects Survival Guide"-Part4-2, John Wiley and Sons, 1996, WBX211.

Orfali, R. et al., "The Essential Distributed Objects Survival Guide"-Part4-3, John Wiley and Sons, 1996, WBX212.

Orfali, R. et al., "The Essential Distributed Objects Survival Guide"-Part4-4, John Wiley and Sons, 1996, WBX213.

Broadvision, "Broadvision One-to-One: Programmer's Reference, Part 1" 1995, WBX214.

Broadvision, "Broadvision One-to-One: Programmer's Reference, Part 2" 1995, WBX215.

OMG, "The Common Object Request Broker: Architecture and Specification", CORBA v2.0_(NYC-#1655390-v1), Jul. 1995-1996, WBX216.

NYC-#1579692-0-WebXchange_—_Mar. 3_DELL_Complaint. Doc, Mar. 3, 2008, WBX217.

NYC-#1579751-v1-WebXchange_—_Mar. 3_Allstate_Complaint.Doc, Mar. 3, 2008, WBX218.

NYC-#1579947-v1-WebXchange_—_Mar. 3_FedEx_Complaint.Doc, Mar. 3, 2008, WBX219.

The Open Group, "Inter-domain Management: Specification Translation", 1997, WBX222.

The Open Group, "Inter-domain Management_Summary of Similarities and Differences", 1997, WBX223.

The Open Group, "Inter-domain Management_object models comparison", 1997, WBX224.

Miller, M., "Managing Internetworks with SNMP", 1993, pp. 138-139, M&T Books., '506 Inter Partes Re-examination Exhibit 12, Dec. 2008, WBX225.

Umar, A., "Distributed Computing: A Practical Synthesis", "Appendix B: Tutorial on TCP/IP Protocol Suite", (BellCore), 1993, WBX226.

Umar, A., "Distributed Computing: A Practical Synthesis", "Chapter 5: Client-Server Systems and Application Interconnectivity", (BellCore), 1993, WBX227.

Spero, "Binary Gateway Interface—An API for Dynamically Extensible http Servers", Jul. 1, 1994, Retrieved on Apr. 5, 2009 from http://www.ibiblio.org/mdma-release/BGI-spec.txt, WBX228.

"Point, Click and Shop' Never So Easy; The CheckFree Wallet(TM) Allows Consumers and Merchants to Conduct Simple, Safe Internet Transactions" NewsHound, San Jose Mercury News, PRNewswire, Apr. 10, 1995, Retrieved on Apr. 5, 2009 from http://besser.tsoa.nyu.ed_ZZZ, WBX229.

"DEC ObjectBroker Service", Comp.Object FAQ Version 1.0.9 (04-02) Part 3/13, Apr. 3, 1996, Retrieved on Apr. 5, 2009 from http://209.85.173.132/search?q=cache:c3iJxZca3aUJ:www.faqs.org/faqs/object-faq/part3/+DEC%27s+ObjectBroker+Service&cd=9&hl=en&ct=clnk&g_ZZZ, WBX230.

"Easel Corporation Introduces Comprehensive Program for Expanding Object Technology Expertise", Mar. 13, 1995, Business Wire, Retrieved on Apr. 5, 2009 from http://209.85.173.132/search?q=cache:McscjZC2srEJ:findarticles.com/p/articles/mi_m0EIN/ is_1995_Marc_ZZZ, WBX231.

"Internet Information Commerce: The First Virtual (TM) Approach", Jul. 1995, Proceedings of the First USENIX Workshop on Electronic Commerce, New York, New York, Retrieved on Apr. 5, 2009 from http://www.usenix.org/publications/library/proceedings/ec95/f_ZZZ, WBX232.

"O'Reilly Releases Website (TM) Web Server for Windows NT", WebView, EIT (Enterprise Integration Technologies), May 12, 1995, vol. 7 : Issue 41, ISSN 1004-042X, Computer underground Digest, Retrieved on Apr. 5, 2009 from http://cu-digest.org/CUDS7/cud74_ZZZ, WBX233.

"RSA and EIT Joint Venture Will Make Internet Transactions Secure", Terisa Systems, EIT and RSA: Secure HTTP, Jun. 13, 1994, Retrieved on Apr. 5, 2009 from http://1997.webhistory.org/www.lists/www-talk.1994q2/0980.html, WBX234.

"CommerceNet The First Large-Scale Market Trial of Electronic Commerce on the Internet" EIT: CommerceNet, Aug. 3, 1994, Proceedings of the May 1994, Ties That Bind: Building Community Networks conference, Retrieved on Apr. 5, 2009 from http://internet.eser_ZZZ, WBX235.
Rubin, A., "IETF—Stockholm meeting" NetCheck: E-signatures, Aug. 5, 1995, pp. 1-2, CIPHER, Newsletter of the IEEE Computer Society's TC on Security and PrivacyElectronic, Issue 8, Retrieved on Apr. 5, 2009 from http://www.ieee-security.org/Cipher/PastIssu_ZZZ, WBX236.
Open Market, "FastCGI:A High-Performance Web Server Interface", Apr. 1996, Retrieved on Apr. 5, 2009 from http://www.fastcgi.com/devkit/doc/fastcgi-whitepaper/fastcgi.htm, WBX237.
Sun Microsystems, "HotJava", Wikipedia, the free encyclopedia, Jun. 1995, Retrieved on Apr. 5, 2009 from http://en.wikipedia.org/wiki/HotJava, WBX238.
W3C Status Codes, HTRESP_html_w3_org, 1992 WBX239.
Hewlett Packard, "HP Odapter/OpenODB", Jul. 1994, Retrieved on Apr. 5, 2009 from http://web.bilkent.edu.tr/Online/oofaq/oo-faq-S-8.13.0.5.html, WBX240.
Internet Shopping Network_ISN Business Newswire (1995) WBX241.
NCR Co-operative Frameworks 3, (1993) WBX242.
Distributed Objects Everywhere, NEO, Wikipedia (1996) WBX243.
NetMarket (1996) WBX244.
Enterprise Object Netorks, Wikipedia (1996) WBX245.
OMG Document No. 91_12_1 Revision 1_1 (1997) WBX246.
DigiCash Smartcards (1997) WBX247.
IBM System Object Model_SOM (1998) WBX248.
IBM System Object Model_SOM,DSOM (1998) WBX249.
Open Market StoreBuilder (1995) WBX250.
WebXpress Web StoreFront (1996) WBX251.
PNC, Industry.Net do eCommerce (1996) WBX252.
10KPowerShip,PowerPartner (1996) WBX253.
T. Berners Lee Hypertext Mark up Language RFC1866(1995) WBX 254.
E. Nebel RFC1867 (1995) WEBX255.
RFC1942 (1996) WEBX256.
J. Seidman RFC1980 (1996) WBX257.
HTML—Wikipedia, the free encyclopedia—Notepad (1998) WBX258.
Berners-Lee, T., RFC 1630, "Universal Resource Identifiers in WWW", Network Working Group, CERN, Jun. 1994 WBX259.
Object Broker Service Middleware Sourcebook (1995) WBX260.
Inter Parte Re-Examination U.S. Appl. No. 95/001,129 (2008) WBX261.
6,212,556 Re-exam file history U.S. Appl. No. 90/010,417, filed 2009 WBX262.
U.S. Appl. No. 11/980,185 prosecution history filed 2008, prosecution history as of Mar. 12, 2009 WBX263.
WebX Opening Brief District of Delaware Mar. 23, 2009 WBX264.
U.S. Patent 5,778,178 Re_Examination of 90010346_178 prosecution history through Aug. 20, 2009 WBX267.
WBXexecsummary4809new2bizplan[1] (2009) WBX268.
Kramer, Douglas Java Whitepaper May 1996, WBX500.
09863704 Copy of Response to Non-Final Office Action Jun. 6, 2006, WBX501.
09863704 Copy of Response to Non-Final Office Action Jul. 23, 2008 and Examiner Interview Summaries dated Jul. 2, 2008 and Jul. 16, 2008, WBX502.
09863704 Copy of Response to Non-Final Office Action Aug. 21, 2007, WBX503.
09863704 Copy of Response to Non-Final Office Action Nov. 28, 2008, WBX504.
09863704 Copy of the Final Office Action Apr. 20, 2005, WBX505.
09863704 Copy of the Final Office Action Sep. 8, 2006, WBX506.
09863704 Copy of the Final Office Action Oct. 31, 2007, WBX507.
09863704 Copy of the Non-Final Office Action Feb. 14, 2004, WBX508.
09863704 Copy of the Non-Final Office Action Feb. 23, 2007, WBX509.
09863704 Copy of the Non-Final Office Action Apr. 14, 2008, WBX510.
09863704 Copy of the Non-Final Office Action Sep. 18, 2009, WBX511.
09863704 Copy of the Non-Final Office Action Dec. 6, 2005, WBX512.
09863704 RCE Feb. 1, 2008, WBX513.
09863704 RCE Jun. 30, 2009, WBX514.
09863704 RCE Sep. 22, 2005, WBX515.
09863704 RCE Dec. 8, 2006, WBX516.
11980185 Copy of the Restriction Requirement Oct. 19, 2009, WBX517.
90010417 Determination Re-exam Ordered May 20, 2009, WBX518.
File History of U.S. Patent 5,778,178, WBX519.
File History of U.S. Patent 5,987,500, WBX520.
File History of U.S. Patent 6,212,556, WBX521.
File History of U.S. Patent 7,340,506, WBX522.
Settlement with Allstateby WebXchange (2009), WBX523.
Arunachalam, U.S. Appl. No. 09/863,704_2nd_rule56_disclosure.pdf, Mar. 4, 2009, WBX006.
Arunachalam, U.S. Appl. No. 11/980,185_Duty of Candor Rule 56 Disclosure, Feb. 11, 2009, WBX220.
Arunachalam, U.S. Appl. No. 11/980,185_Duty of Candor Rule 56 Disclosure, Mar. 4, 2009, WBX221.
U.S. Appl. No. 12/628,060, filed Nov. 30, 2009, Arunachalam.
U.S. Appl. No. 12/628,066, filed Nov. 30, 2009, Arunachalam.
U.S. Appl. No. 12/628,068, filed Nov. 30, 2009, Arunachalam.
U.S. Appl. No. 12/628,069, filed Nov. 30, 2009, Arunachalam.
Order, Motion to Bifurcate and for early trial on the Issue of Inequitable Conduct, on Mar. 19, 2009, Dismissal with Prejudice, order dated Dec. 30, 2009, Denied as Moot, Order Granted, signed by JJF, C.A. No. 08-131 (JJF), Allstate Docket #155.
Order, Motion to Bifurcate and for early trial on the Issue of Inequitable Conduct, on Mar. 19, 2009, Dismissal with Prejudice, order dated Dec. 30, 2009, Denied as Moot, C.A. No. 08-132 (JJF) and C.A. No. 08-133 (JJF), Dell Docket #155, signed by JJF, Order, Motion to Bifurcate and for early trial on the Issue of Inequitable Conduct, on Mar. 19, 2009, Dismissal with Prejudice, order dated Dec. 30, 2009, Denied as Moot, C.A. No. 08-132 (JJF) and C.A. No. 08-133 (JJF), Dell Docket #155.
Plaintiff WebXchange Inc.'s Surreply in Opposition to Defendants' Motion to Bifurcate, and for Early Trial on, the Issue of Inequitable Conduct (C.A. No. 08-132 (JJF) and C.A. No. 08-133 (JJF), is Granted Plaintiff's Surreply in Opposition to Defendant's Motion to Bifurcate and for Early Trail on, The Issue on Inequitable Conduct is deemed filed (Entered Dec. 30, 2009), Dell Docket #157.
Dell Inc.'s Second Amended Answer and Counterclaims to WebxChange Inc.'s Original Complaint for Patent Infringement (Entered: Jan. 20, 2010), Dell Docket #164.
Plaintiff WebxChange Inc.'Surreply in Opposition to Defendants' Motion to Bifurcate, and for Early Trial on, The Issue of Inequitable Conduct (Entered Dec. 30, 2009), Fedex Docket #212.
Memorandum Opinion C.A. 08-133-JJF, and C.A. 08-132-JFF (Entered Dec. 30, 2009), Fedex Docket #215.
Defendant's Fedex Corporation, Fedex Kinko's Office & Print Services, Inc., and Fedex Corporate Services, Inc.'s Second Amended Answer, Affirmative Defenses, and Counterclaims to Plaintiff WebXchange, Inc.'s Complaint (Entered Jan. 20, 2010), Fedex Docket #217.

* cited by examiner

```
BEGINCLASS COREBUSINESSOBJECT
BEGINDATA
ENDDATA

BEGINMETHOD
INCLUDE HSKEL
PRIVATE:
# USED BY THE FINITE STATE MACHINE
VIRTUAL VOID FSM_INIT() { }
VOID FSM_ACTION_TIMEOUT(CONST CHAR* TIMEVAL);
VOID FSM_ACTION_THROW(CONST CHAR* MESSAGE);
VOID FSM_ACTION_RETURN(CONST CHAR* RESULT);
VOID FSM_ACTION_SEND(CONST CHAR* VALUE);
PUBLIC:
ENDINCLUDE

# TO CONIFIGURE THE FSM
METHOD      VOID   FSM_LOAD_DOLSIB {STRING FILENAME}
# TO TRIGGER AN EVENT IN THE FSM
METHOD      VOID   FSM_EVENT    {STRING NAME} {STRING VALUE}
METHOD      STRING FSM_RESULT
# TO SET/GET VARIABLES FROM FSM
METHOD      VOID FSM_SET_STRING {STRING NAME} {STRING VALUE}
METHOD CONST STRING FSM_GET_STRING {STRING  NAME}
METHOD      VOID   FSM_SET_INTEGER {STRING NAME} {INT VALUE}
METHOD CONST INT   FSM_GET_INTEGER {STRING NAME}
ENDMETHOD

ENDCLASS
```

FIG. 27

NETWORK TRANSACTION PORTAL TO CONTROL MULTI-SERVICE PROVIDER TRANSACTIONS

This application is a continuation in part of application Ser. No. 09/792,323 filed Feb. 23, 2001, now U.S. Pat. No. 7,340,506, which was a continuation-in-part of application Ser. No. 08/879,958 filed Jun. 20, 1997, now U.S. Pat. No. 5,987,500 which was a divisional of application Ser. No. 08/700,726 filed Aug. 5, 1996, now U.S. Pat. No. 5,778,178 which was related to and claimed priority from U.S. provisional patent application No. 60/006,634 filed Nov. 13, 1995. This application is related to and claims priority from U.S. provisional patent application No. 60/206,422 filed May 23, 2000, application Ser. Nos. 09/792,323;08/879,958; 08/700,726; 60/006,634; and 60/206,422 are hereby incorporated by reference. U.S. Pat. Nos. 5,987,500; 5,778,178, 7,340,506 and sister U.S. Pat. No. 6,212,556 are also hereby incorporated by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to performing transactions on a network. More particularly, the invention relates to a system and method for controlling a transaction involving multiple service providers.

2. Background Information

The Internet and the World Wide Web, hereinafter referred to as the web, provide a viable medium for electronic commerce and on-line services, however current systems and methods for using the Internet and the Web are extremely limited. In particular, current uses are limited to either browse-only interactions or simple "deferred" purchases involving a single service provider.

FIG. 1 conceptually illustrates a prior art use 100 of the Internet and the web. A user 105 accesses a car dealer web server 155 associated with a car dealer 150 over the Internet 130 via a web browser 110. Web browser 110 is software that runs on a computer system and provides a simple user interface to allow access to web servers via the web. In particular, the user 105 may input a uniform resource locator (URL), such as http://www.cars.com, which the web browser 110 communicates to the Internet 130 and which corresponds to an IP address 120 that uniquely locates the car dealer web server 155 and a web page 160. The user 105 may view the web page 160 and then leave, which amounts to a simple browse-only interaction.

Alternatively, the user 105 may make a limited, deferred purchase of a car from the car dealer 150 and involving only the car dealer 150. For example, the user 105 may fill out a form on car dealer web page 160 and email the form to car dealer web server 155. After receiving the form, the car dealer web server 155 may perform some processing of the form, and then send it through a gateway 170 towards applications 175 that perform further purchase processing and read and write data 180 such as to a legacy database. The applications 175 and the data 180 are not directly connected to the Internet or the web and are not available to other entities connected to the Internet. Typically, the car dealer 150 alone may access the applications 175 and the data 180, and typically this is via a complicated and customized procedure. The actual purchase is deferred until the email is received, read by a person or system, and purchase processing is performed by a person or the applications 175 and data 180. Thus, the purchase is not performed in real-time and involves only the car dealer 150.

The user 105 may also select a bank hyperlink 165 embedded in web page 160. The bank hyperlink 165 causes the web browser 110 to connect to bank web server 192 presenting bank web page 194 via hyperlink address 165. This may allow the user 105 to browse bank web page 192 to obtain information about obtaining a loan, however, the association between the car dealer 150 and the bank 190 is a limited one involving the car dealer 150 only providing easy access to bank information via the bank hyperlink 165. Unfortunately, there is no cooperation or interaction between the car dealer 150 and the bank 190 besides the hyperlink 165. In fact, the hyperlink 165 disconnects the user from car dealer web server 155 and web page 160 and connects the user with bank web server 192 and bank web page 194. This lack of cooperation, control, and interaction greatly limits the services that may be provided by the web.

FIG. 2 conceptually illustrates a user 205 and a bank web server 250 interacting dynamically through the use of Common Gateway Interface (CGI) applications. The user 205 accesses the bank web server 250 via a web browser 210 to attempt to obtain information on a checking account and a loan account. The bank web server 250 includes a CGI interface 252 to a checking application 254 and a CGI interface 256 to a loan application 258 that interact with checking data 272 and loan data, respectively, in a database 270. CGI allows the bank web server 250 to transfer data to the checking application 254 and the loan application 258 that can then perform processing on the data. By way of example, the user 205 may enter a checking account identification number in an HTML form provided by the bank web server 250, and the server 250 may communicate the checking account identification number to checking application 254 that uses CGI to look up the user checking account in the database 270 and format the checking account data 272 as an HTML page that may be presented to the user 205.

However, the CGI interaction is severely limited because each CGI application must be customized for a particular type of application or service. That is, different CGI application would have to be created for each service provided by the bank. For this reason, creating and managing individual CGI scripts for each service is not a viable solution for merchants with a large number of services.

As the Web expands and electronic commerce becomes more desirable, the need increases for robust, real-time, bi-directional transactional capabilities on the Web. A true real-time, bi-directional transaction would allow a user to connect to a variety of services on the web, and perform real-time transactions on those services. For example, although user 100 can browse car dealer Web page 105 today, the user cannot purchase the car, negotiate a car loan or perform other types of real-time, two-way transactions that he can perform with a live salesperson at the car dealership.

Ideally, user 100 in FIG. 1A would be able to access car dealer Web page 105, select specific transactions that he desires to perform, such as purchase a car, and perform the purchase in real-time, with two-way interaction capabilities. CGI applications provide user 100 with a limited ability for two-way interaction with car dealer Web page 105, but due to the lack of interaction and management between the car dealer and the bank, he will not be able to obtain a loan and complete the purchase of the car via a CGI application. The ability to complete robust real-time, two-way transactions is thus not truly available on the web today.

In order to provide sophisticated and useful services over the web, it is desirable to control and manage cooperation and interaction among a plurality of service providers that each contribute to the transaction. This goal is constrained by the prior art systems and methods for using the Internet, which do not control or manage multi-service provider transactions and which do not permit sophisticated and useful joint service offerings.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

FIG. 27 conceptually illustrates code of a CoreBusinessObject, according to one embodiment.

DETAILED DESCRIPTION OF THE INVENTION

A method and apparatus are described for performing transactions involving multiple service providers over a service network. Broadly stated, embodiments of the present invention seek to maintain control over the transaction including controllably and selectively routing to and involving service providers in the transaction. According to one embodiment, this may include a network transactional application including control and routing software objects and distributed remote software objects to interface with the network transactional application and perform controlled transactions. Advantageously, this may allow sophisticated, real-time, multi-service provider transactions to be performed while allowing one entity (e.g., a context owner) to control the transaction.

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
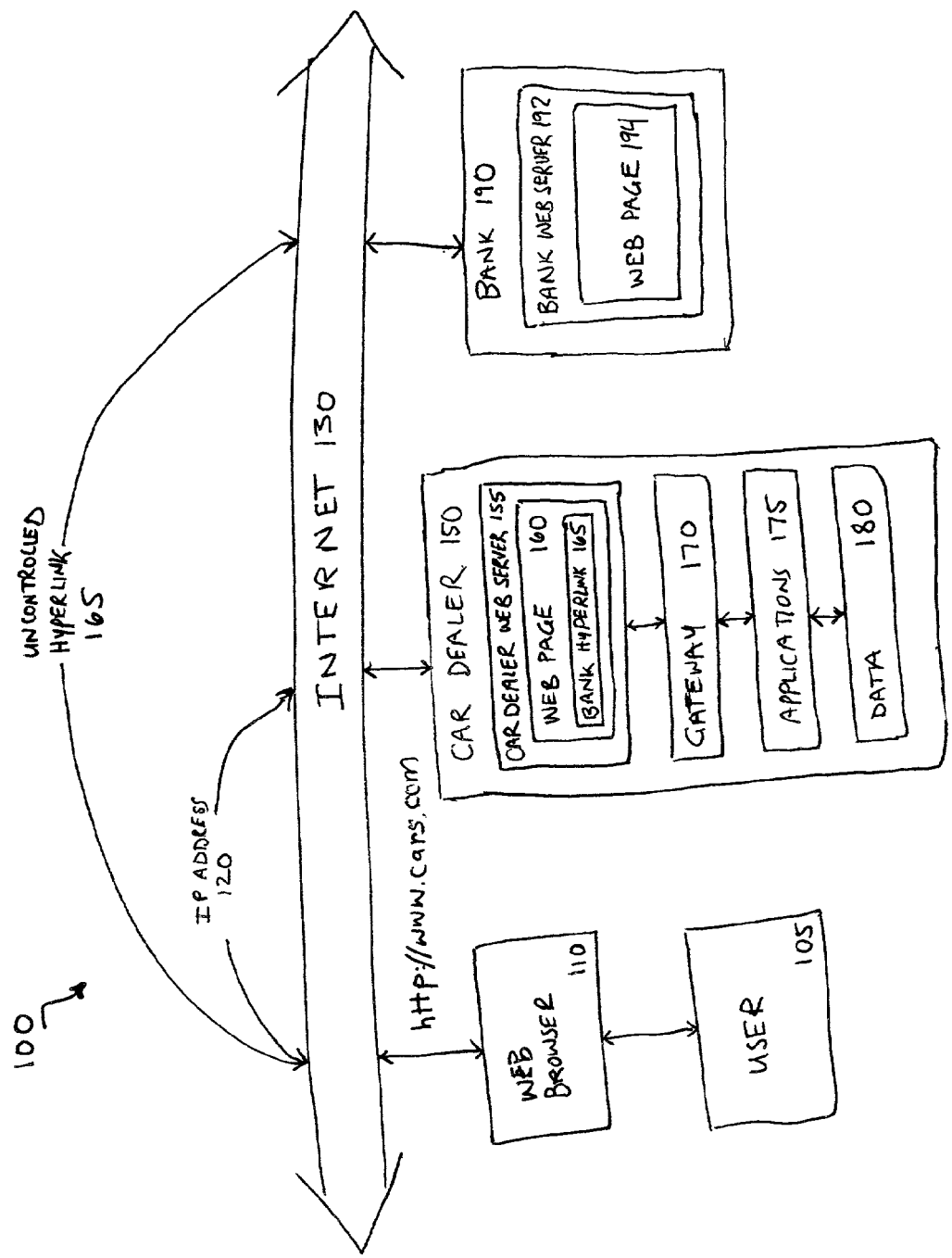
FIG. 1 conceptually illustrates prior art uses of the Internet.
Figure 2:
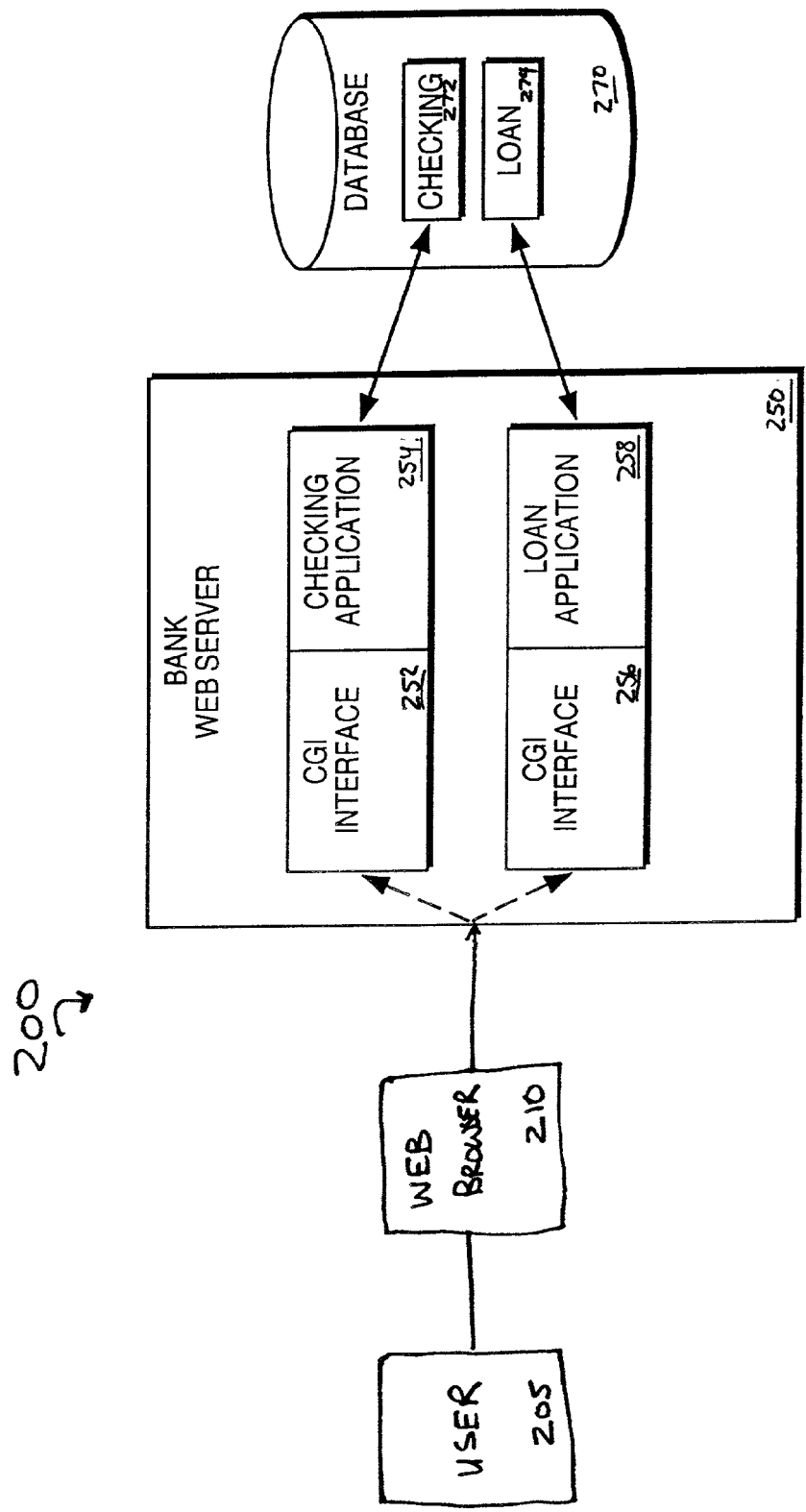
FIG. 2 conceptually illustrates prior art uses of CGI applications to provide a dynamic interaction between a user and a web server.
Figure 3:
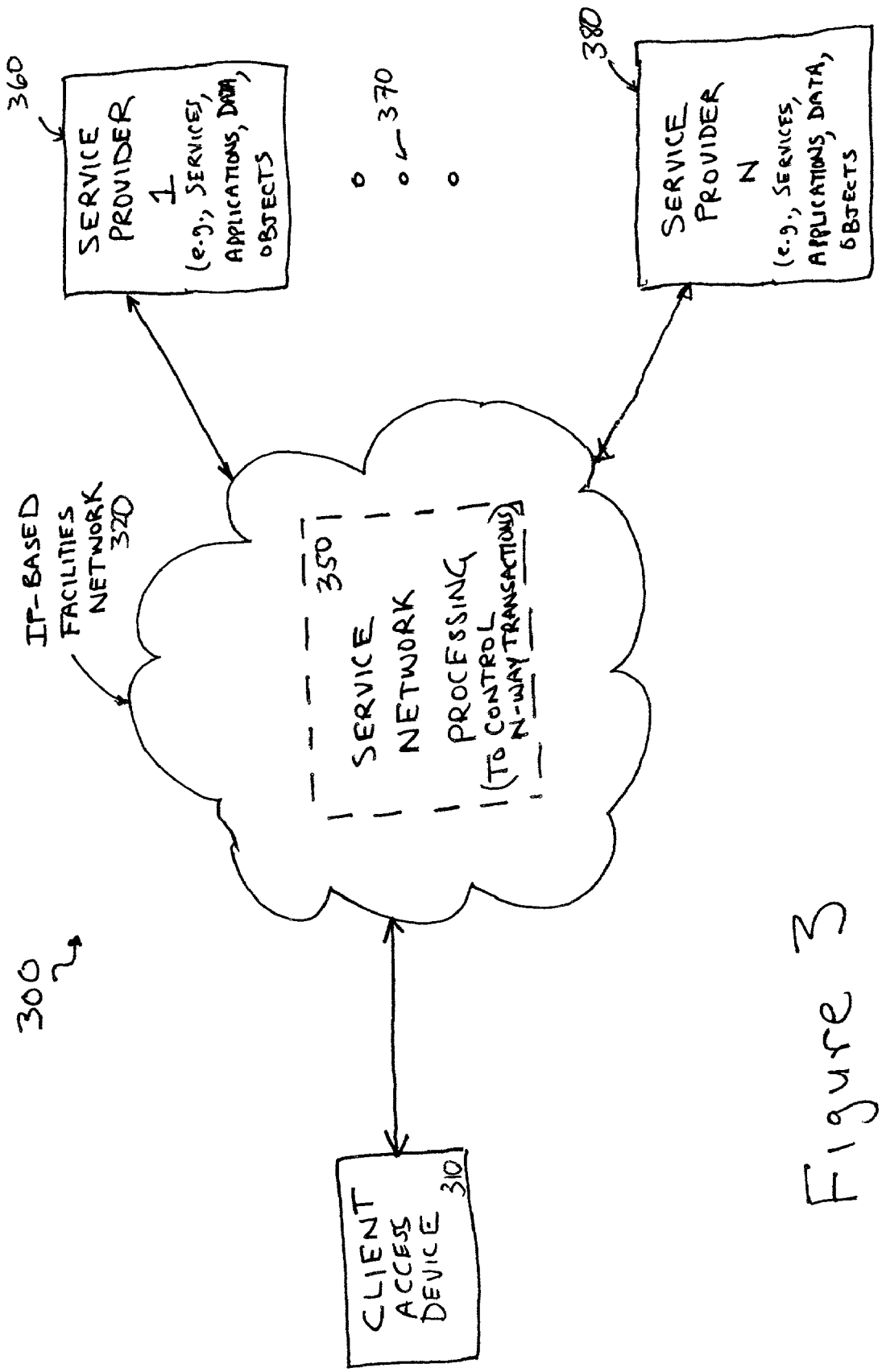
FIG. 3 conceptually illustrates a system that includes service network processing to allow a transaction involving multiple service providers, according to one embodiment of the invention.

FIG. 3 conceptually illustrates a system 300, according to one embodiment, that includes service network processing that allows a controlled transaction involving a plurality of networked service providers to be performed. A client access device 310 connects to, accesses, or otherwise communicates with a facilities network 320 that contains service network processing 350. The term "client access device" will be used to broadly refer to a device to access the facilities network and may be a computer system, a computer system with a web browser, a personal digital assistant, a mobile end point, a cellular device (e.g., a cell phone), a screen phone, a pager, a home appliance (e.g., a TV, VCR, etc.), a remote control device to a TV or VCR, an ATM machine, a cash register, and other devices.

The client access device 310 may access the facilities network and the service network via server "switching" sites or corresponding appropriate non-web switching sites such as cellular provider sites. For example, a cell phone may access a cell site where resides a computer system having an IP address and a functional connection to a hub either on that computer system or on a connected computer system.

The facilities network may be any suitable facilities network or combination of potentially heterogeneous facilities networks, including an IP-based network, a TCP/IP-based network, the Internet, the web, a non-web network, an email network, Integrated Services Digital Network (ISDN), Asynchronous Transfer Mode (ATM), Personal Communications Services (PCS), X.25, Ethernet, frame relay, token ring, Fiber Distributed Data Interface (FDDI), Community Antenna TV (CATV), an intelligent network, a public-switched network, a public-switched telephone network, a plain old telephone system (POTS) network, a private switched network, a wireless network, a cellular network, private/leased lines, an intranet, a private enterprise network, or another network suitable for supporting a service network such as those described in the present specification. For example, the client access device 310 may connect to the facilities network via a wire, cable, cellular, or PCS connection, service provider 1 360 may connect via a T1 connection, service provider N 380 may connect via a T3 connection, and service provider N 380 may additionally have an ATM/Sonet or Frame Relay/T3 connection to a branch office to perform processing.

The service network processing 350 is functionally interposed between the client access device 310 and multiple service providers and associated software that provides services to the client access device 310. According to one embodiment, the service network processing 350 provides a network transactional application that provides an overlay service network that operates on and runs on the facilities network 320. The network transactional application may provide the service network according to an N-tier manager-agent model that achieves N-way communication by using a value-added network (VAN) switch or object router that resides at the transaction network entry point to route to software residing at remote service provider nodes. The network application may use an N-way interactive object router to provide the link between the clients and the service providers. The service network may provide access to a myriad of network services such as selling of products (e.g., books) and services (e.g., shipping, pizzas delivery), banking, trading (e.g., stocks), advertising, customer service, bill management, and others.

The service network processing 350 may include transactional control and management software to control and manage one or more transactions involving the client access device 310 and any number of service providers that are desired for the particular transaction. Control and management may include establishing a connection or link (e.g., a line, channel, or thread over which data may be communicated) to service providers, making requests, activating or configuring transactional applications, receiving results, de-establishing connections with service providers, fault-handling, monitoring performance, monitoring transactions, monitoring client activity and service provider activity (e.g., to support accounting and billing policies of the service network), collecting statistics, security processing, address processing to uniquely address and identify network locations and objects by a unique network address, routing processing to uniquely identify, retrieve, and route dynamically changing information and software objects using multi-media, object routing, and others. According to one embodiment, management includes distributed control of Events, Configuration, Accounting, Performance, and Security (ECAPS). By way of example, events may include responding to specific occurrences on the network, configuration may include managing the connections that exist within the network, accounting may include measuring and recording network transaction activities, performance may include monitoring and maintaining network performance standards, and security may include enabling connection and transaction privacy.

The service network processing 350 may support industry-standard web browsers (e.g., Internet Explorer available from Microsoft Corporation of Redmond Wash.), web servers, security protocols, and connect to applications and middleware, including both legacy and relational database management systems (RDBMSs). In an embodiment where the service network 350 operates over the Internet, the service network 350 may comply with open Internet standards and protocols.

According to various embodiments, the network processing 350 may be distributed between a hub and a plurality of nodes each associated with a service provider. The term "hub" will broadly be used to refer to one or more functionally coupled computer systems (e.g., a web server server) that provide software and methods to control a transaction or service involving multiple service providers. The hub may be considered as a portal or gateway into the service network that provides selective and controlled access into the service network to computer systems and methods associated with service providers of the network. The term "node" will broadly be used to refer to one or more functionally coupled computer systems that provide service methods under the control of the hub. Thus, the service network 350 may extend to software, objects, and methods at the service providers 360, 370, and 380, as will be explained in more detail elsewhere. According to one embodiment, links from the client access device 310 to such software, objects, and methods is via the hub.

According to certain embodiments the hub includes a router to route to and establish links to software objects at nodes. The term "router" will broadly be used to refer to software to create or allow a link to potentially remote and geographically distributed software. In one embodiment, the router is an object router that uses objects and class information rather than unrelated functions and data. For example, in one specific embodiment, the object router provides two types of a class, namely a skeleton that is the functionality of the object and its stub that allows remote access to the same object. Typically the stub is located on one computer system, such as a client computer system or a hub computer system and the skeleton is located on a different remote and geographically distributed computer system associated with a service provider, a user to specify functions to be executed remotely. According to one embodiment, the object router is part of a value-added network transactional application and resides at the network entry point (e.g., the hub) to provide an N-way interactive link to other software that resides at remote and geographically distributed IP nodes. Specific exemplary embodiments of hubs, nodes, routers, object routers, and objects will be discussed elsewhere, although other embodiments are contemplated.

The term "service provider" will be broadly used to refer to a network-connected entity or presence, such as a business, merchant, organization, administration, networked user, or other provider that provides or participates in a service associated with the service network. Typically, the service provider participates in joint services involving multiple service providers. The multiple service providers may include a service provider 1 360, a service provider N 380, and optionally any number of additional service providers 370. Accordingly, the total of service providers may be any integer number of service providers. The service providers 360, 380 may be any service providers suitable for the intended service network, including merchants and businesses that desire to provide their products and/or services to a client associated with the client access device 310. For example, the service providers may be businesses that provide web servers, web pages, transactional applications to sell products or services, and data to facilitate the transaction. The multiple service providers may also include other client access devices similar to client access device 310. For example, client access device 310 may obtain services that involve other client access devices, such as in a service network incorporating features similar to those in an interactive chat or messaging, an online bartering, an online file-sharing, or other services. The service providers are to be interpreted broadly in the present application and many exemplary service providers will be discussed in the specification, although others are contemplated.

Figure 4:
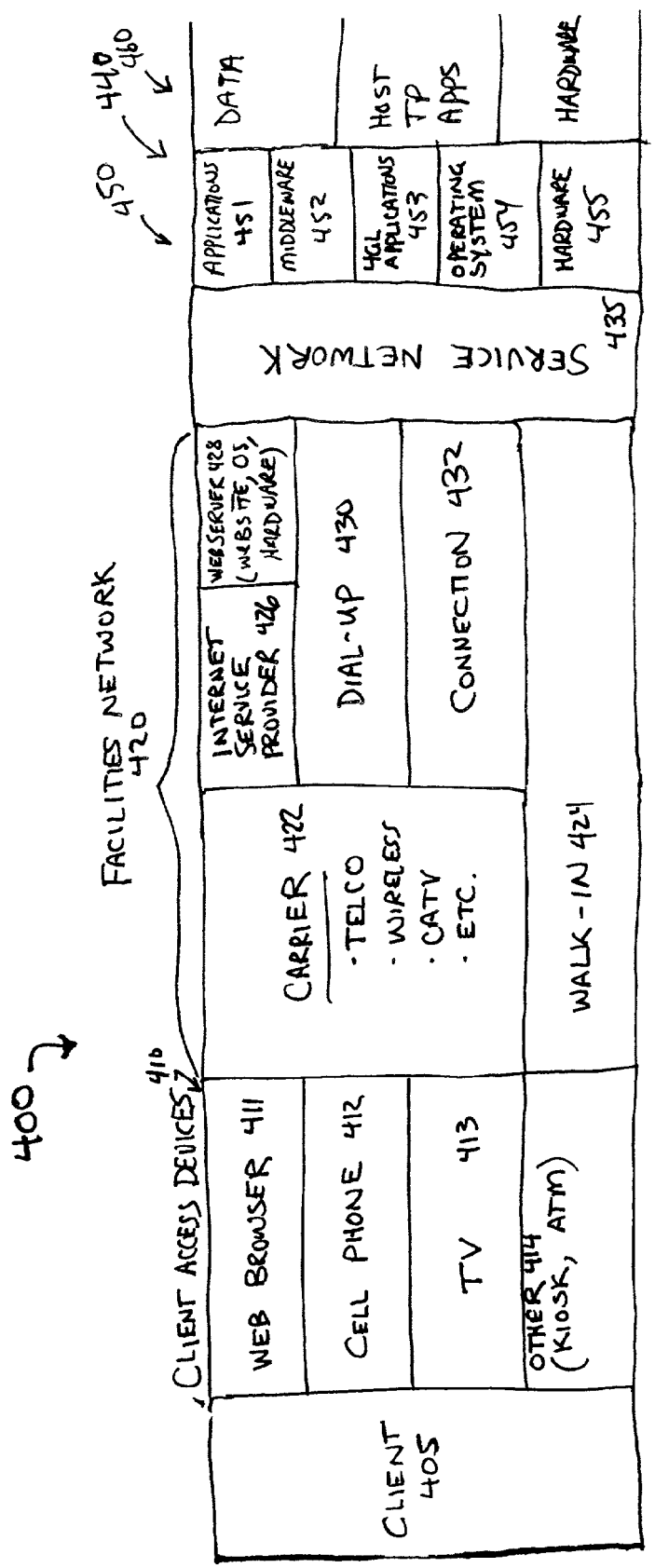
FIG. 4 conceptually illustrates relationships between components of a service network system, according to one embodiment.

FIG. 4 conceptually illustrates a system 400, according to one embodiment, to provide services via a service network. A client 405 uses a client access device 410 such as a web browser 411, a cell phone 412, a television 413 (e.g., web-enabled television, and others), or another client access device 414, such as a kiosk or an ATM machine, to access a facilities network 420. The facilities network may include a carrier network 422 such as one or more of a telco, wireless, CATV, or other carrier network. This may include cables, radio frequency, satellite, fiber optic, and other links. Alternatively, a client or user may walk-in 424 to client access devices such as the kiosk or ATM machine, which may be at a bank, a store, a mall, or another public place. In the case of a web browser access device, connecting to the facilities network may include connecting to an Internet service provider 426 to obtain access to a web server 428 offering a web page. In the case of a cell phone access device 412, connecting to the facilities network may include a dial-up connection 430. In the case of a television access device 413, accessing the network may include using buttons on the television or on a remote control along with optional list or menu options to connect to the facilities network 432. In the case of a kiosk or ATM device, a client or user may interact with the kiosk or ATM device, that may either connect to the facilities network or already be connected to the facilities network.

After accessing the facilities network, the client access device 410 may access or utilize the service network 435. This may be done in a way compatible with the client access device 410 and the service network 435. For example, a web browser access device 411 may request to access the service network to obtain one or more services by communicating a request to connect to a web server and web page based on data input into a computer system by a client or user. Alternatively, a cell phone access device 412 may access the service network by entering a phone number associated with the service network 435 into the cell phone access device 412, which automatically connects to the facilities network 420 and the service network 435, which may be a call center providing interactive voice response (IVR).

The service network 435 may selectively and controllably manage the connection to and use of service provider hardware and software 440, which may be by direct connection 450 or by indirect connection 460 with the service network 435. As shown, applications 451, middleware 452, 4GL applications 453, operating systems 454, and hardware 455 may be directly connected to the service network 450. Typically data 462 (e.g., enterprise data), host TP applications 464, and other hardware 466 (e.g., printers, faxes, etc.) will be indirectly connected to the service network 460, such as via the applications 451, or middleware 452.

Figure 5:
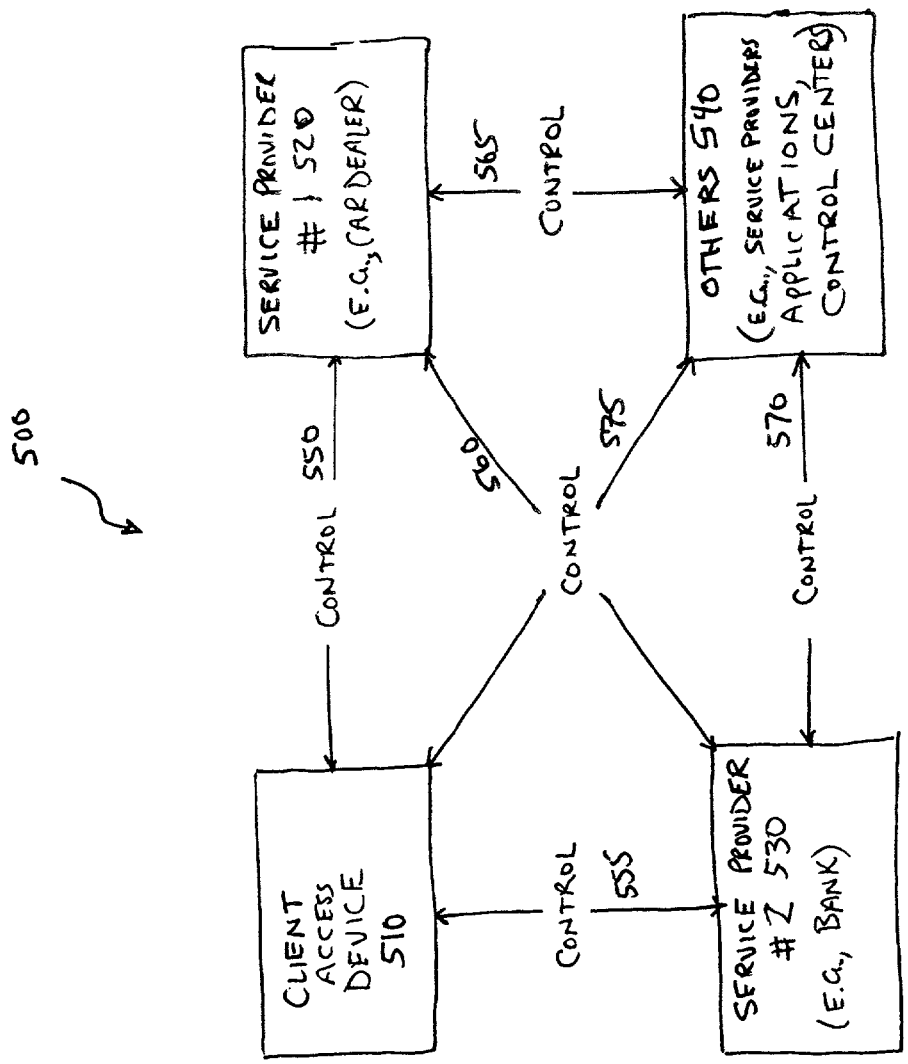
FIG. 5 conceptually illustrates a service network that allows controlled, sophisticated, interactive, "any-to-any", real-time, services to be provided by multiple service providers, according to one embodiment.

FIG. 5 conceptually illustrates a service network 500 that allows controlled, sophisticated, interactive, "any-to-any", real-time, services to be provided by multiple service providers. A client access device 510 connects with the service network and then receives a service involving cooperation between a service provider #1 520, a service provider #2 530, and optionally any desired number of additional service providers 540. The client access device 510 may bi-directionally communicate and interact with the service provider #1 520 by link 550. Likewise, the access device 510 may interact with the service provider #2 via link 555. As shown by link 560, the service provider #1 and service provider #2 may also interact directly, rather than via the client access device 510. Links 565, 570, 575 may also be provided when one or more other service providers 540 are desired.

Without loss of generality to other services and transactions, and to illustrate the advantages provided by the service network, consider an exemplary multi-provider service involving a client access device 510 purchasing a car from car dealer presence 520 by obtaining a loan for the amount of the car from bank presence 530 and insurance for the car from insurance provider 540. The client access device 510 first determines the amount of the car from car dealer presence 520 and indicates a desire to purchase the car for the amount by obtaining a loan from bank presence 530.

Then, the service network automatically establishes a controlled link 560 with bank presence 530. Advantageously, this may be done without losing connection to and communication with car dealer presence 520. Then, bank presence 530 establishes a controlled link 555 with access device 510 to obtain data to process the loan. After bank presence 530 approves the loan it may verify the loan to the client via controlled link 555 and to the car dealer presence 520 via controlled link 560.

The car dealer presence 520 may then connect with an insurance provider 540 via controlled link 565 to advertise an insurance policy to client access device 510 via controlled link 575 and receive an acceptance of the policy via controlled link 575. The insurance provider 540 after processing the insurance policy may provide verification to the client via controlled link 575 and to the car dealer presence via controlled link 565. The car dealer presence 520 may then send a complete transaction verification and summary to the client access device 510 via controlled link 550 to finalize the particular transaction.

As discussed, the transaction involves interactions between the client access device 510 and multiple service providers 520, 530, 540 under the control of the service network. Advantageously, this allows collaborative and cooperative transactions and interactions that are not possible in prior art approaches. In this way, transactions are not limited to two-way transactions involving a client access device and a single service provider, but are flexible to include three-way, four-way, or N-way transactions and interactions involving any desired number of service providers and the client access device. According to one aspect of the present invention, predetermined strategies involving collaboration and cooperation among service providers may be devised to incorporate N service providers, where N is any desired integer number of service providers that have agreed to collaborate and cooperate to provide the services. Thus, according to one embodiment, the service network may allow for service transactions involving "any-to-any" communication and interaction, thus facilitating a large, flexible variety of robust, real-time transactions on the network.

Figure 6:
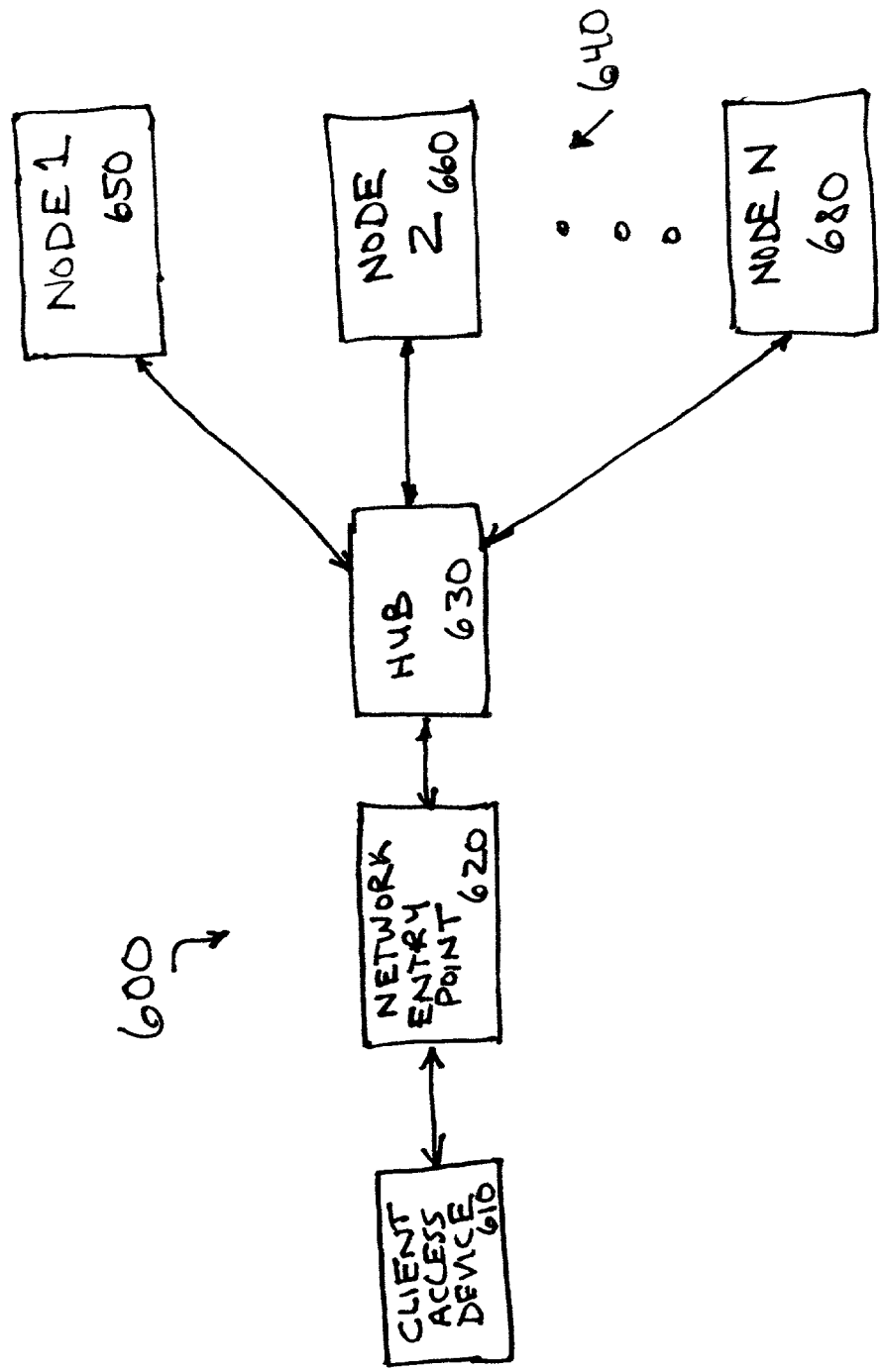
FIG. 6 conceptually illustrates a hub-controlled service network 600, according to one embodiment.

FIG. 6 shows a hub-controlled service network 600, according to one embodiment. A client access device 610 accesses a service network via a network entry point 620. The network entry point 620 will typically correspond to and be compatible with the client access device 610. Thus, depending on the access device 610, the network entry point 620 may be provided by the web, a web page, a hyperlink, an application, a call center, a cell site, a TV Head-End Station, or others. For example, for a web-based access device, the network entry point 620 may be provided by a web page (e.g., a web page hyperlink), an application running on the client access device (e.g., a Java Applet running in a web browser), while for a cellular access device, the network entry point 620 may be provided by a phone number to a call center.

The network entry point 620 allows connection with a hub 630. The hub 630 may serve as a service network control center or network operator to configure, provision, control and manage access to and services provided by multiple potentially geographically distributed service nodes that provide networked services to clients or subscribers. Advantageously, this allows control and customization of the class and level of service provided over the network by the service control nodes.

Typically, the hub 630 includes software to control and manage transactions over the service network. According to one embodiment, the hub may assist with providing the network entry point 620 and access to point-of-service applications by providing software such as Java applets or ActiveX controls. The hub 630 may also include multi-protocol value-added network switching software to switch between remote service provider nodes and routing software to perform controlled routing electronic transactional documents, components, objects, or data, in a form that may be received and interpreted by computer systems, applications, hardware, and other networked components associated with the service providers. The hub 630 may also track and store data such as transaction statistics.

The hub 630 may access a plurality of nodes 640. As shown, the plurality of nodes include a node 1 650, a node 2, optionally any desired number of additional nodes 670, and a node N 680. The node N 680 may represent any desired number of nodes. Typically, each node will be associated with at least one service provider. In one case, a service provider may provide its services through a logical plurality of nodes based on access device, service or product offering, other service providers, and for other reasons. By way of example, a service provider may provide one node for web-based access, one node for cellular access, one node for each major service or product line, one node for business partners, one node for employees, and for other reasons. Additionally, multiple service providers may share a common node. For example, the car dealer and the bank may decide to share a common node.

Each node may serve as a gateway, portal, or entry point into a private or enterprise network of the service provider. The node may provide selective access to service related resources of the service provider such as applications, data, hardware, personal, and other resources. The node may act as a service agent and management station for the service provider. It may also provide a channel interface to back-office transaction processing applications.

According to one embodiment, the hub 630 and the nodes 640 contain software to control and manage a plurality of distributed service and application software objects or components. The term "objects" will be used to refer to separable software objects capable of being distributed over a network and operated remotely. The objects may be object-oriented software objects based on object class. They may be objects conforming to standards and models, such as the Component Object Model (COM), Object Linking and Embedding (OLE), ActiveX, Distributed COM (DCOM), System Object Model (SOM), Distributed SOM (DSOM), Common Object Request Broker Architecture (CORBA), Distributed interNet Applications Architecture (DNA), COM+, Java-based components, and others. For purposes of illustration, and without limitation, a COM object may have a "published" unvarying interface that exposes its service or business functionalities and the parameters it accepts, and the COM object may be accessed in a distributed computing environment by a COM-compliant service application to use its functionalities to deliver services or transactions to a client. Thus, the hub 630 and/or the nodes 640 may provide "component-oriented middleware" that controls and manages potentially distributed components to create distributed applications and provide the service network. The middleware may include management instructions to use the components to deal with transactions, component packaging, and state management. Typically, the hub 630 will contain software to intelligently switch to, route to, configure, provision, track, manage, and control the objects or components. Such an architecture may be well suited to a high throughput transactional environment.

According to one embodiment, the node uses an intelligent state management engine such as a Distributed Online Service Information Base (DOLSIB) to store and access transaction management information. DOLSIBs will be described in more detail elsewhere in the specification. The node may use the intelligent state management engine or DOLSIB to automatically create the associations between the clients screen elements and the service objects routed to the service control nodes. Each node may have a separate DOLSIB, according to one embodiment.

According to one embodiment, software for the hubs and nodes may be provided as shrink-wrapped software packages. The context owners and service providers may then obtain these software packages, input business and management objects into the DOLSIB, and create or join service networks.

Context Owners

According to one embodiment, a context owner may provide the hub. The term "context owner" will be used to refer to a service provider that provides a service network of other service providers. In one case, the context owner may use the hub and nodes to provide a virtual private network of itself and other service providers that provide an end-to-end value-added service or transaction. In this case, the hub may be located at the context owners web server, web site, or call center and the nodes may be located at the entry point into private enterprise networks of the other service providers. Advantageously, context providers may use the distributed control and management provided by the hub and nodes to provide control and management-added value to their service offerings.

Another type of context provider provides a service network of predetermined service providers associated with a multitude of transactional and service categories, any one of which may be selected and performed on the service network. For example, the context owner may be a dynamic yellow page provider resembling a search engine with the additional advantageous capability of being able to initiate a service transaction based on a search and involve a plurality of additional predetermined service providers in the transaction to add overall value to the transaction. In this way, a user of the dynamic transactional yellow pages may search for car dealers using the dynamic transactional yellow pages (e.g., search engine), locate a predetermined car dealer of the service network, be automatically connected with one of another predetermined banks of the service network, and be connected with a selectable one of another predetermined number of insurance providers of the service network.

Alternatively, the context owner may be another context owner, such as a network service operators (e.g., AT&T, Sprint, MCI), an Internet service provider (e.g., AOL, UUNet, Netcom, PSINet), a portals (e.g., AOL, Yahoo!, CNET, enterprise portals), a virtual malls (e.g., Priceline, Shop@aol, ToysRUs.com), an e-marketplaces (e.g., Commerce One, Ariba), a direct merchant service (e.g., Bank of America, Fidelity, Vanguard, LL Bean, Amazon.com), an ASP (e.g., MGM/Blockbuster), an Internet brokerage firm (e.g., E*trade, Fidelity Investments), an extranet context owner (e.g., insurance industry, underwriters), an intranet context owner (e.g., a payroll processing center for a Fortune 1000 company connecting multiple departments and banks for timecard input, payroll deductions/withholding adjustments), a search engine (e.g., Yahoo!), and others.

Figure 7:
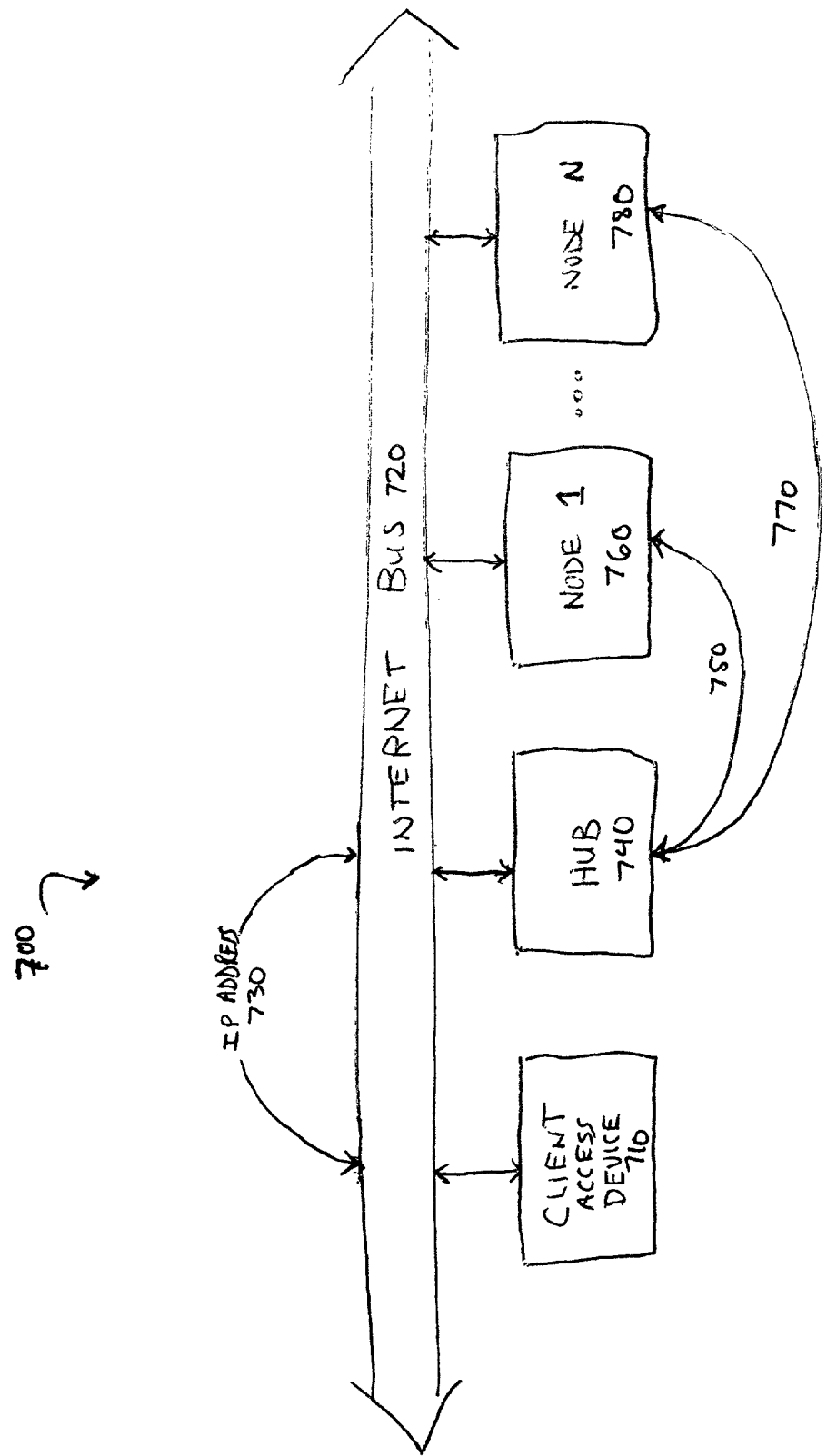
FIG. 7 conceptually illustrates a service network system showing a hub creating controlled links to multiple nodes, according to one embodiment.

FIG. 7 shows conceptually illustrates a service network system showing a hub creating controlled links to multiple nodes, according to one embodiment. A client access device 710 accesses the Internet 720 and uses an IP address 730 to access a hub 740. By way of example, without limitation, the client requests or indicates to receive a service that involves interaction with node 1 760. The hub 740 is functionally interposed between the client access device 710 and node 1 760 and establishes link 750 to node 1 760. According to one embodiment, the link 750 is a controlled link that is controlled by the hub and supported or carried by the Internet 720 based on a predetermined IP address associated with node 1 760. After, simultaneously with, or before accessing the node 1 760, the hub establishes link 770 to node N 780 that is also associated with the service. The link 770 may be carried by the Internet 720 and based on a predetermined IP address, or may be carried on another facilities network typically compatible with client access device 710 if data entry by the client is needed, but this may not be necessary if only interaction with hub 740 or node 1 760 is needed by the node N 780 to perform its portion of the service. The link 770 may represent a hop that may be monitored and recorded by the hub 740 so that a hop-based fee may be charged from the node N 780.

Establishing the links 750, 770 are done under the control and management of the hub 740. This compares favorably with prior art approaches which provide hyperlinking and which would not be able to achieve centralized control and management of the service experience of the client access device. Advantageously, in this way, the client access devices service experience may be less like a visitor-center-type experience, such as through yellow pages or a search engine, in which the client is informed of a site and sent away to that site with loss of control over, and more like a supermarket-type experience in which control over the service experience of the client has not been lost, and the service control of the client may be managed, controlled, tracked, and otherwise improved.

Figure 8:
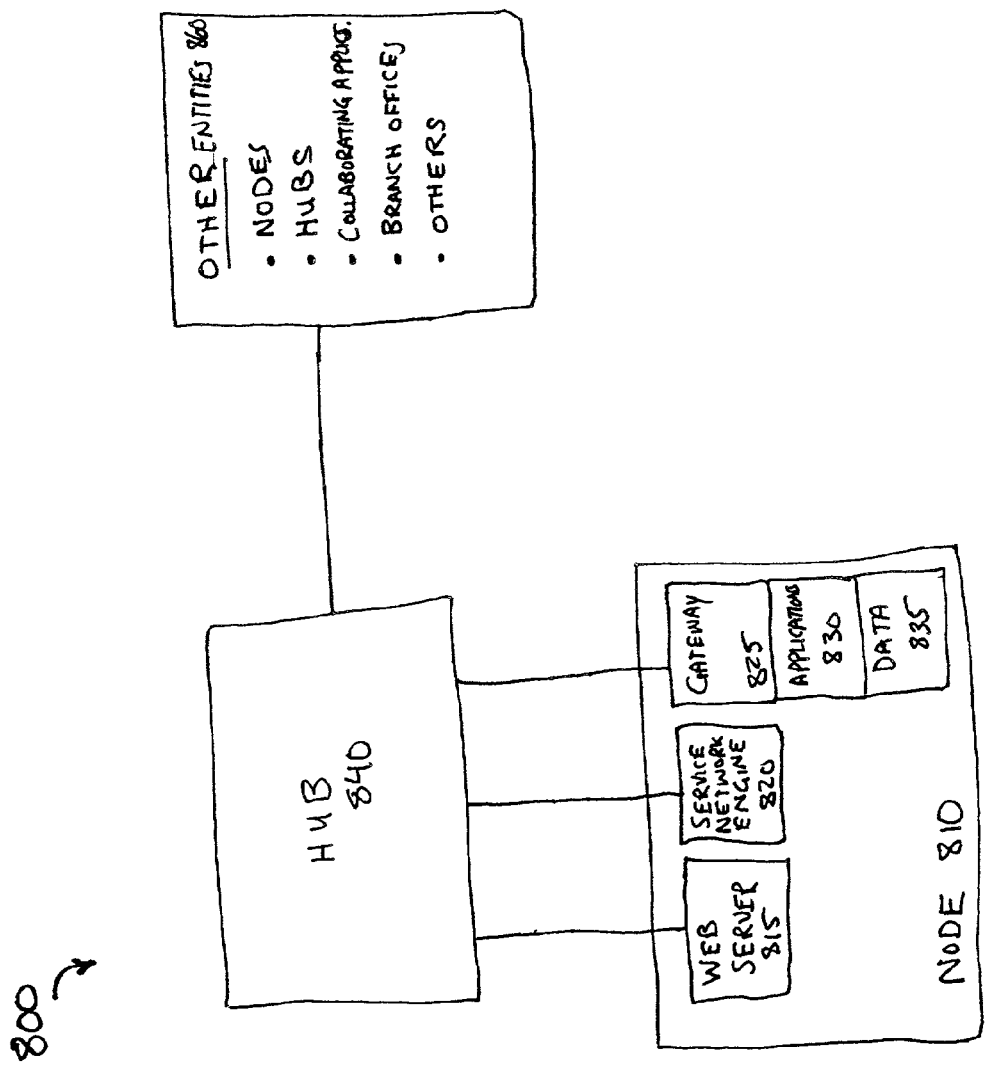
FIG. 8 conceptually illustrates a service network system with an application environment that is connected to the service network.

FIG. 8 shows a service network system 800 in which applications are closely connected to the service network. A node 810 includes a web server 815 a service network engine 820 and a gateway 825 directly connected to a hub 840 and the service network. The service network engine 820 represents node-side software to create and allow for the management of the service network. According to one embodiment, the service network engine 820 is node-side TransWeb™ Exchange software, available from WebXchange of Scotts Valley, Calif. The gateway allows access to applications 830 and data 835. This is in contrast to a prior art approach where the web server alone was directly connected to the Internet and applications were indirectly connected via the web server. The node 810 may access the hub 840 to connect with other service network connected entities 860, such as other nodes (within and between service networks), hubs, collaborating applications (which may be geographically dispersed), branch offices, and others. Thus, there may be hub-to-hub and node-to-node within and between service control centers, depending on the implementation.

Figure 9:
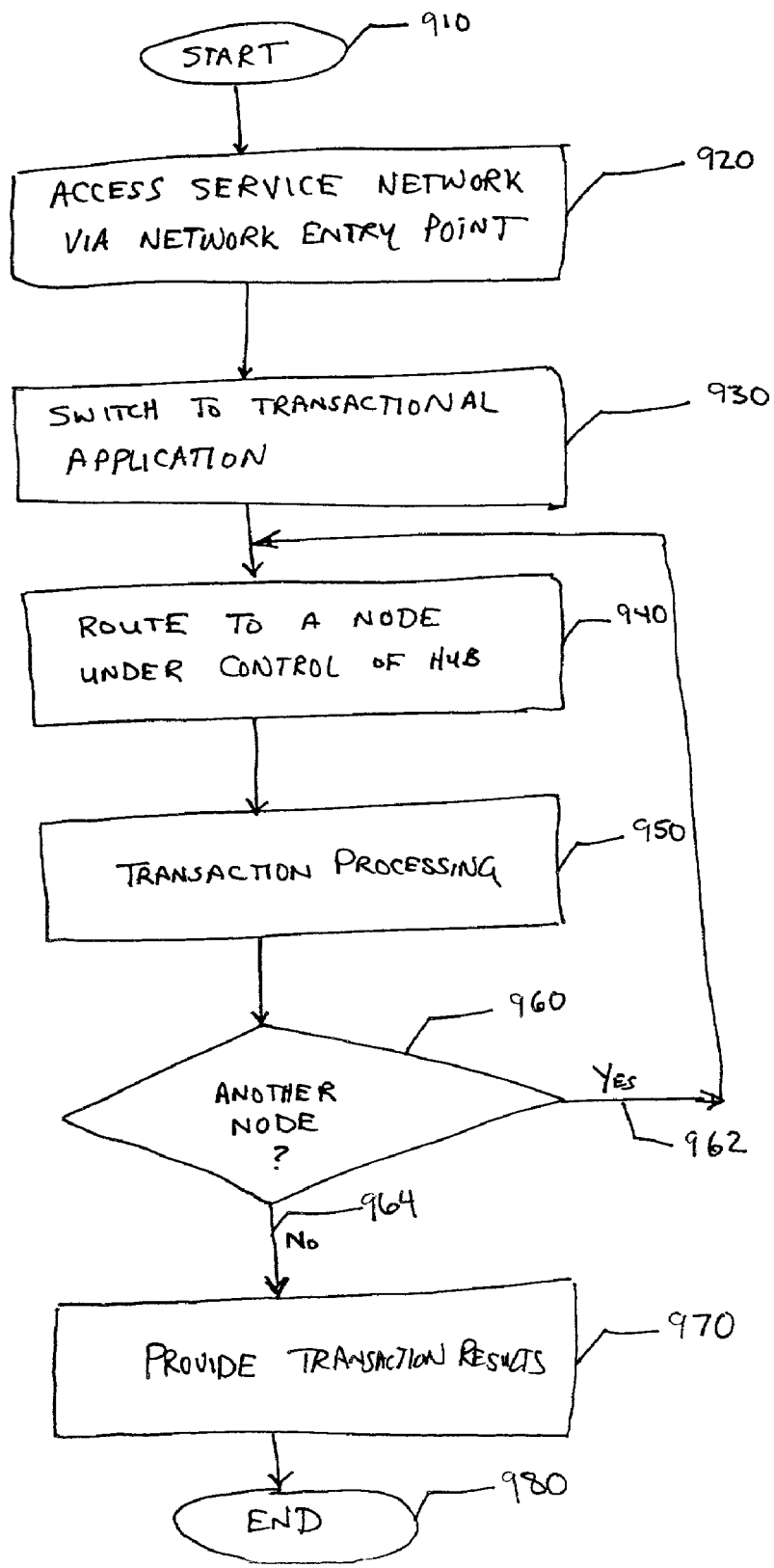
FIG. 9 conceptually illustrates in block diagram form a method, according to one embodiment, to perform a transaction on a service network.

FIG. 9 illustrates in block diagram form a method 900, according to one embodiment, to perform a transaction via a service network. Typically, the method 900 will be implemented in logic that may include software, hardware or a combination of software and hardware.

The method 900 commences at block 910, and then proceeds to block 920, where a service network is accessed via a network entry point. According to one embodiment, a user connects to a web server (or a call center or cell site) running an exchange component, the user issues a request for a transactional application, the web server hands off the request to the exchange, the exchange activates a graphical user interface (GUI) to present user with a list of Point-of-Service (POSvc) transactional applications, and the user makes a selection from the POSvc application list. POSvc applications are transactional or service applications that are designed to incorporate and take advantage of the capabilities provided by the present invention.

The method 900 advances from block 920 to block 930, where switching to a transactional application is performed. Switching may include value-added network switching to local applications or components or remote applications or components and causing routing to those applications or components. Switching may also include flow control, prioritization of requests, and multiplexing. According to one embodiment, interconnected OSI model application layer software switches may perform the switching.

The method 900 advances from block 930 to block 940, where a route to a node is performed under the control of the hub. Routing may include performing multi-protocol routing to remote components or applications by using Simple Network Management Protocol (SNMP), TransWeb™ Management Protocol (TMP), or others. Traditional security features (e.g., RSA, SET1, SET2), and others are contemplated.

The method 900 advances from block 940 to block 950, where transaction processing is performed. This may include retrieving data from a data repository, such as by using TMP or another protocol.

A determination is made at decision block 960 whether another node is involved in the service. As stated above, the determination may include querying and receiving a response from the client and/or receiving an indication that another node is involved based on the prior transaction processing at block 950 and/or others. If yes is the determination 962 then processing loops through blocks 940-960 until no is the determination. Routing to the other nodes may be done with control and while keeping the previous nodes involved in the transaction if they still have an interest in the transaction.

If no is the determination 964 then processing advances from decision block 960 to block 970 where transaction results are provided. The method 900 terminates at block 980.

Figure 10:
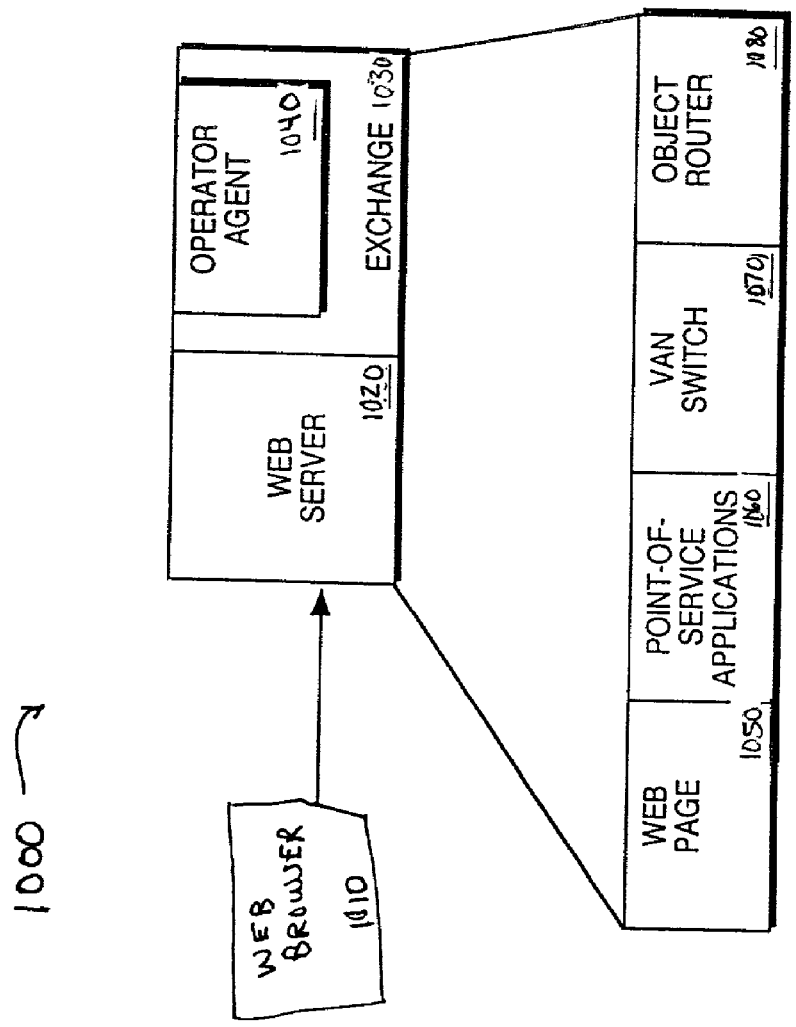
FIG. 10 conceptually illustrates components of a service network, according to one embodiment.

FIG. 10 conceptually illustrates components 1000 of a service network, according to one embodiment. A web browser access device 1010 accesses a web server 1020 that is functionally coupled with an exchange 1030. The exchange 1030 may reside on web server 104 or on any separate computer system that is at least connected with the Internet and capable of being accessed via an Internet address. Exchange 1030 creates and allows for the management (or distributed control) of a service network, operating within the boundaries of an IP-based facilities network. As shown, in one embodiment, the exchange 1030 contains an operator agent 1040, which may perform service network processing including interacting with a management manager such as those described elsewhere in the specification.

Together, the web server 1020, the exchange 1030, and the operator agent 1040 provide a web page 1050, one or more point-of-service (POSvc) applications 1060, VAN switch 1070, and object router 1080. According to one embodiment, the exchange 1030 displays an web page 1050 in the web browser 1010 including the list of POSvc applications 1060 that are accessible to the exchange 1030. A POSvc application is an application that can execute the type of service or transaction that the user may be interested in performing. By way of example, the list of one or more POSvc applications may be displayed in an HyperText Markup Language (HTML) GUI, a Virtual Reality Markup Language (VRML) GUI, a Java GUI, or another GUI.

Depending on the particular implementation, although they are shown as separate entities, the VAN switch 1070 and the router 1080 may be combined to form a router to provide multi-protocol object routing. In one embodiment, this multi-protocol object routing is provided via TransWeb™ Management Protocol (TMP), available from WebXchange Inc. of Scotts Valley Calif., which may incorporate traditional security features (e.g., RSA, SET1, SET2, etc.). Alternatively, routing may be done using Simple Network Management Protocol (SNMP).

One embodiment of the present invention utilizes network accessible virtual information stores to perform routing. In one case, the virtual information stores are distributed on-line service information bases (DOLSIBS). Information entries and attributes in a DOLSIB virtual information store are associated with a networked object or component identity. The networked object identity identifies the information entries and attributes in the DOLSIB as individual networked objects, and each networked object is assigned a network reachable address (e.g., an Internet address). For example, the Internet address may be assigned based on the IP address of the node at which the networked object resides. Routing may be done using the DOLSIB and TMP or another protocol. In one case, TMP and a DOLSIB may be combined with Secure Sockets Layer (SSL), s-HTTP, Java, a component model (e.g., DCOM), the WinSock API, object request broker (ORB), or another object network layer to perform and manage object routing.

The VAN switch 1070 and object router 1080 will be described elsewhere in the specification. Thus, according to one embodiment, the exchange 1030 and an operator agent 1040, described in more detail elsewhere together perform the switching, object routing, application and service management functions according to one embodiment of the present invention.

Figure 11:
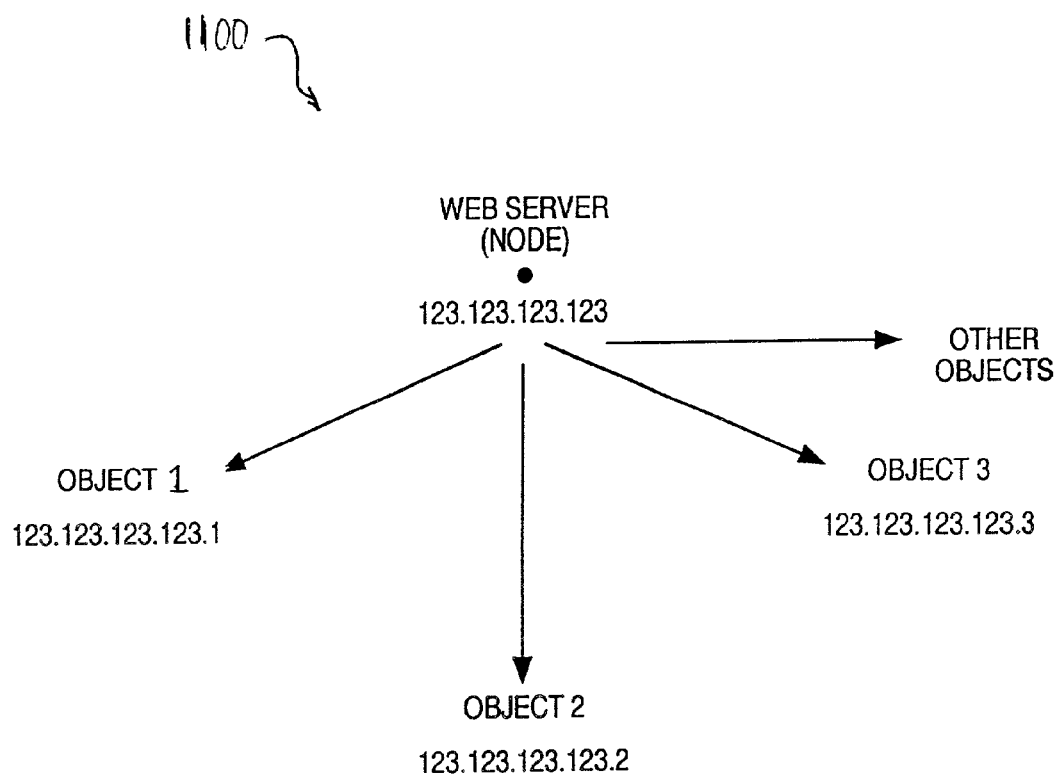
FIG. 11 conceptually illustrates a hierarchical branching convention to provide network addresses for networked objects, according to one embodiment.

FIG. 11 conceptually illustrates a scheme 1100, according to one hierarchical tree-structure embodiment, to provide network addresses based on a unified numbering scheme for objects or components, which may be used in virtual information stores or DOLSIBs. A web server, which may be a node, has an exemplary network or Internet address 123.123.123.123. Object 1, which may be a Java applet, a COM object, or another object, has a network address based on the network address of the web server. In this particular example, the object 1's address is 123.123.123.123.1. Likewise, an object 2 and object 3 have network addresses 123.123.123.123.2 and 123.123.123.123.3, respectively. Similarly, network addresses may be provided for other objects, as desired. Thus, according to this exemplary approach, objects may be addressed based on a hierarchical tree structure according to the node that they correspond to. Other network addressing schemes are contemplated.

The network or Internet address for each networked object essentially establishes the networked object as an accessible or "IP-reachable" node on the network or Internet. These network addresses may be used to represent the objects in a DOLSIB. For example, the network address 123.123.123.123.1 may be used to represent object 1 in the DOLSIB. The DOLSIB may also contain a along with a name, a syntax, and an encoding. The name is an administratively assigned object ID specifying an object type. The object type together with the object instance serves to uniquely identify a specific instantiation of the object. For example, if an object is information about models of cars, then one instance of that object would provide a user with information about a specific model of the car while another instance would provide information about a different model of the car. The syntax of an object type defines the abstract data structure corresponding to that object type. Encoding of objects defines how the object is represented by the object type syntax while being transmitted over the network. Then, TMP or another protocol may be used to uniquely identify and access these objects from the web server node, based on the network addresses recorded in the DOLSIB.

Figure 12:
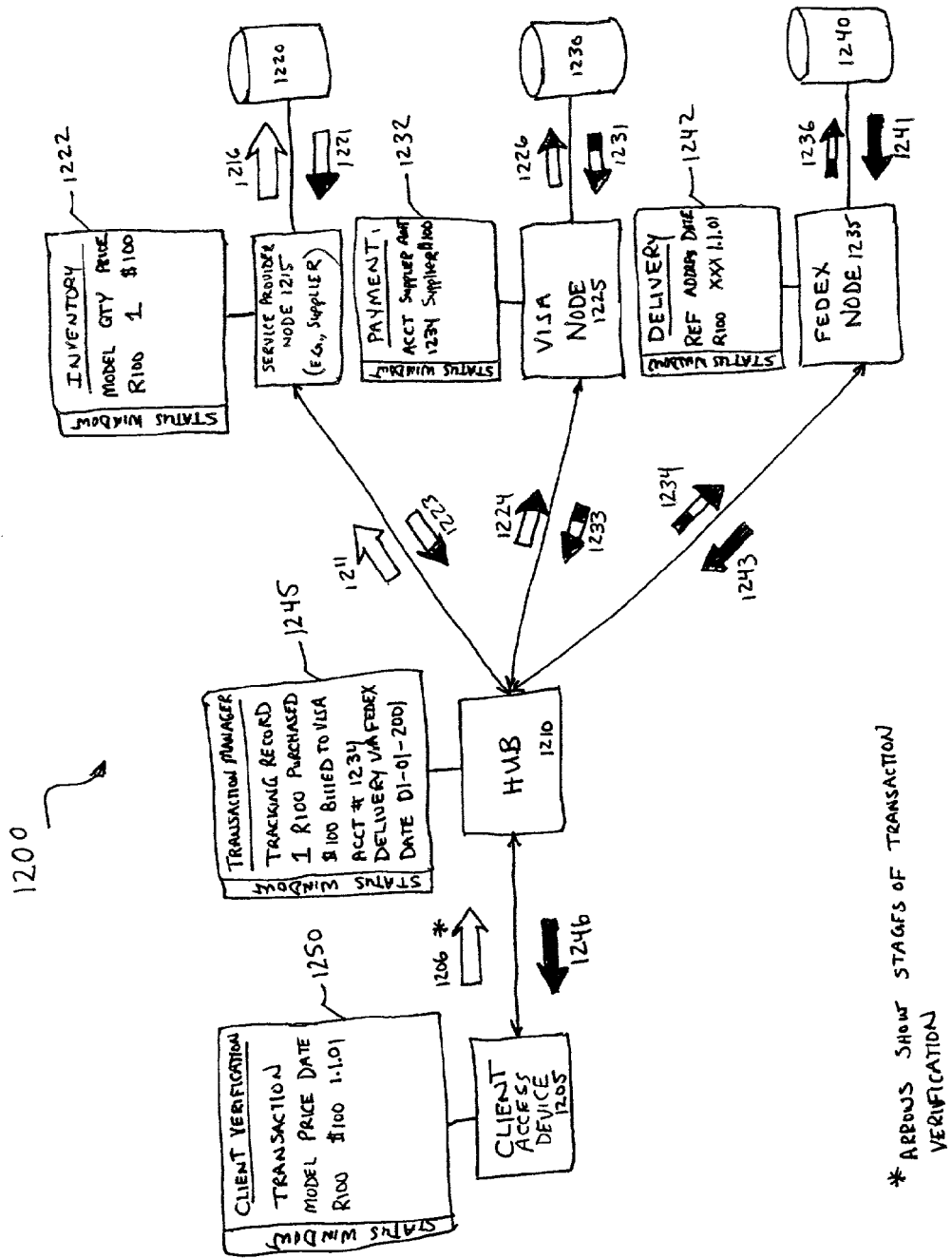
FIG. 12 conceptually illustrates a hub-controlled service network providing verified services, according to one embodiment.

FIG. 12 conceptually illustrates a service control center 1200, according to one embodiment, to provide verified services. A client access device 1205 accesses a hub 1210. The arrow 1206 conceptually represents the ordering and degree of verified completion of a service transaction. In particular, the arrow 1206 is unfilled representing that no stage of the service transaction has been verified completed as opposed to arrow 1246 which is filled and represents that all stages of the service transaction have been verified completed. For purposes of illustration, the arrow 1206 may conceptually represent a message or communication sent from the client access device 1205 to the hub 1210, although other back-and-forth and inter-party interactions between the shown client access device 1205, hub 1210, and the nodes 1215, 1225, and 1235 are contemplated for many other services.

To perform a service transaction that may be requested or indicated in a communication with the client access device 1205, the hub 1210 controllably connects with service provider node 1215. In this example, service provider node 1215 is a supplier selling products over the service network. The client access device 1205 indicates to purchase one model r100 at a cost of $100. The supplier 1215 connects and communicates with data source 1220 to obtain inventory data and update the inventory to reflect the purchase of one model R100 unit at a cost of $100. Arrow 1221 is partly filled to indicate that the requested model 100 is in inventory and was purchased. Status window 1222 indicates the purchase. A verified degree of completion of the service transaction is indicated by the difference in shading between arrows 1211 and 1223.

The hub 1210 determines that the purchasing portion of the service transaction has been verified completed and controllably connects with service provider node 1225, which in this example is a Visa node to bill payment to a Visa credit card account indicated by the client access device 1205. The Visa node 1225 communicates with data source 1230 based on, for example, a credit card number, to perform billing processing. Status window 1232 shows the billing. Completion of the billing portion of the service transaction is indicated by the difference in shading between arrows 1224 and 1233.

The hub 1210 determines that the billing portion of the service transaction has been verified completed and controllably connects with service provider node 1235, which in this example is a FedEx node 1235 to arrange delivery of the model R100. The FedEx node 1235 interacts with a data source 1240, based on delivery preference data supplied by the client access device 1205, to arrange delivery. Completion of the delivery portion of the service transaction is indicated by arrow 1243, which is entirely filled.

The hub 1210 determines that the purchasing, billing, and delivery portions of the service transaction are verified completed, as indicated in the status window 1245, and provides confirmation of the service transaction to the client access device 1205, as indicated in status window 1250. Advantageously, the transactional control provided by the hub 1210 has allowed a multi-service provider value-added service to be provided to the client access device 1205, including verification of multiple transactional portions of the service. According to one embodiment, the hub 1210 is financially compensated by the nodes 1215, 1225, and 1235 based on a visit or hop to the node, a purchase, a purchase amount, and according to other desired criteria.

Figure 13:
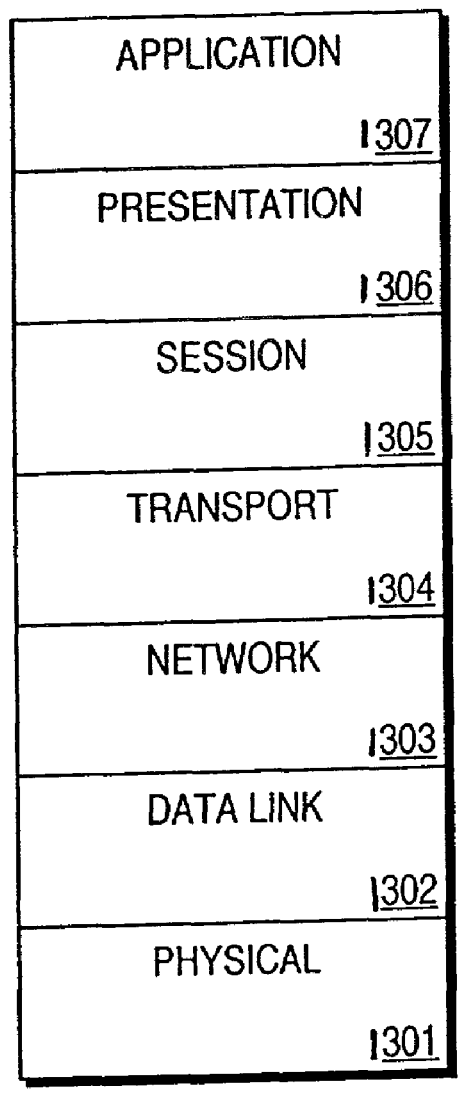
FIG. 13 conceptually illustrates the Open System Interconnection (OSI) reference model.

FIG. 13 conceptually illustrates the Open System Interconnection (OSI) reference model that is useful to understanding embodiments of the present invention. The OSI model is a networking framework for implementing communication protocols in seven layers including a physical layer 1301, a data link layer 1302, a network layer 1303, a transport layer 1304, a session layer 1305, a presentation layer 1306, and an application layer 1307. Control is passed from the application layer 1307 located at one point in the network layer-by-layer to the physical layer 1301 over a network communication link to a second point in the network and back up the hierarchy from the physical layer 1301 to the application layer 1307. In one case each layer may communicate with its peer layer in another node through the use of a protocol.

Physical layer 1301 may transmit unstructured bits across a link. Data link layer may transmit chunks across the link and may perform check-summing to detect data corruption, orderly coordination of the use of shared media, and addressing when multiple systems are reachable. Network bridges may operate within data link layer 1302. Network layer 1303 may enables any pair of systems in the network to communicate with each other. Network layer 1303 may contain hardware units such as routers to handle routing, packet fragmentation, and reassembly of packets. Transport layer 1304 may establish a reliable communication stream between a pair of systems and deal with errors such as lost packets, duplicate packets, packet reordering and fragmentation. Session layer 1305 may offer services above the simple communication stream provided by transport layer 1304. These services may include dialog control and chaining. Presentation layer 1306 may provide a means by which OSI compliant applications can agree on representations for data.

The application layer 1307 typically defines the language and syntax that applications use to communicate. Application layer 1307 may provide a means for application programs to access the OSI environment. By way of example, an application on one computer system in a network uses application-layer prescribed commands to access or request data from an application located on another computer system of the network. Often the application layer 1307 is responsible for functions such as file management (e.g., opening, closing, reading and writing files), transferring files, transferring messages (e.g., email messages), executing jobs remotely, obtaining directory information about network computer systems, and other distributed computing applications. Application layer 1307 may include services such as file transfer, access and management services (FTAM), electronic mail and virtual terminal (VT) services.

According to one embodiment, the invention uses software conforming to the application layer 1307 of the OSI model to provide the service network by providing communication, control, and management of distributed software. For example, according to one embodiment, the routing switch is implemented to function within the application layer 1307 of the OSI model. Application layer routing may create an open channel for the management and the selective flow of data from remote databases on a network.

Figure 14:
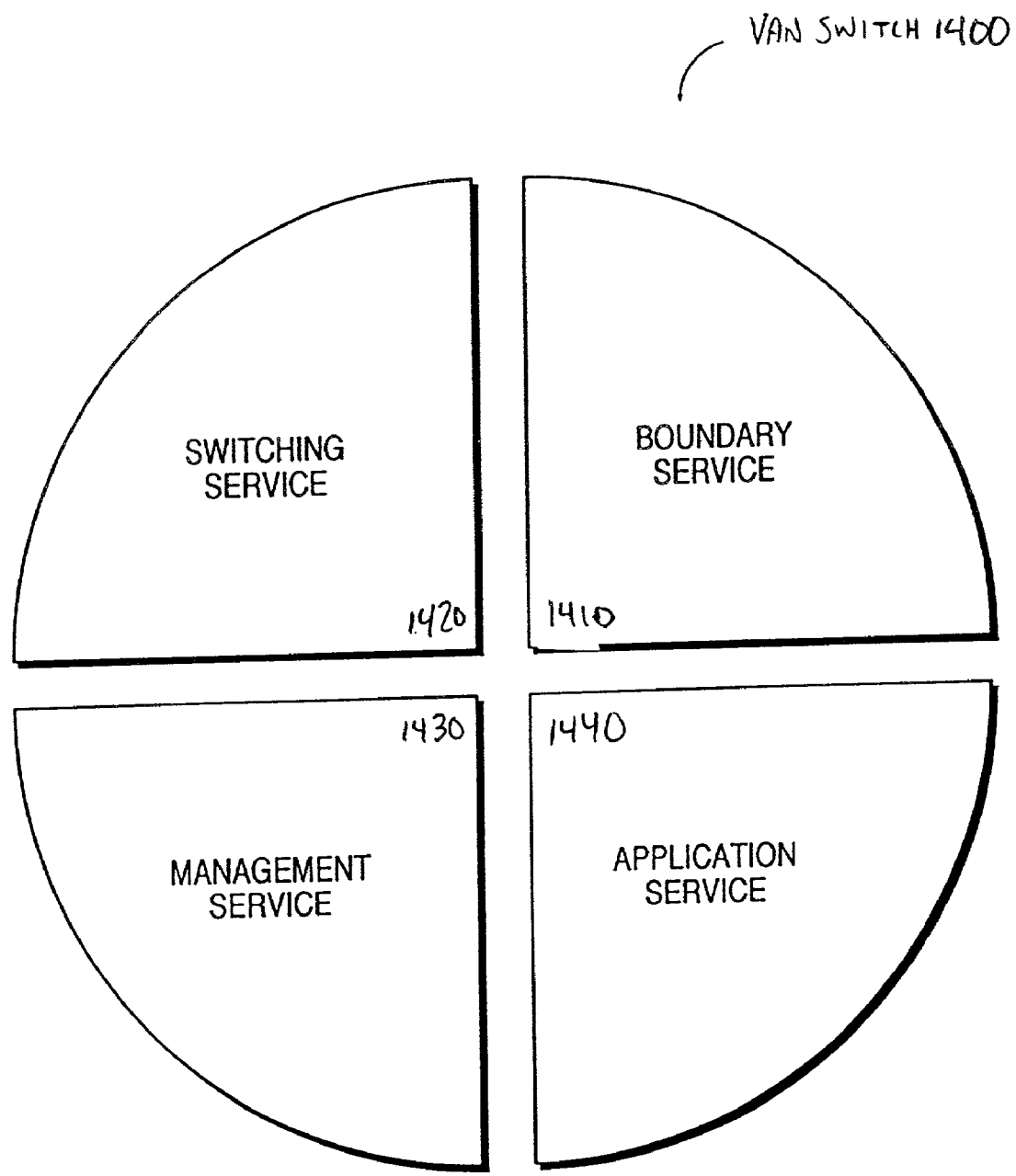
FIG. 14 conceptually illustrates a layered architecture of a transactional network application having a value-added network (VAN) switch, according to one embodiment.

FIG. 14 conceptually illustrates an exemplary layered architecture of a value-added network (VAN) switch 1400, according to one embodiment. VAN switch 1400 and other interconnected switches may be used to create an application network, backbone to provide the service network. The VAN switch 1400 includes a boundary service 1410, a switching service 1420, a management service 1430, and an application service 1440.

Boundary service 1410 may provide the interface between VAN switch 1400 and a facilities network and client access devices. Boundary service 1410 may also provide an interface to an on-line service provider. Using these interfaces, a client may use a client access device to connect to a local application, namely one accessible via a local VAN switch, or be routed or "switched" to an application accessible via a remote VAN switch.

Switching service 1420 may perform a number of tasks including routing user connections to remote VAN switches, flow control, prioritization of requests, and multiplexing. Switching service 1420 may also facilitate open systems' connectivity with both the Internet (a public switched network) and private networks including back office networks, such as banking networks. Often, the switching service represents a core of the VAN switch 1400. According to one embodiment, the switching service 1420 is implemented as an OSI application layer switch.

Management service 1430 may contain tools that are used, such as by end users, to manage network resources including VAN switches like VAN switch 1400. For example, the tools may include Information Management Services (IMS) and application Network Management Services (NMS). Management service 1430 may also provide Operations, Administration, Maintenance & Provisioning (OAM&P) functions. For example, the functions may include security management, fault management, configuration management, performance management and billing management for the service network. Network management, such as provided by management service 1430, is another significant aspect of certain embodiments of the invention and may be used to add quality and value to the services provided.

Application service 1440 may contain application programs that provide customer services. For example, application service 1440 may include POSvc applications such as those discussed in FIG. 10 and elsewhere. Other exemplary application programs that may be provided by application service 1440 include multi-media messaging, archival/retrieval management, directory services, data staging, conferencing, financial services, home banking, risk management and a variety of other vertical services. The applications service 1440 may contain applications having design features that allow them to conform to standards related to performance, reliability, maintenance and ability to handle expected traffic volume. Depending on the type of service, the characteristics of the network elements may differ. Typically, application service 1440 will provide a number of functions including communications services for both management and end users of the network and control for the user over the user's environment.

Figure 15:
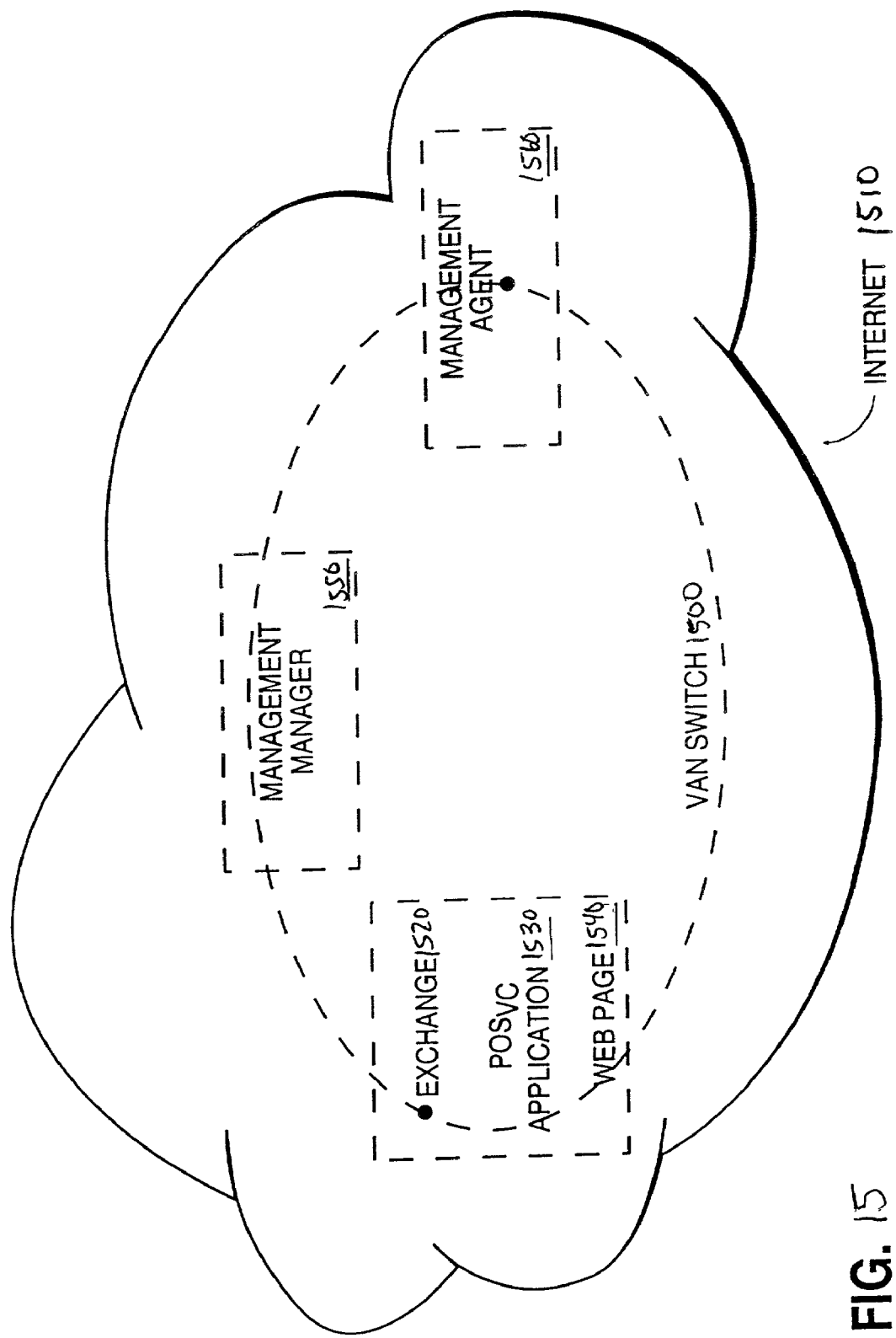
FIG. 15 conceptually illustrates the potentially distributed nature of a VAN switch, according to one embodiment.

FIG. 15 conceptually illustrates a VAN switch 1500, according to one embodiment. The exemplary VAN switch 1500 contains an exchange 1520, and a management agent 1560 that are potentially geographically distributed over the Internet 1510. The exchange 1520 and the management agent 1560 may take on different roles as desired, including peer-to-peer, client-server or master-slave roles. Management manager 1550 may reside on a separate computer system either on the Internet 1510 or anywhere where the Internet 1510 connects with another computer system or network. Management manager 1550 may interact with an operator agent associated with the exchange 1520. In alternate embodiments, two or more of the components shown may reside on the same computer system or location in the Internet 1510.

An object router may be used to controllably route to networked entities such as computer systems, applications, objects, and data. The object router may allow for the transparent completion of service transactions involving distributed applications and software components without the programmer needing to know whether networked entities are local or remote. The router may be able to automatically determine this, such as based on looking up a network address of a relevant entity and using correct operations compatible with the type of entity. An object router may include a library to provide support for the application programming interfaces (APIs) to remotely access an object, its data, and its functions in an object network. This interface may provide a skeleton class to contain the functionality of the object and corresponding or counterpart stub class to allow remote access of the object. A stub and a skeleton may be functionally coupled together. For example, a stub may be installed on a client computer system and a corresponding skeleton installed on a server computer system and in combination they interoperate to allow a remote procedure or method call. In one case the stub may declare itself and its parameters. Arguments to the function may be specified in a meta file and a type of the argument may be specified by value or by reference. The object router may allow for new data types to be constructed, using the basic data types of the programming language used in the particular embodiment: int and String. Single simple inheritance classes may be constructed and then used as data members or pointer within another meta class. Typically, the router will be implemented in a programming environment and language that is object-oriented and allows for distributed computing, such as C++, Java, and a component model. However other embodiments are also contemplated.

Before continuing with the detailed explanation of the present invention and various exemplary embodiments of the present invention, it may be helpful to briefly explain some terms, without limitation, that will be used in the discussion below. These explanations are provided to facilitate understanding of the following text, rather than to limit the invention. The term "abstract class" will be used to refer to a C++ class that does not have all virtual functions defined. The term "class" will be used to refer to typically a C++/Java data structure definition that defines both the data and the functions. The term "interface" is a Java term similar to the C++ abstract class. A "meta-compiler" translates a higher-level "meta-language" (e.g., WebX, available from WebXchange) from the "meta-file" into a lower-level language (e.g., C++) output file for and before giving to a traditional compiler. The software may be compiled under a version of Windows NT using a Microsoft Visual C++ version compiler based on the wx.lib and the Rogue Wave libraries, available from Rogue Wave of XXX, XXX, Tools++, Net++ and Threads++. Other software platforms are contemplated. The term "object" may be used to refer to a C++/Java data structure instance that is defined by a class.

Figure 16:
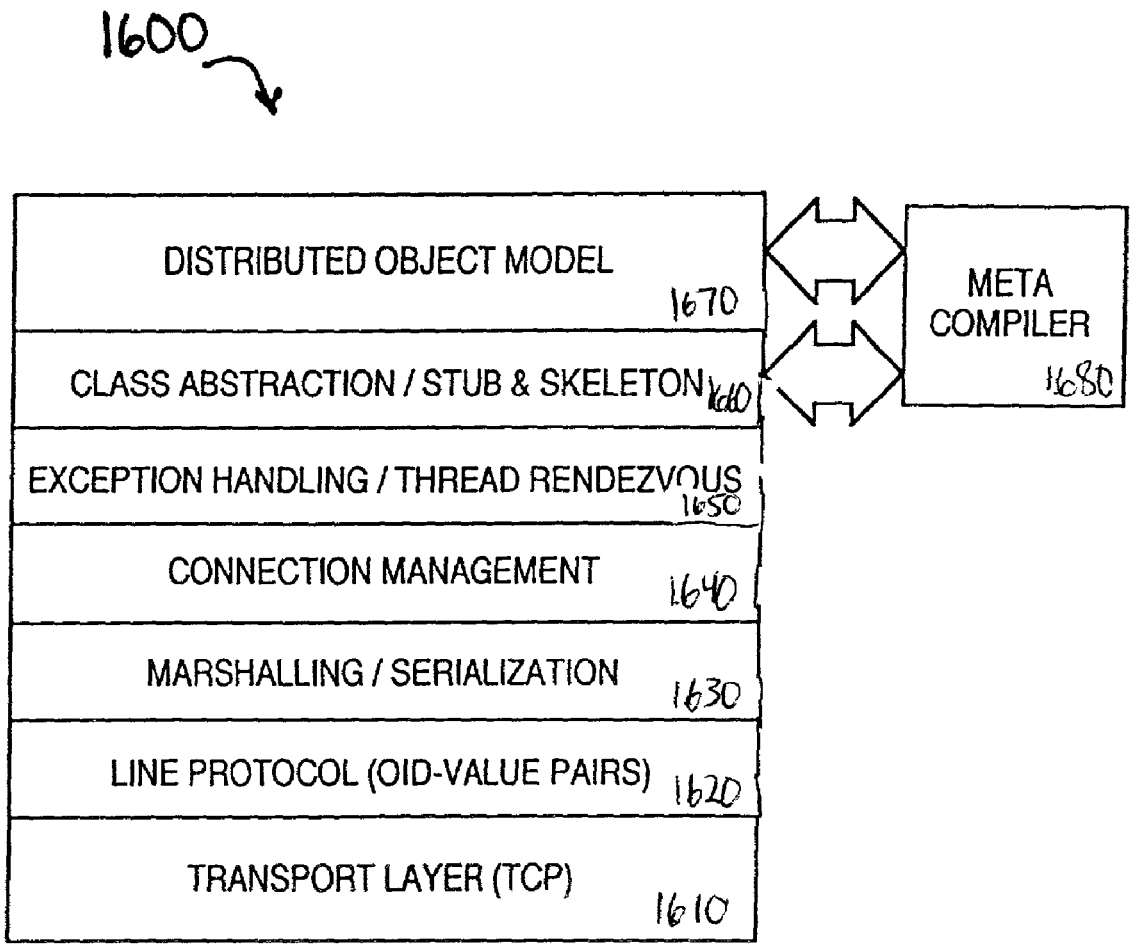
FIG. 16 conceptually illustrates software layers of an object router, according to one embodiment.

FIG. 16 conceptually illustrates software layers of an object router 1600, according to one embodiment. The layers include a transport layer 1610, a line protocol layer 1620, a marshalling/serialization layer 1630, a connection management layer 1640, an exception handling/thread rendezvous layer 1650, a class abstraction/stub & skeleton layer 1660, and an distributed object model layer 1670.

A meta compiler 1680 may be provided for use with the layers 1660 and 1680 The meta compiler 1680 will be used broadly to refer to an automated mechanism to code features based on structured typically concise definitions. For example, the meta compiler 1680 may take a definition file and substantially automatically create the object identity, data serialization, data marshaling, string execution, abstract base class, and the stub/skeleton multiple inheritance. Advantageously, such automated coding may improve the efficiency of the implementation and may reduce errors. Of course, coding may be performed manually without such a meta compiler, although such implementations are expected to be more laborious, expensive, and prone to error.

The meta compiler 1680 may use a Tool Command Language (TCL) program or a similar program or encoding. TCL is an interpreted script language that may be used to develop applications such as GUIs, prototypes, CGI scripts, and others. TCL may provide an interface into C, C++, and other compiled applications. The application is compiled with TCL functions, which provide a bi-directional path between TCL scripts and the executable programs. TCL provides a way to "glue" program modules together. TCL may also come as TCL/TookKit (TCL/Tk), which provides a GUI toolkit to create GUIs. Scheme, Perl, and Python have incorporated elements of TCL/Tk. According to one embodiment, the meta compiler 1680 is the rme2c meta compiler discussed elsewhere in the present application.

In one embodiment, the meta compiler is run by the command rme2c<classname>, where the classname is the base class (e.g., Account). The Account.rme file as well as other parent definitions should desirably be in the same directory. The object router TCL files are found under Wx/Util. These files parse the description file and produce the six C++ output files. Often, the syntax of the meta compiler should be adhered to closely. Blank lines and lines beginning with a pound sign "#" are considered comments. The following words may be reserved:

include [c*,h*,j*,*base,*skel,*stub] To add code or verbose code to one of six files: cbase, hbase, cstub, hstub, cskel or hskel. The programmer may also specify all "c" files, "h" files, or "base", "skel" or "stub" files.

endinclude—to end the verbose inclusion.

header <class>—to indicate that the compiler will wait for the header section to complete.

beginclass <class>[<parent>]—to indicate the class name and any parent.

begindata—to signals the begin of the data section data [<penn>]<type><name>—to provide a data definition statement.

enddata—to end the data section.

beginmethod—to begin the method section.

method [const] [<penn>]<returntype><name> [{<arg1_jype><arg1_name>}, . . . ]—to define a method.

endmethod—to end the method section.

endclass—to end the class definition; typically this is the last statement in the file.

With reference to FIG. 16, and portions of FIGS. 18 and 21-22, an exemplary object router will be described that provides distributed transactional services based on controlled connection and communication between distributed software objects. During this discussion, details are given, including the model represented by FIGS. 18 and 21-22 and particular objects, methods, syntax, convention, and other particulars that are useful to illustrate operation of certain embodiments but which are not needed. Those having an ordinary level of skill in the art will appreciate that there are alternative implementations that take entirely different modeling approaches compared with the models shown in FIGS. 18 and 21-22. They will also appreciate that the syntax is dependent upon the elected programming convention and may change for non-C++, non-Java, and non-object oriented environments. Accordingly, while the particulars are useful for illustration, they should be viewed in that illustrative sense rather than in a limiting sense.

A detailed discussion of an exemplary object router is provided without limitation to further illustrate operation of an object router according to certain embodiments. In the following discussion, the reader is respectfully directed to FIGS. 18 and 21-22 and associated text for further illustration and discussion of the characteristics and structure of the classes and objects used by the exemplary object router.

The object router typically includes functionality to determine an object identity for a networked object in order to communicate with the object. The identity may be determined from a library that stores identities for many such networked objects. In one case, the object identity may be determined by using a WxObject in a wx.lib library. In such a case each new class "XYZ" may add a XYZ_ClassID, XYZStub_ClassID and XYZSkel_ClassID to the Wx/ClassID.h file. Based on the object identity, the object router may transparently determine whether the object is local (e.g., a skeleton on a server) or remote (e.g., a stub on a client or an object on another server). The object router may also determine the argument parameters and object serialization.

The object router typically uses some protocol to communicate with remote computer systems and software. Communicating may include transferring objects, parameters, and data. Often a network line protocol/TCP will be used. The WxRemotePDU shown in FIG. 22 includes a plurality of parameters and methods to provide a protocol data unit (PDU) that conforms to the protocol. The objects, parameters and data may be serialized onto a network stream that is sent to the remote computer system. The persistence nature of RWCOLLECTABLE shown in FIG. 21 may provide the data serialization to transmit the data. Often, at least a portion of the code to perform these functions will be generated by a meta compiler based on base classes.

The object router may also perform data marshalling. Data marshalling may include checking parameters that are passed as arguments to methods to determine if any parameters are missing or wrong, and may include throwing an exception or otherwise signaling if a parameter is missing or wrong. This may be provided by a meta compiler in the stub and skeleton.

The object router may block a thread during network transmission and reception by using a different thread to perform the actual network activity and control the calling thread status. Advantageously, this may allow a remote object to be called similarly to a local object. In one case, a Rogue Wave RWCondition class in the WxRemotePDU class may perform this function.

The object router may use string execution to allow an ASCII string representation to call a method. This may provide a useful, simple, and unique means of calling a class method that may also be used directly by a programmer. A meta compiler in the base class may create this data marshalling.

The object router may also perform reference counting on local and/or remote objects. This may avoid time consuming malloc's, free's, and confusing details of which function is responsible for deleting which object. The object router may use such reference counting to deal with WxRemoteObject types. The programmer may also use reference counting. Typically, a WxRemoteObject child should not be destroyed using delete, and an exception may be thrown if this is tried, but rather the WxRemoteObject child should be destroyed by using the member function ol_unreference( ). Also, if a user stores a copy of a WxRemoteObject child, the method ol_reference( ) should be called to prevent the object from being destroyed by some other user or method. WxRemoteObjectInt may provide this interface.

The object router may use an abstract base class and multiple inheritance according to certain embodiments. Advantageously, the abstract base class may allow interaction with a local or remote object without knowing its location. This base class may be the parent of both the stub and the skeleton, which may be inherited from the abstract base class and from their respective object layer classes. This allows them to inherit the functionality of the base class as well as the object layer routines. Often, the inheritance will be provided by the meta compiler.

The object router may also include at least an interface to a user-defined data model to provide a basis of the object layer to the next level up the software layers. The user-defined data model may include a set of user-created classes built around and on top of the object router APIs. This foundation appears local to the programmers using the object layer even though it may be remote.

Figure 17:
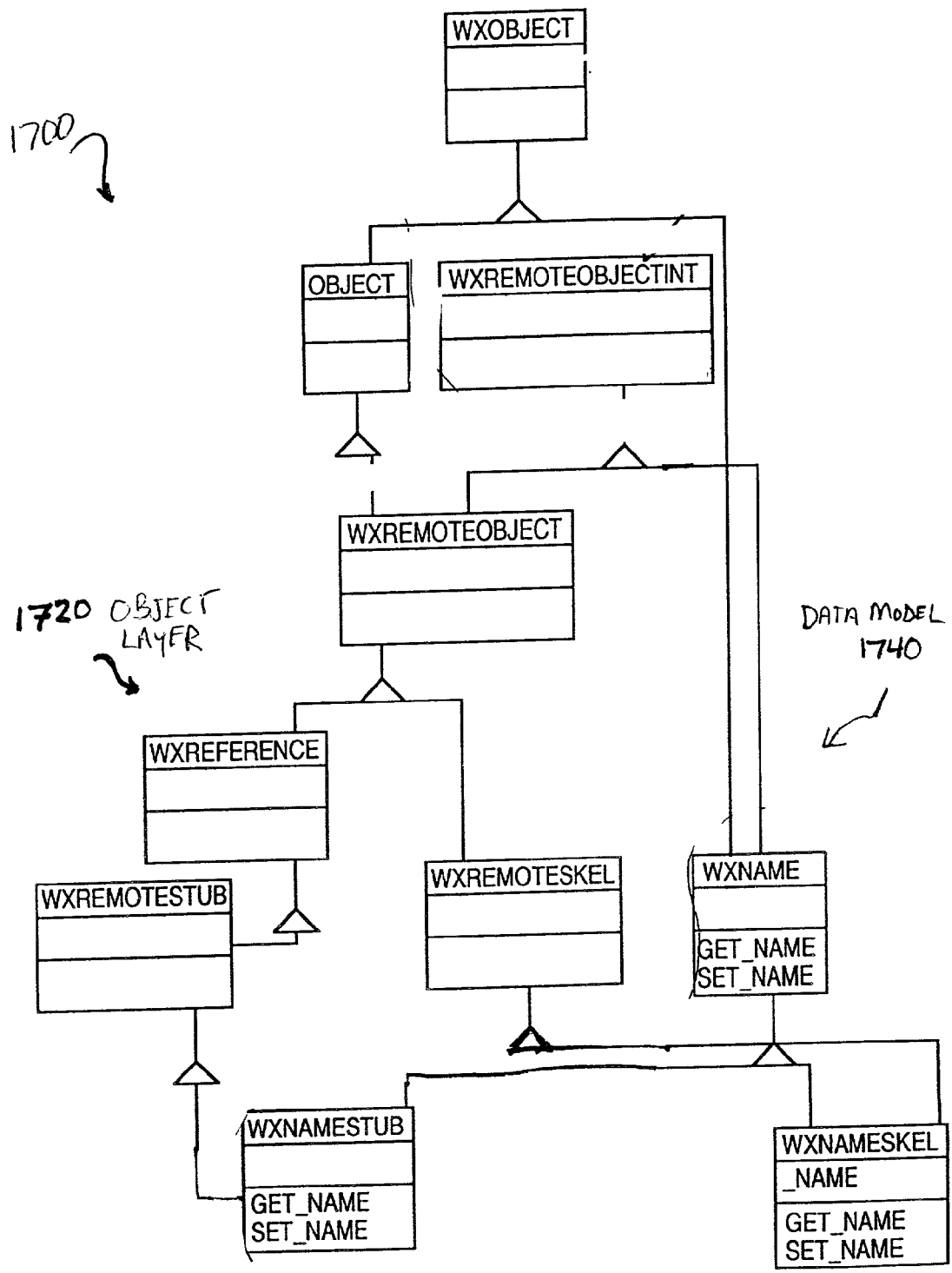
FIG. 17 conceptually illustrates data model integration for an object router of one embodiment.

FIG. 17 conceptually illustrates data model integration 1700 for an object router of one embodiment. The object model 1700 represents one breakdown of base classes into inherited or derived classes, although other embodiments are contemplated. For convenience, the components will be referred to by name (e.g., WxObject) rather than by number.

The object model 1700 comprises base classes WxObject and WxRemoteObjectInt from which other classes and objects derive. The derived components are either object layer objects 1720 (e.g., Object, WxRemoteObject, WxReference, WxRemoteSkel, WxRemoteStub) or data model objects 1740 (e.g., WxName, WxNameStub, and WxNameSkel).

A programmer that is creating transactional objects is likely to work closely with the base class WxRemoteObject and/or WxRemoteObjectInt. WxRemoteObjectInt is an abstract base class that may contain all of the member methods and data access components as well as support functions to provide a uniform interface to behave as a WxRemoteObject. For example, this may include (a) WxStringExecution to execute any method using a simple ASCII string and object type data, (b) WxLock to provide a thread synchronization mechanism, (c) WxFlags to provide a simple and consistent Boolean flag variable, (d) reference counts to allow sharing and manage ownership concerns, (e) conversions between OBJECT, WxRemoteReference, WxRemoteStub and WxRemoteSkel types, and others as desired. As shown, both the object layer objects 1720 and the data model objects 1740 inherit an interface specification WxRemoteObjectInt.

WxName is a new data model object 1740 that contains one data member "name" which is a string. The meta compiler may automatically create two access components for this data member, namely Get_Name and Set_Name. The meta compiler may also create the server and client versions of this data object.

Typically the skeleton is used to represent the server side of the object router. For example, WxNameSkel is a class that is derived off the abstract base class WxName and WxRemoteSkel. Often the programmer defines or customizes the methods, except for the data access components, for the skeleton, since this is the actual object embodying the business or transactional methods. Real instances of the class may be created with the suffix "skel".

The stub represents the client or remote side of an object for the object router. As with the skeleton, the stub too is derived off the abstract base class WxName and an object layer class WxRemoteStub. Typically, the meta compiler will generate all methods for the stub.

Without limitation, the use of certain conventions and codes (e.g., prefixes, suffixes, etc.) may be used to improve certain implementations. A partial list of exemplary conventions and codes is provided below. Those having an ordinary level of skill in the art will appreciate that the exemplary conventions and codes are not needed to implement the invention. They will also appreciate that numerous other conventions and codes may be conceived to improve certain other aspects.

- The StringExecutionInt class may prepend all of its member functions with "se_".
- The object layer classes may prepend their member functions with "ol_" to avoid name-bashing with derived classes that are built using the base classes created by the meta compiler.
- Member data in the skeleton may be prefixed with "_" as a reminder and indicator that the data is local to the object and usually protected.
- To deal with synchronization issues, any modification of local member data within a skeleton should be guarded by ReadLockGuard or WriteLockGuard when accessed since other threads may be sharing this data.
- Skeletons may be suffixed with "skel" and stubs may be appended with "stub".
- WxRemoteObject derived data may be passed with a pointer.
- To indicate who has ownership of the data, the suffixes "_ref" and "_val" may be added by the meta compiler to indicate if the data is passed by value or by reference. If it is passed by reference, the function may then return a pointer that has had the reference count incremented. If it is passed by value, the data may be copied from the original source and the receiver may unreference this using DeleteObject.
- To indicate if a data member is passed by reference, an asterisk (i.e., *) may be appended to the data type in the "data" declaration section of the object router meta file. Similarly, this may be done for return types in the "method" section and for arguments to methods.
- When data is passed by value into a function, it will be proceeded with "const" to signify that the object is not to be changed.
- The header file Wx/ClassID.h may contain all ClassIDs for the base classes and their stubs and skeletons. Object Ids may be placed in this (e.g., by the programmer) before running the object router meta compiler.
- The CC and HH files may be included from the object router meta file to add additional functionality to the base, stub or skeleton. For example, if a function void xyz( ) is added to the XYZ skeleton class it may then be added to the XYZ.rme file:
  include hskel
  void xyz( );
  endinclude
  include cskel
  #include "XYZSkel.cc"
  endinclude
  This will then include the simple declaration "void xyz( )" into the header for the skeleton and also include the definition for xyz( ) from the XYZSkel.cc file.
- The suffixes "cc" and "hh" may be used rather than "cpp" and "h" since the object router meta compiler uses those suffixes for the final XYZ files.
- The CPP and H files are automatically generated by the object router meta compiler for the base, skeleton and stub. Desirably, the programmer should not edit the cpp or h files directly. Rather, the programmer should modify the rme file and recompile.
- Strings used in the object layer may be passed either by value using RwcString and "const char*" or by reference using the RwCollectableString (also known as "string"). In some cases, the programmer knows which version is most desirable: pointer or static object. Based on programmer need, the programmer can choose either the function foo( ) which returns the string by value or foo_ptr( ), which calls the same function but returns a copy of the string on the heap as a pointer.
- Two data access components may be automatically created for each data member, namely "get" and "set". There may be different operation for different types of data such as integer, string, and others. The integer case is the simplest and creates member functions int getxyz( ) const and void set_xyz(int). The string case has been mentioned elsewhere, and creates three methods: RwcString get_xyz( ) const, String *get_xyz_ptr( ) and set_xyz(const char*). The case WxRemoteObject by value creates two functions: XYZ* get_xyz_val( ) const and void set_xyz(const XYZ*). The case WxRemoteObject by reference also creates two functions, XYZ* get_xyz_ref( ) const and void set_xyz(XYZ*). This also assumes that the "set" function will retain a copy of the object.

Figure 18:
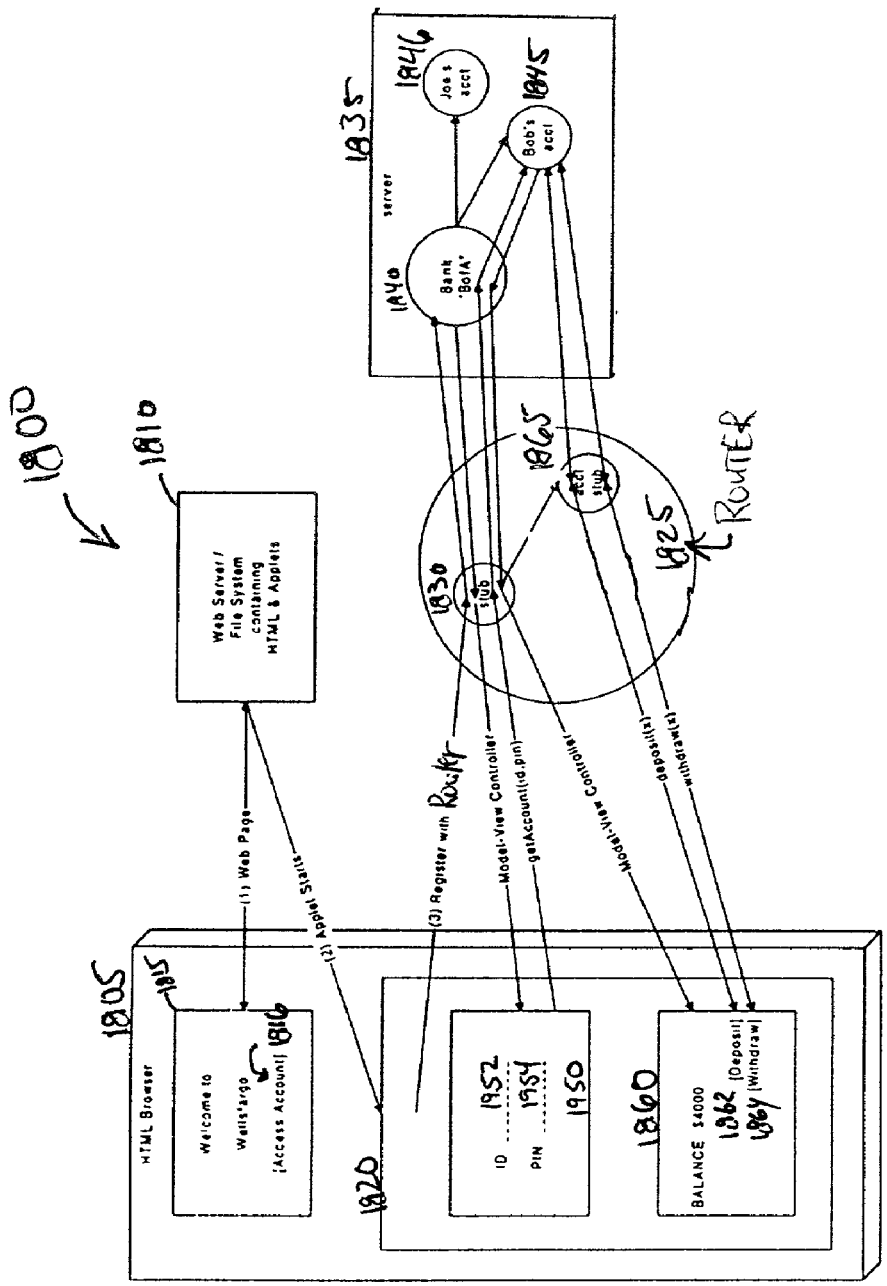
FIG. 18 conceptually illustrates a single bank service transaction, according to one embodiment.

FIG. 18 conceptually illustrates a banking service transaction 1800 involving a single bank service provider, according to one embodiment. The banking transaction 1800 includes a client HTML browser 1805 accessing a web server file system 1810 associated with the bank. The web server file system 1810 returns a bank introductory web page 1815 that is displayed via the browser 1805. The web page 1815 may include any desired content as well as a transactional request mechanism 1816 (in this case [Access Account]). The user selects the request mechanism 1816 indicating a desire to perform the banking transaction.

In response to the selection, the web server 1810 starts an applet 1820 that runs in the web browser 1805. The applet 1820 registers with the object router. The object router may determine the identification and network location of one or more objects associated with the transaction. The object router may assist with creating stub 1830 on a computer system 1825, which may be the computer system running the browser 1805 or another computer system. According to one embodiment, the computer system 1825 may be a hub.

Via the stub 1830 a connection is made to a server 1835 containing a skeleton object 1840 associated with the bank transaction. Thus, once the stub is received, the user can then look up bank accounts as if local to the skeleton on the server side. The skeleton object 1840 presents transactional data 1850 to the user. Often, the transactional data 1850 will include a field for data entry, such as the ID and Pin fields shown. The user may enter data into these data fields and return the entries to the skeleton 1840 via the stub 1830. Based on these entries the skeleton 1840 may perform transaction processing. Transaction processing may include connecting with other local objects such as a user-specific Bob's account object 1845 and non-user specific Joe's account object 1846. In this case, user-specific data may be obtained from Bob's account object 1845 and returned to the browser 1805 via the skeleton 1840 and stub 1830 as transaction data 1860 including deposit interaction field 1862 and withdraw field 1864.

A stub object 1865 associated with the transaction data 1860 may be established at the computer system 1825 to perform transactions associated with the interactions 1862 and 1864. The user may then enter an amount into deposit interaction 1862, which then activates a deposit of said amount into Bob's account object 1845 via object 1865. Of course, in other implementations this could be handled differently. For example, such operations could be performed by a stub 1830, which also includes the functionality described for stub 1865.

Advantageously, the user was able to receive controlled banking transaction processing. Other embodiments are contemplated, including more complicated and interactive single service provider transactions (e.g., in which more arrows are bi-directional) and involving multiple service providers. The later case of multiple service providers will be shown and described for FIG. 20. However, first it may be useful to provide further implementation details that may be used to implement the banking transaction 1800. Other details and corresponding details for the other embodiments discussed herein will be apparent to those having an ordinary level of skill in the art based on the present disclosure.

A programmer may begin by creating a definition file describing the WxBank and WxBankAcount objects. Typically this will be written in a simple language, such as TCL, which may be parsed by the rme2v meta compiler. For example, the WxBankAccount file may be written as:
    include cskel
    #INCLUDE ANY ADDITIONAL C CODE FOR THE SKELETON
    #include "WxBankAccountSkel.cc"
    endinclude
    beginclass WxBankAccount
    begindata
    #PUT MEMBER DATA HERE
    data int balance
    end data
    beginmethod
    #PUT MEMBER METHODS HERE
    method void deposit {int x3}
    method void withdraw {int x}
    endmethod
    endclass This class may contain methods and data. In this case, the data may be an integer describing the amount of money the account holds. Deposit and withdraw methods may increment or decrement the integer amount as follows:

```
void WxBankAccountSkel::deposit(int x) {
    WriteLockGuard lock(wxlock( ));
    _balance += x;
}
void WxBankAccountSkel::withdraw(int x) {
    WriteLockGuard lock(wxlock( ));
    _balance -= x;
}
```

Notice that the programmer should provide thread locking. For example, by adding the statement, WriteLockGuard lock (wxlock( )) to each desired method. Note that when the method is locked, no other locked methods that include any object-layer defined data access components may be called. The above file (WxBankAccountSkel.cc) defines the skeleton methods. The stub methods are typically defined by the rme2c meta compiler.

The Bank.rme file may be represented by the following code:
    #INCLUDE ANY ADDITIONAL C CODE FOR THE SKELETON
    include cskel
    #include "WxBankSkel.cc"
    endinclude
    #INCLUDE ALL H FILES FOR DATA TYPES USED IN ALL C FILES
    include c
    #include "WxBankAccountSkel.h"
    #include "WxBankAccountStub.h"
    endinclude
    beginclass WxBank
    #PUT MEMBER DATA HERE
    begindata
    enddata
    #PUT MEMBER METHODS HERE
    beginmethod
    method const WxBankAccount* getAccount {int id} {int pin}
    endmethod
    endclass This file, when processed by rme2c will create six files: WxBank.h, WxBank.cpp, WxBankStub.h WxBankStub.cpp, WxBankSkel.h and WxBankSkel.cpp. These six files describe the operation and remote execution of the WxBank object. Since there is no data, no data access components will be generated. The method "getaccount" is defined as follows: method const WxBankAccount* getaccount {int id} {mint pin}. The keyword "const" identifies that this method will not change the object data. The next keyword is the returned object "WxBankAccount*". The asterisk indicates that the object will be passed by reference. The "getaccount" is the actual method name. Two parameters of the method are provided next in braces. Each parameter is provided in braces with a data type followed by a parameter name. In this case there are two integer parameters with name id and pin.

The programmer may describe any additional functionality for the operation of this object and the definitions of the skeleton methods in the WxBankSkel.cc file. The WxBankSkel.cc file may contain:

WxBankAccount* bob=0;
WxBankAccount* WxBankSkel::getAccount_ref(int id, int pin) const {if(bob) bob→ol_reference( );
return bob;
}

This is a simple example in which getAccount returns Bob's account. Note that the actual method name is "getAccount_ref" with "ref" appended since this method will return an object by reference. Also, notice that before simply returning the global variable Bob, the reference count is incremented since getaccount is passing a new reference.

Typically the skeletons are created in the server side. Then the skeletons may be registered in the name server, as indicated by the following exemplary code:

```
extern WxBankAccount* bob; // global used by Bank::getAccount()
void main(int argc, char* argv) {
    RWWinSockInfo winsock; // initialize the socket library
    WxRemoteConnectionServer s; // create the socket server
    WxBank bofa; // create a bank
    WxBankAccount joe; // create joe's account
    joe.set_balance(0); // with a $0 balance
    bob = new WxBankAccount( ); // create bob's account
    bob->set_balance(10000); // with a $100 balance
    bob->deposit(20000); // then, deposit $200.
    // register bofa with a global name --- after everything else is done!
    bofa.set_ol_name(new String("BofA"));
    // start the connection server receiver
    RWThread server =
        rwMakeThreadFunction(
            s,&WxRemoteConnectionServer::run,(RWBarrier*)0);
    server.start( );
    server.join( );
}
```

The client may have the following exemplary code:

```
// create a global function which is called from a RogueWave thread.
void async( ) {
    WxRemoteConnectionMonitor monitor;
    WxRemoteClient* local = monitor.client("localhost");
    WxBank* bofa = LOOKUP(WxBank,"BofA",local);
    WxBankAccount* bob = bofa->getAccount(10,20); // arguments are
    dummy
    cout << "bob's account balance is (should be 30000):"
        << bob->get_balance( ) << endl;
    bob->withdraw(5000); // withdraw $50.
    cout << "bob's new balance is "<<bob->get_balance( ) << endl;
}
void main(int argc, char* argv) {
    WxRemoteObject::initializeStringExecutionTables( );
    WxBankSkel::wxClassHierarchy( );
    WxBankStub::wxClassHierarchy( );
    WxBankAccountSkel::wxClassHierarchy( );
    WxBankAccountStub::wxClassHierarchy( );
    RWWinSockInfo winsock;
    // start the RogueWave thread - and wait until it exits
    RWThread thread = rwMakeThreadFunction(async);
    thread.start( );
    thread.join( );
}
```

Advantageously, in this way the programmer does not have to know, nor care, whether the object "bob" is local or remote.

Figure 19:
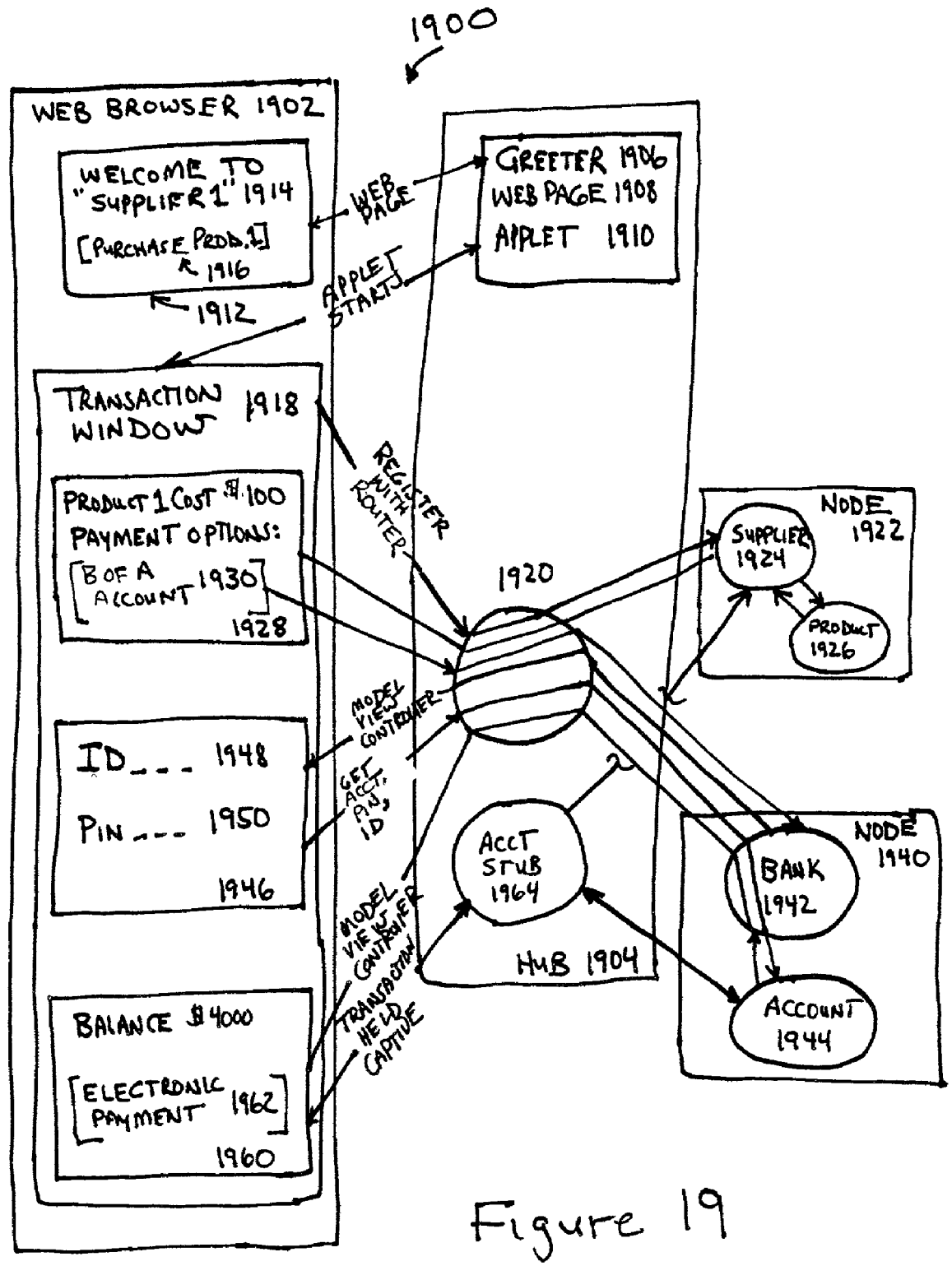
FIG. 19 conceptually illustrates a multi-service provider transaction, according to one embodiment.

FIG. 19 conceptually illustrates a multi-service provider transaction 1900, according to one embodiment. In this particular example, a web browser client 1902 accesses a remote hub 1904 that serves as a network entry point.

The hub 1904 includes a greeter 1915, which may be software or a dedicated server. In this case, the greeter 1906 contains a web page 1908 containing HTML code and an applet 1910. The web page 1908 presents a window 1912 in the browser client 1902 including text 1914 and a selection mechanism 1916 to indicate a particular transaction (e.g., in this case to purchase product 1).

In response to a selection of the mechanism 1916 the applet 1910 starts running in the client 1902 to present a transaction window 1918 and a VAN switch (not shown) may switch to a particular transactional application associated with the mechanism 1916. This may include registering with an object router 1920. The router 1920 may then route to a first node 1922 including a supplier object 1924 and a product object 1926 which may then return window 1928 including a cost $100 for product 1 and payment options including a mechanism 1930 to allow payment from a particular bank's bank account.

In response to selection of the mechanism 1930 the router 1920 routes to a second node 1940 including a bank object 1942 associated with the bank. The bank object 1942 returns a window 1946 including an ID entry mechanism 1948 and a Personal Identification Number (PIN) entry mechanism 1950.

In response to submission of a corresponding ID and PIN the object router 1920 routes to the bank object 1942 and an account object 1944 corresponding to the ID and PIN. The account object 1944 returns a window 1960 including account corresponding to the client of the ID and PIN including a balance of $4000 and an electronic payment option mechanism 1962.

An account stub 1964 may also be activated or transferred to the hub 1904 to correspond and interface to functions associated with the account object 1944. In response to selection of the payment option mechanism 1962 the account stub 1964, the account object 1944 and the supplier object 1924 may interact and process so that the purchase price of $100 for the product 1 is paid from an account of the client to an account of the supplier.

Numerous variations and alternative embodiments are also contemplated for a multi-service provider transaction. For example, several single-directional arrows have been shown for purposes of clarity, however any or all of these arrows could represent bi-directional communication. Additionally, certain objects (e.g., supplier object 1924 and product object 1926) could be combined, or further subdivided into additional objects. Accordingly, the example is to be viewed in an illustrative rather than a restrictive sense.

Figure 20:
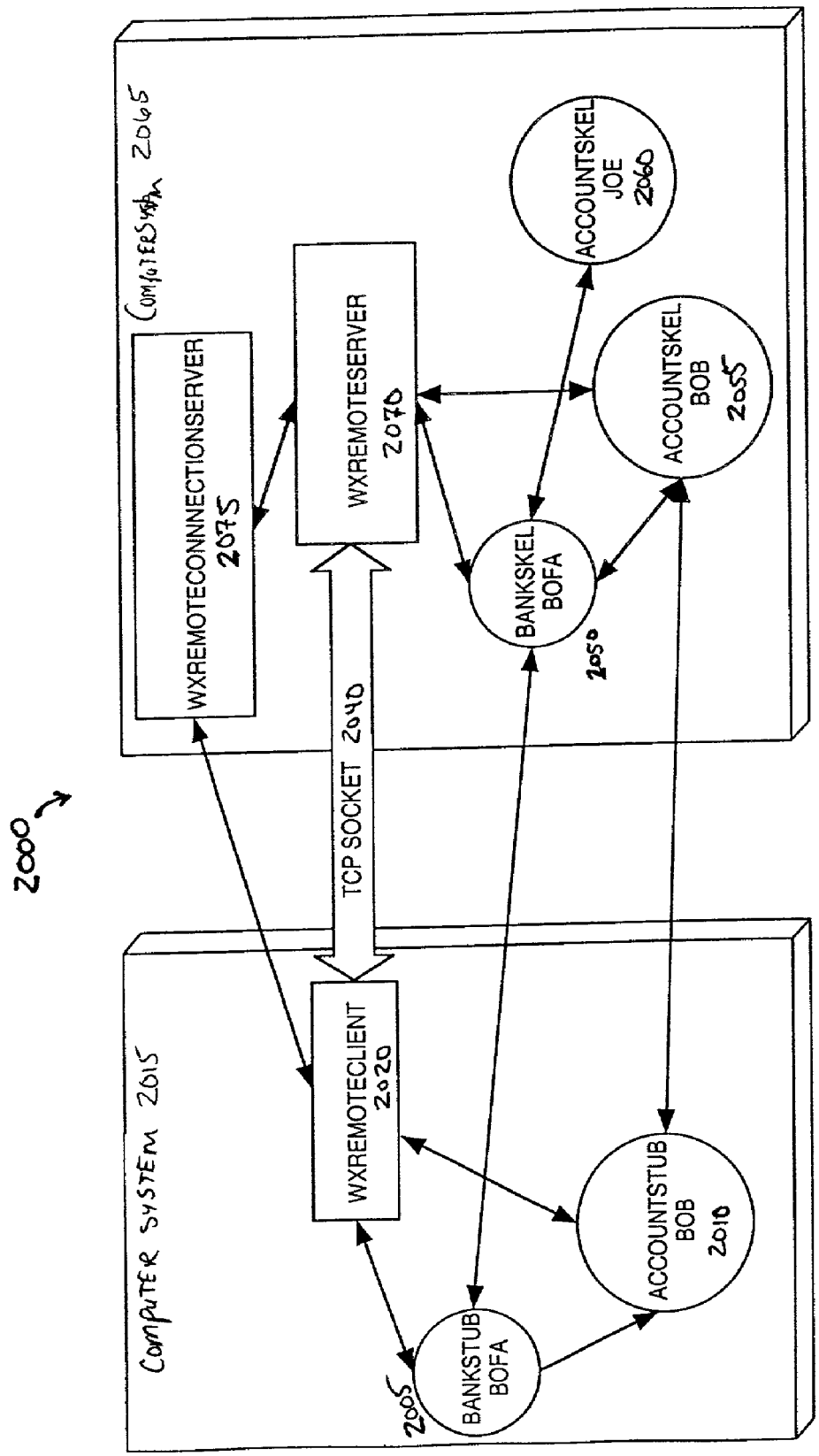
FIG. 20 conceptually illustrates an exemplary architecture for a bank transaction, according to one embodiment.

FIG. 20 conceptually illustrates a banking transaction 2000, according to another embodiment. As shown, stub components 2005, 2010 may be located on a first computer system 2015 and corresponding skeleton components 2050, 2055, 2060 may be located on a second computer system 2065. These components may behave as described elsewhere in the present application.

The first computer system 2015 may have a WXREMOTECLIENT object 2020 to request access into the service network. The second computer system 2065 may have a WxRemoteConnectionServer object to receive the request and serve as the entry point into the service network. This is an object of the main class of the server side of the object router. The WxRemoteConnectionServer then connects the WxRemoteClient with the WxRemoteServer. Then, the WxRemoteClient and WxRemoteServer may communicate by a TCP socket 2040. By way of analogy, this is similar to a person (WxRemoteClient) dialing up a telephone operator (WxRemoteConnectionServer) and the operator directing the call to the correct person (WxRemoteServer).

Figure 21:
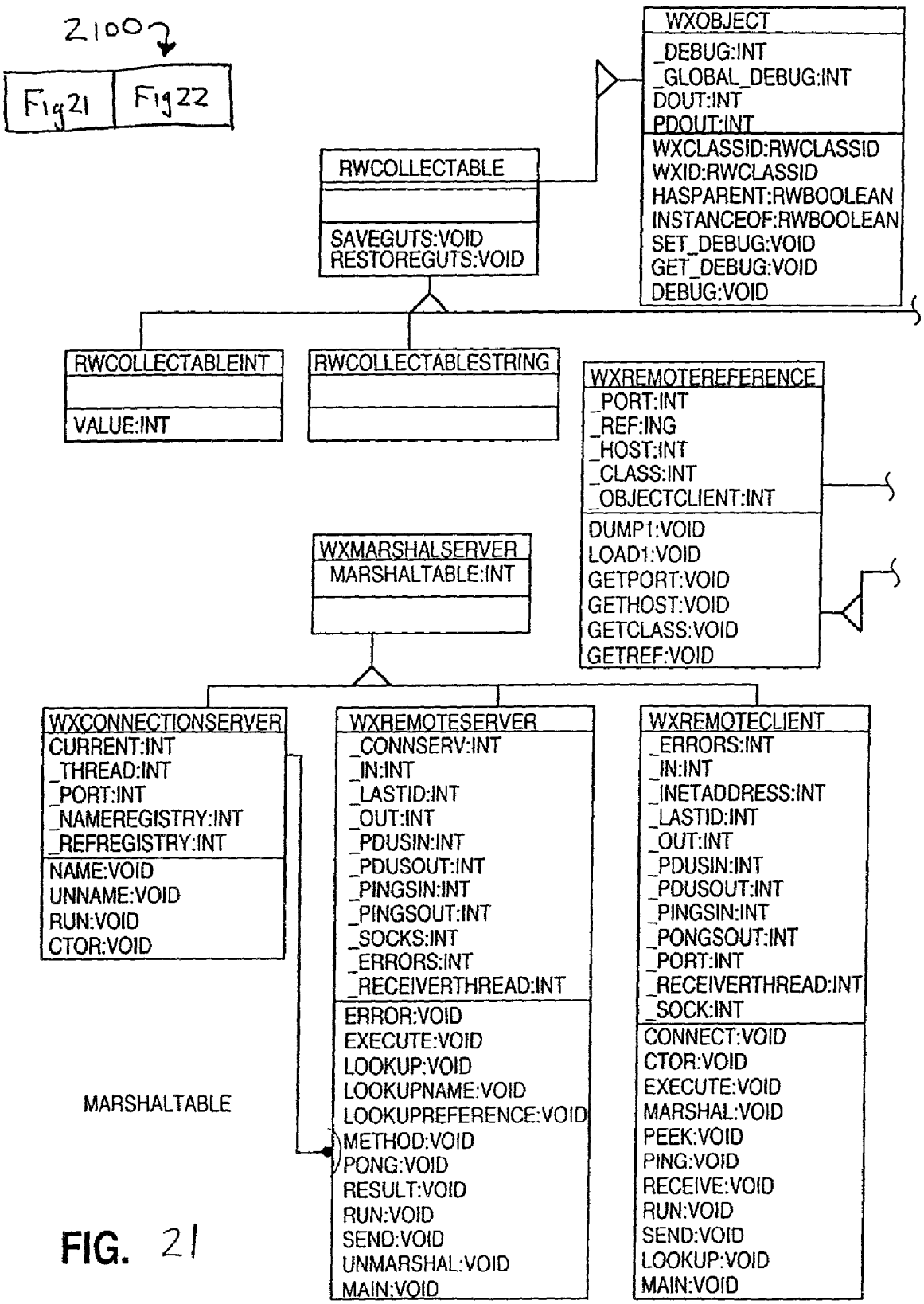
FIGS. 21-22 conceptually illustrate an exemplary class diagram showing object classes to implement one embodiment.
Figure 22:
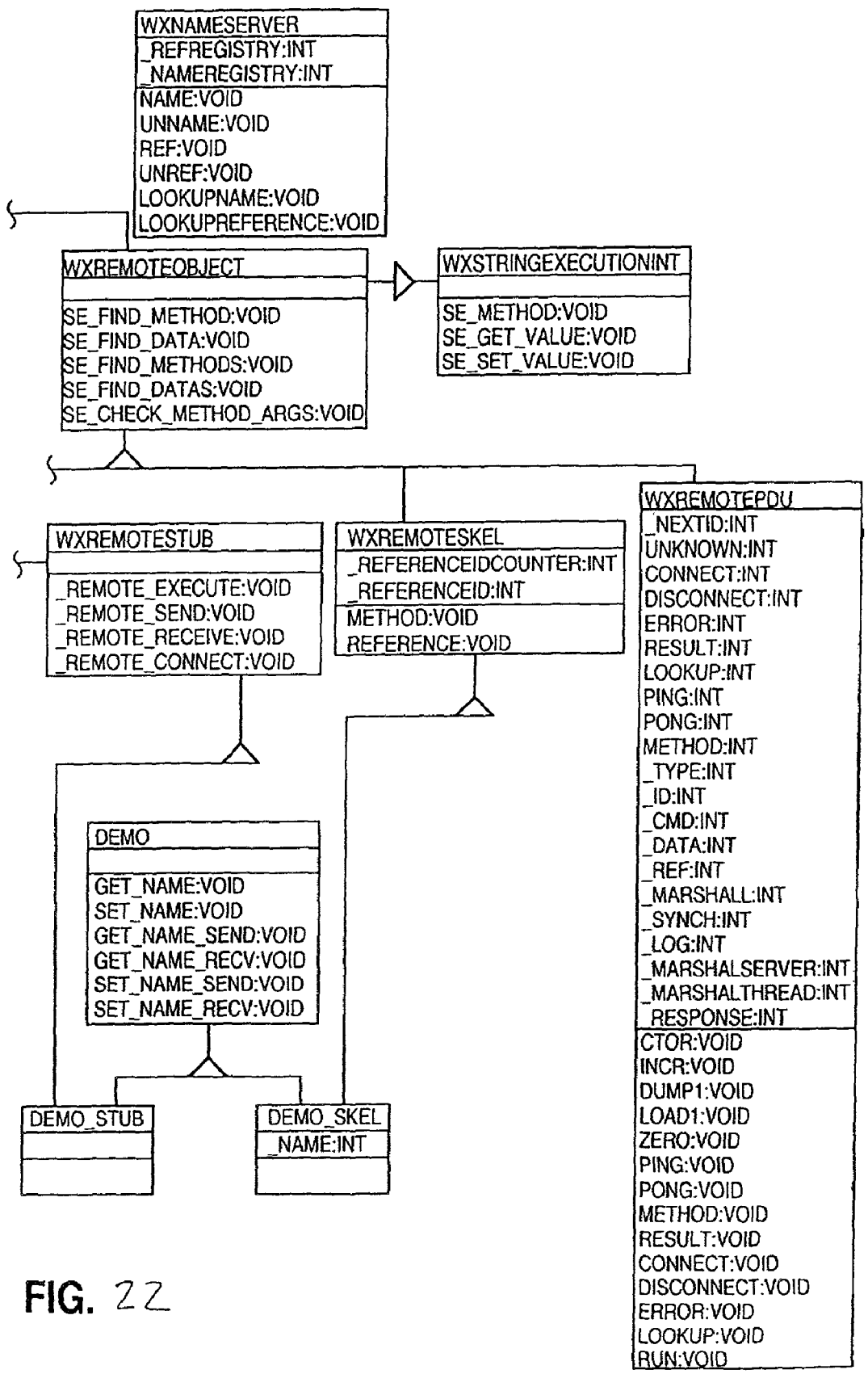

FIGS. 21 and 22 conceptually illustrate a class diagram showing the classes and functions of an object router of one embodiment. The schematic 2100 shows the relationship between FIGS. 21 and 22. A brief discussion of the classes and functions will be provided to further illustrate operation of an object router. Those having an ordinary level of skill in the art will appreciate that other object routers, classes, class models, and functions are contemplated.

WXREMOTEOBJECTINT

This is an interface typically included in all remote objects. The interface usually contains several abstract class definitions, including WxStringExecutionInt, WxLock and WxFlags. It may also define methods that are used by all or multiple remote objects.

RWBoolean ol_isValid( ) const
This may be tested if the programmer does not know if this object is local or if the connection is established. This will return TRUE if the object is local or it has a connection to the remote object.

unsigned get_ol_referenceCnt( ) const
This returns the number of pointers outstanding for this object. Typically, if garbage collection is enabled, this object will automatically be destroyed when the referenceCnt reaches zero.

WxReferenceId get_ol_referenceID( ) const
This is the remote referenceId for this object. This WxReferenceId uniquely tags an object instance on the server for the established connection. This is not a well-known name in the sense that it is not guaranteed to be the same with a difference connection.

unsigned ol_reference( ) const
This increments the number of references outstanding. Typically this will be performed whenever a new copy of the pointer is stored.

void ol_unreference( ) const
This decrements the reference count and should be called instead of delete.

Object* ol_Object( ) const
This type casts this instance to an RWCollectable pointer.

WxRemoteStub* ol_Stub( ) const
This will return a stub for this object. If the object is local it will create a stub, otherwise if this is already a stub it will increment the reference count.

WxRemoteSkel* ol_Skel( ) const
This will return a skeleton for this object. If this is a skeleton it simply increments the reference count. If this is a stub it will create a new skeleton, copy the data, and return it.

WxRemoteReference* ol_remoteReference( ) const
This will create a WxRemoteReference object that is used for serialization.

WxRemoteObject
This is the actual first level implementation of the above interface and adds String Execution to the above functions. Typically all of the router objects are derived from this object.

WxRemoteReference
This is a type of network "pointer" which indicates where the actual skeleton object resides. It contains the following data: RWInetHost host; int port; RWClassID classID; and WxReferenceId referenceId. The port and host uniquely specify the socket for the WxRemoteConnectionServer. The referenceId uniquely specifies which object on the WxRemoteConnectionServer is pointed to. The classID is used to construct a local stub object.

WxRemoteStub
All stubs are derived from this object and the abstract base object for the class. This object provides some interfaces to the object router library that is used by the meta compiler.

WxRemotePDU*_ol_execute(WxRemotePDU* pdu) const
This will block until ol execution is finished. It will take the pre-formatted PDU.

WxMarshalId_ol_send(WxRemotePDU* pdu) const
This is a non-blocking remote execution, which returns a WxMarshalId that may be used to receive the result.

WxRemotePDU*_ol_peek(WxMarshalId id) const
This checks if the PDU id is returned from execution.

WxRemotePDU*_ol_receive(WxMarshalId id) const
This blocks until the PDU is returned.

WxRemoteClient*_ol_connect( ) const
This ensures the connection to the other side is established.

WxRemoteSkel
All skeletons may be derived off this object and the abstract base for the class. This object provides the interface ol_methodPDU( ) for the meta compiler to the object router.

WxRemotePDU
This is the actual data packet sent across the network. The data in this are:

WxMarshalId id
This is the PDU packet number, typically a monotonically increasing integer to uniquely identify the packet.

Unsigned Flags
These are option flags to modify the execution of this protocol. The flags may include:
Syn—this will perform synchronous execution of the packet at the server (no threads).
NoMarshal—this is an unconfirmed execution similar to UDP.
Log—this will log this request
Response—this indicates that the PDU is a response
Val—this indicates that the result should be a value rather than a reference.

Unsigned Type
This is one of several known protocol operations:
Disconnect—close the connection between WxRemoteClient and WxRemoteServer
Error—an error occurred in processing the request
Result—a packet containing the result of a request
Lookup—a request to find a WxRemoteReference based on a well-known name in the WxRemoteNameServer
Ping—a request for the server to send a Pong back.
Pong—a response from the server to the client to a Ping
Method—a request to execute the command on the server
Unreference—a request to decrement a reference count.
Reference—a request to increment a reference count.

RWCString cmd
This is an ASCII string command to execute on the remote server. This is the "name" in a Name-Value pair.

WxReferenceId referenceId
This is the object WxReferenceId on the server to uniquely identify the object of this PDU.

Vector* data
This is the data for a method execution. This is the "value" in a Name-Value pair.

WxRemoteConnectionServer
This is the main class on the server side of the object router that may serve as an entry point into the system for a WxRemoteClient requesting access. It may connect the client with the correct objects to perform the transaction.

WxRemoteConnectionMonitor
This is the main class on the client side of the object router that may serve as an entry point into the system for a connection and to create a WxRemoteClient for a particular destination. By way of analogy, this is similar to a phone operator who directs outbound calls to the correct person. That person, in this analogy, is the WxRemoteConnectionServer.

WxRemoteServer

This is a component on the server side of the client-server communication channel to process each inbound request. The WxRemoteServer will spawn a new thread for each WxRemotePDU method packet. There is one WxRemoteServer for a WxRemoteClient.

WxRemoteClient

This is a component on the client side of the client-server communication channel to send each outbound request and rendezvous with the inbound response. There is one WxRemoteClient for a WxRemoteServer.

WxRemoteError

This is the class that is thrown by both the client and server side when an error is detected. These may be fatal and non-recoverable.

WxRemoteException

This is a class that is thrown by both the client and server side when an exception is detected. These may not be fatal and the programmer may provide recovery code, as desired.

Figure 23:
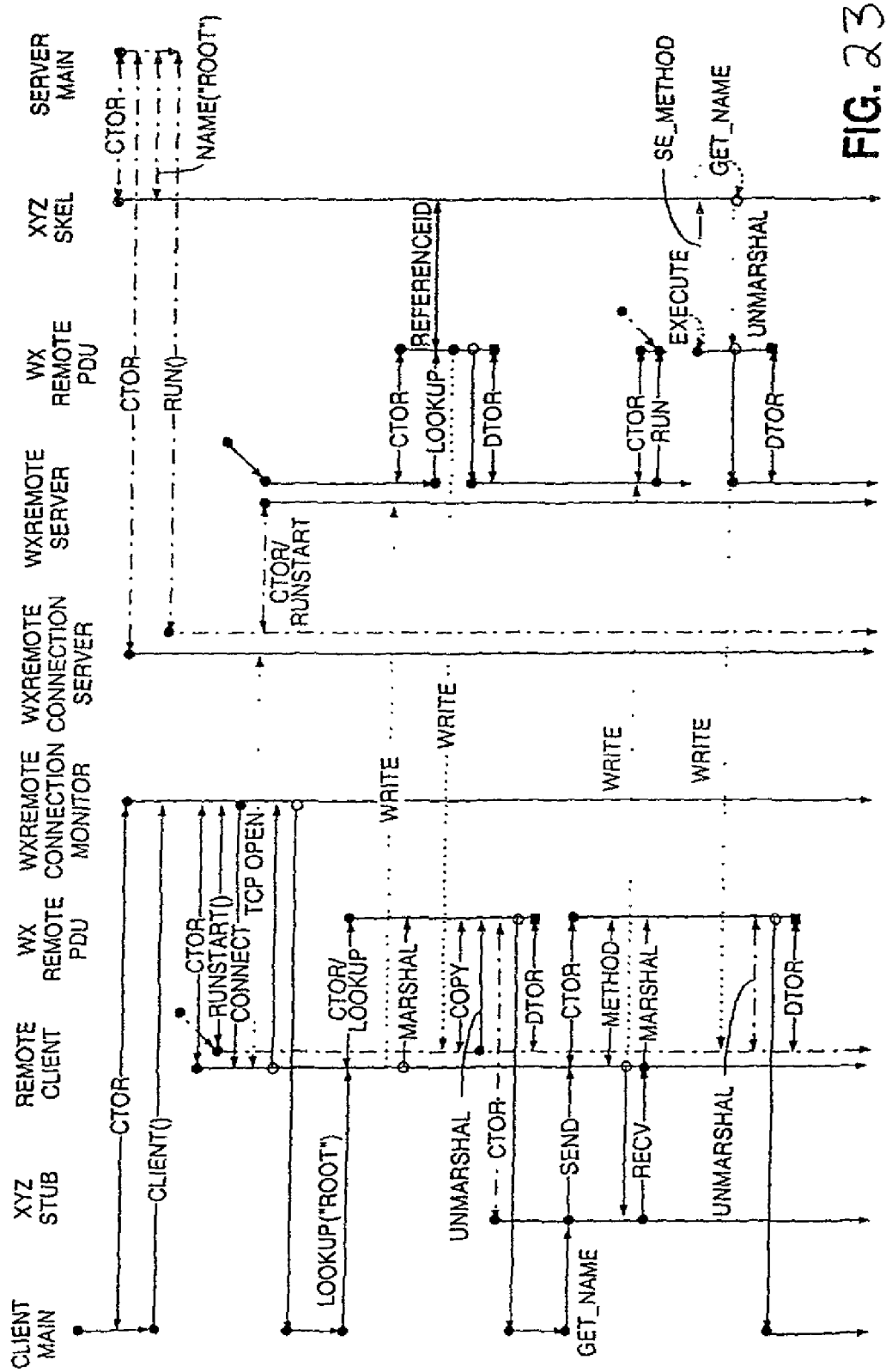
FIG. 23 conceptually illustrates a timing diagram for a router, according to one embodiment.

FIG. 23 conceptually illustrates a timing diagram for an object router, according to one embodiment. The timing diagram represents the startup of the object-layer on both the client and server sides and shows the operation and timing of objects and threads. It also demonstrates a lookup("root") call from the client and a later getname( ) method call on the root object. The vertical lines represent the objects, data, and functions used in the client and server sides. The horizontal lines represent the threads in the operating system. Different threads have different line patterns. There are two threads shown on the client side (left) and there are three on the server side (right). Also, the dotted "write" line represents TCP traffic between the two machines (client and server).

Distributed Online Service Information Bases

Certain embodiments of the present invention may use a virtual information store suitable for a network. Without limitation, a specific type of virtual information store, referred to as a Dynamic Distributed Online Service Information Base (dynamic DOLSIB), will be discussed in greater detail. Other virtual information stores are contemplated.

The object router may use the dynamic DOLSIB to perform routing. For example, the object router may access the dynamic DOLSIB to obtain information about distributed software objects that has been recorded in the DOLSIB. Typically, the enterprise will be customized for each merchant. The following sections cover an overview of the architecture for the DOLSIB and a uniform interface that allows the service provider to provide a customized interface for the business objects using a simple Extended Finite State Machine (EFSM) or DOLSIB language. A library is also described that provides the core parser and interpreter for the DOLSIB. This library may also serve as the base class for business and management objects that will interface with the enterprise interface.

Before continuing with the detailed explanation of the present invention and various exemplary embodiments of the present invention, it may be helpful to briefly explain some terms, without limitation, that will be used in the discussion below. These explanations are provided to facilitate understanding of the following text, rather than to limit the invention. The term "state" will be used to refer to the set of values describing the current position of the machine if it has memory. The term "transition" will be used to refer to the action and state change performed by the machine after receiving an event. The term "event" will be used to refer to the inbound trigger that causes the machine to perform some transition. The term "action" will be used to refer to the output of the machine as a result of a transition. The term "diagram" will be used to refer to a complete finite state machine description containing states and transitions.

The architecture of a business object may at least conceptually comprise four parts, including: (1) the Extended Finite State Machine (EFSM) DOLSIB in the CoreBusinessObject or Management Object (C++), (2) the object router interface for the business or management object to the DOLSIB. (C++), (3) the enterprise interface protocol (specification), and (4) the DOLSIB instructions for the business or management object (EISM). The first part (DOLSIB and CoreBusinessObject or management object) may be built only once and may be part of the object router library. The second part may be built as a common business object and should be generic enough to be configurable for different merchants. The third part is a specification that may be written by the merchant for his own enterprise interface. The fourth part may be configurable during runtime for different business or management objects.

The following sections further discuss the DOLSIB, the language and grammar of the DOLSIB, and the CoreBusinessObject or management object. Specific examples, in this case banking examples, illustrate different service provider enterprise interfaces.

Figure 24:
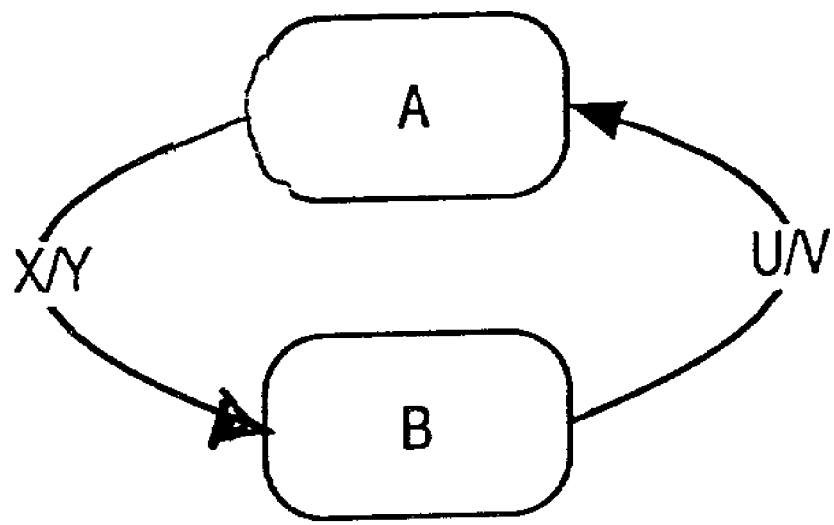
FIG. 24 conceptually illustrates a Finite State Machine (FSM), according to one embodiment.

FIG. 24 conceptually illustrates a simple Finite State Machine (FSM) 2400 that is useful for understanding concepts of a DOLSIB and an Extended FSM (EFSM). The FSM 2400 includes the two states S={A, B} and the two transitions T {t1, t2}. A transition t consists of an initial state ts, an event e that triggers an action a, and a final state tf. The transitions can be described as t1=(A, X, Y, B) and t2=(B, U, V, A). The transition t1 from state A to state B is triggered by an event X and causes an action Y. Likewise, the transition t2 from state B to state A is triggered by an event U and causes an action V. If the FSM 2400 is in state A and receives any event besides X, it will remain in state A. In this way, the FSM 2400 responds to valid events having predetermined transitions by changing its state.

Typically a FSM has a finite set of states. An extended FSM does not have this limitation and may be used to provide a dynamic DOLSIB. Here the states are not finite, per se; there exists a number of finite state "blocks" on the diagram, but there are also global variables that may store values that take on an infinite number of possibilities. This adds another dimension to the FSM and makes the whole system have an infinite number of "states".

Figure 25:
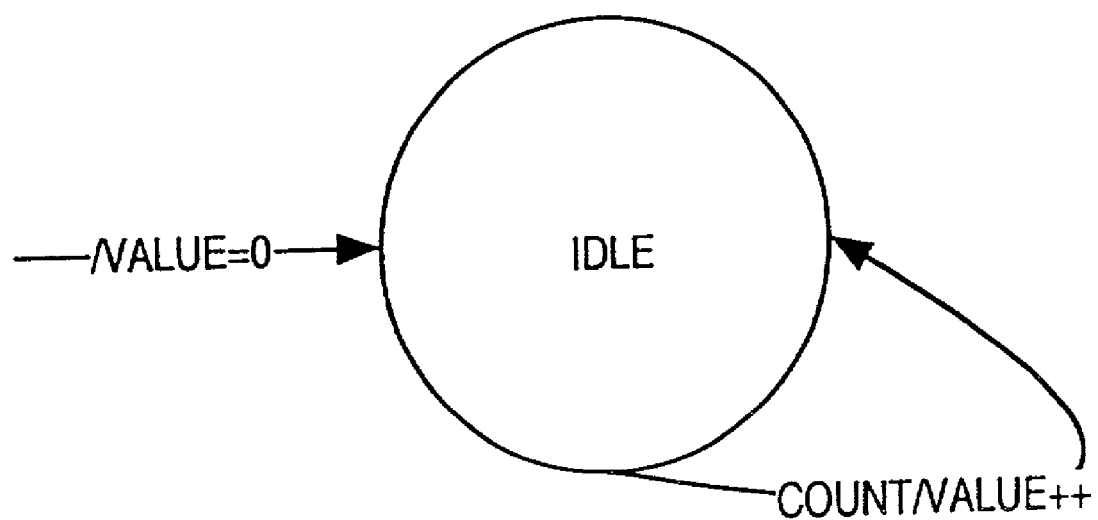
FIG. 25 conceptually illustrates an Extended Finite State Machine (EFSM) counter, according to one embodiment.

FIG. 25 conceptually illustrates a counter implemented with an EFSM. The counter can count to any desired number using a single idle or initial state. The counter simply outputs the count value and increments this value. Such a counter may be expressed in a DOLSIB language that will be further discussed elsewhere in the application. For example the counter may be represented by the following code:

```
state Idle;
event count;
var value=0;
var str="";
diagram Counter;
Counter (Idle) {
    Idle : count ? value++ -> Idle;
}
```

The code describes the counter beginning in the idle state. Given the count event, the counter will increment the variable value and output this as an action. The arrow ".fwdarw." signifies that idle is the new state. Such code provides a simple way for a programmer to describe the events and actions of the machine.

According to one embodiment, the Enterprise Interface State Machine (EISM) DOLSIB language may be a C-style DOLSIB EFSM language similar to ISO's Estelle. DOLSIB EISM is based on C style conventions, while Estelle is a Pascal language extension. The ISO Estelle language is defined as a superset of the Pascal language and fits nicely with the language. The DOLSIB EISM language is similar in that it conforms to the syntax of C. The DOLSIB EISM language may provide for more than one state machine diagram (and thus, more than one state machine) to be described and operated by the same script. The state machine may be interpreted allowing for bytecode compilation into a stack machine opcode. The stack-based machine allows for a simple implementation and compilation of the parsed state machines. This also allows for other languages in the future. For example, a language other than C may be interfaced. The programming language includes a simple ASCII English language equivalent of the C-style convention.

Figure 26:
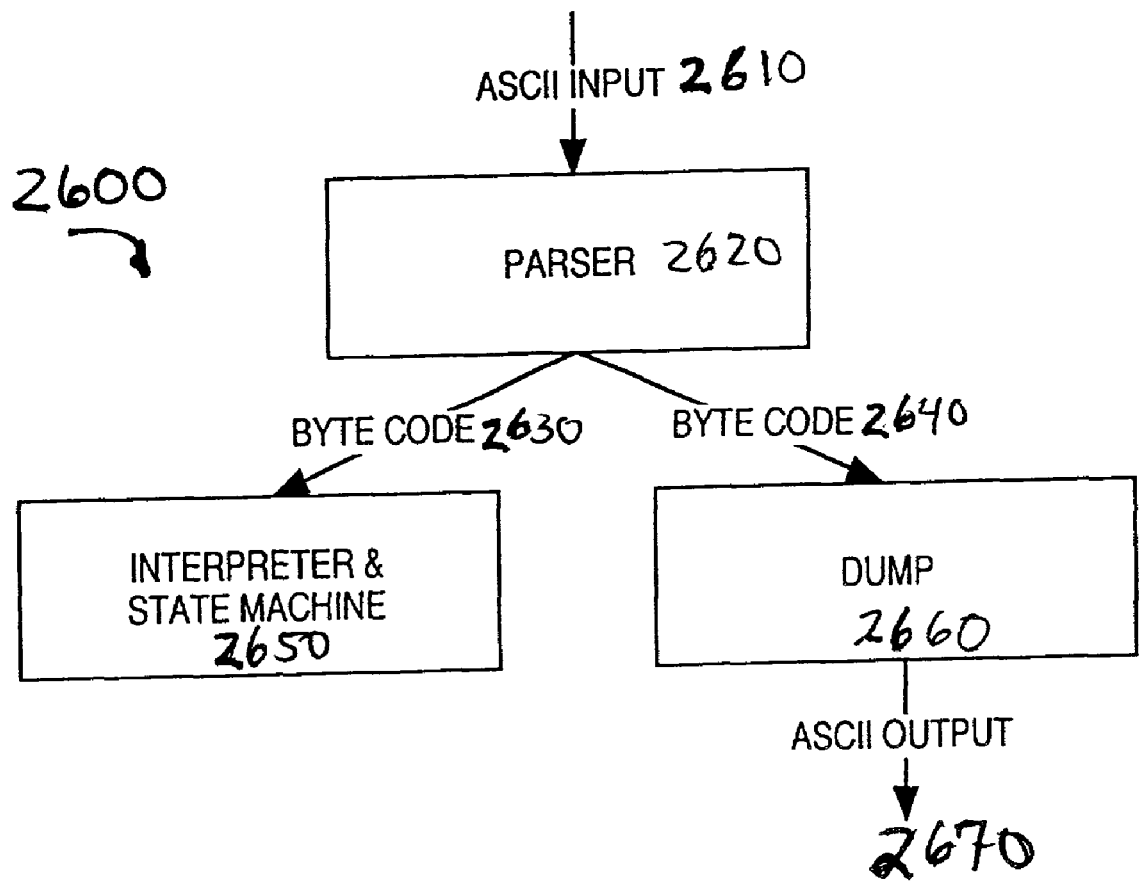
FIG. 26 conceptually illustrates code processing, according to one embodiment.

FIG. 26 conceptually illustrates a scheme, files and programs for a state machine 2600 to create an intermediate bytecode that is interpreted by the stack machine, according to one embodiment. An ASCII input file 2610 is written in a DOLSIB EISM language and passed off to a parser 2620. The parser 2620 converts the input file 2610 into byte code 2630, 2640. The byte code 2630 can then be used to run the stack machine 2650 as a state machine or the byte code 2640 may input a dump program 2660 that creates an ASCII output 2670 object file dump of the instructions and the symbol table.

The parser 2620 may take the input ASCII 2610, parse it for syntax and syntactical errors, and then create a stack machine instruction set 2630 for the resulting state machine 2650. The conversion of the state machine diagram into a stack machine saves time for the run time interpreter and does the preprocessing of the symbol table.

The interpreter 2650 may be a simple stack machine that receives input events and sends out actions. The stack machine 2650 contains a very limited set of instructions to perform the basic arithmetic and conditional chores at run time.

The dump program 2660 is a debugging tool. The program 2660 may prints out the symbol table and the instructions for each stack op code.

Symbols may be used. The symbols may have names that include an alphanumeric string ([A-Za-z][A-Za-z$_{0-9}$]*) and the name typically should not that match that of a keyword. Depending on the implementation the names may be case sensitive. Symbols may be declared before they are used and before the first diagram body. Symbols of the same type may be declared within the same command. Symbols may be scalar or vector and the length of a vector may be declared with the symbol type. For example, valid declarations may be: (a) state xyz[4]; (b) event test; (c) var x=0,y=1,z=4; (d) var a="apple",b="banana". There may be different types of symbols. For example, there may be the following five types: diagram, action, event, state, var. Symbols may have a value when evaluated and have a particular function used as an input to the DOLSIB EISM. Table 1 shows evaluations based on type of symbol.

TABLE 1

| Symbol Type | Evaluation |
| --- | --- |
| diagram | current state id |
| action | value of the action; default is zero |
| event | value of the event if current event; zero otherwise |
| state | non-zero if this is the current state. |
| var | an integer or string variable |

Table 2 shows assignment actions of symbols of different types when entered into the DOLSIB EISM. The action may be different from the action of the symbols within a program.

TABLE 2

| Symbol Type | Assignment Action |
| --- | --- |
| diagram | changes the current state of this diagram to the assigned state |
| action | sets the action value |
| event | sets the event value |
| state | ignored |
| var | sets the variable |

The above assignments within the DOLSIB EISM program are valid with the possible exception of state. The state may be a read-only condition of the current system. In which case the programmer may change the state of the diagram within DOLSIB EISM using the diagram assignment.

Each declared symbol may have an associated integer ID. The integer ID may begin with zero (for the variable "nil"). This variable is usually declared and may be used as an event to trigger transitions. Other symbols may be assigned beginning with one and incremented according to the order they are declared in the program. An integer may be assigned to each element of a vector. Table 3 illustrates IDs for the previous example:

TABLE 3

| Name | Type ID |
| --- | --- |
| Nil | int 0 |
| xyz[0] | state 1 |
| xyz[1] | state 2 |
| xyz[2] | state 3 |
| xyz[3] | state 4 |
| test | event 5 |
| x | var 6 |
| y | var 7 |
| z | var 8 |
| a | var 9 |
| b | var 10 |

An exemplary program is presented below to further illustrate possible statements in a DOLSIB EISM related program. The symbols in the program may be declared as one of the five types followed by at least one diagram. Consider the simple state diagram that counts the number of incoming count events and dumps the count upon receiving the event dump. This state diagram could be written in DOLSIB EISM as:

```
state Idle;
event count,dump;
var n=0;
diagram Counter;
Counter (Idle) {
Idle : count ? n++ -> Idle
| dump ? n( ), n=0 -> Idle;
}
```

All the symbols are declared. The state diagram is named "Counter", and the line Counter (Idle) {begins the diagram definition. The state Idle is placed in parentheses to show that it is the initial state. In this case if no state is declared as the default, the first state in the state diagram is considered the default.

The state transition may be described in many different formats. The one shown above would have the following meaning: If in state Idle and event count is seen, then increment n and go back to state Idle else if event dump is seen, then output n and n to zero, then go back to state Idle. This state transition may also be written in DOLSIB EISM as:
   if Idle and count then n++ enter Idle
   else dump then no, n=( ), m=0 enter Idle;
This form may be more understandable. In either case, the keyword "if" is optional. Table 4 shows keywords and symbols that are interchangeable, according to one embodiment.

TABLE 4

| Symbol | Meaning |
| --- | --- |
| : with and | introduces first arc |
| ? then | follows arc conditional expression |
| –>begin enter | signifies which state to enter if conditional is true |
| \|else elsewith | introduces next arc |

A variation on the command structure is the ability to specify outputs without the parentheses. The normal meaning of n would be to output an action that has an ID of n and a value equal to n. For example, one could specify n(5) to set the value of n to five and then output n. One may also explicitly output a symbol as: Idle with dump then enter Idle output n; instead of the first arc. Notice, that the two proceeding statements may be interchangeable.

According to one embodiment, the grammar may be specified similar to BNF form. For example, brackets "[ ]" may surround optional items, a vertical bar may be used to show alternatives, and bold symbols may be actual keywords. Consider the following exemplary form:

```
program       :decl diagrams
decls         :decl | decls decl
decl          :type defs;
type          :diagram | state | event |int | action
defs          :def | defs, def
def           :lvalue | lvalue = const
diagrams      :diagram | diagrams diagram
diagram       :diagram_init {lines}
diagram_init  :diagram_symbol (state_symbol)| diagramsymbol
lines         :line | lines line
line          :[if] states with cmds;
with          :with | and |:
states        :state_symbol | states, state_symbol
cmds          :cmd | cmds else cmd
else          :elsewith | else ||
cmd           :exprs then acts begin state_symbol [output outs]
then          :then | ?
acts          : act | acts, act
act           :lvalue ([expr])
              | expr
begin         :begin | enter | –>
outs          :lvalue | outs, lvalue
exprs         :const | state_symbol | & symbol | lvalue | asgn
              | (expr)
              | expr cmpop expr
              | expr logop expr
              | expr arthop expr
              | NOT expr
              | – expr
cmpop         :LT | LE | EQ | NE | GT | GE
logop         :AND | OR
arthop        :+| – | * | / | %| ..
asgn          :lvalue ASSIGN expr
              | lvalue ++
              | ++ lvalue
              | lvalue – –
              | – – lvalue
const         :".*" | [0–9][0–9]*
lvalue        :symbol | symbol [expr]
```

Core Business Object or Management Object

The core business or management object that is used to derive other objects may have embedded in it the FSM to be able to parse the EISM DOLSIB with diagrams. Business and management objects may interface with a back-end channel to communicate with enterprise computer systems. The core business or management object may be remotely accessible and may be integrated with the object router. Further, it may have interfaces to the enterprise computer systems and to the FSM. FIG. 27 shows code describing a CoreBusinessObject object router, according to one embodiment.

Example Bank Application (BankAccount)

A service provider may customize the back end communication channel for their intended application and service offerings. In one case the invention is implemented in a way that allows for these different capabilities and customizable features. Consider a simple bank account class that has a balance query and withdraw and deposit methods to change the account balance:

```
class BankAccount {
    int balance( ) const;
    void withdraw(int amount);
    void deposit(int amount);
}
```

Given this object, a programmer may query the account balance from within the object-oriented C++ environment. However, the actual mechanics of talking to the back end may vary from merchant to merchant. This may be handled using an intermediate machine to connect with the back-end to communicate using a name-value pair protocol that is modifiable. Consider two banks B1 and B2. B1 may query the back-end for a balance of an account by sending the account number and then the word "balance:query". More specifically, this may be done as follows: (1) send("account_number"), (2) send(<eid>), (3) send("balance:query"), (4) expect ("amount"), (5) expect(amount), and (6) return amount.

B2 may need confirmation that the account number is set and then send the "balance" query. More specifically: (1) send("account-number"), (2) send(<account number>), (3) expect(status), (4) send("balance"), (5) expect(amount), and (6) return amount. Bank B2 has more operations and may have more error conditions.

Figure 28:
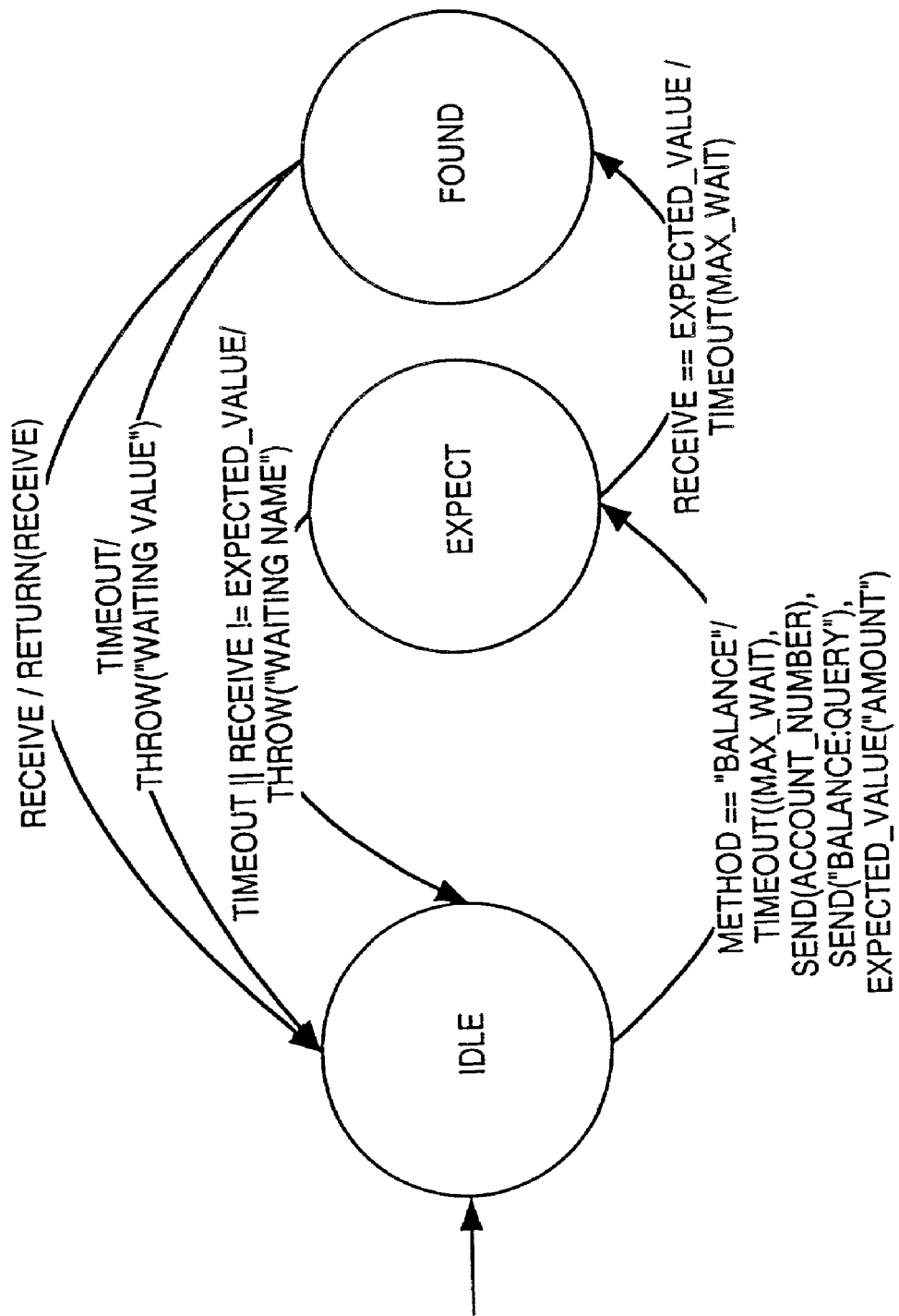
FIG. 28 conceptually illustrates an exemplary Distributed Online Service Information Base (DOLSIB) FSM diagram for a bank, according to one embodiment.

FIG. 28 conceptually illustrates an exemplary DOLSIB FSM diagram for balance for bank B1, according to one embodiment. These may be used to configure the BankAccount class. The diagram shows B1 being more complicated due to added error transitions. The state diagram may be viewed as an expect script for a modem that sends out requests and expects back responses matching a particular string. DOLSIB EISM language corresponding to the diagram may be as follows:

```
/* the following are automatically declared by DOLSIB interface:
        state Idle; // default initial state
    state Expect; // waiting on receive == expect_value
    state Found; // default state after receiving expect_value
    state Error; // default error state
    event receive; // indicates the enterprise interface has data
    event timeout; // indicates the timer has expired
    event method; // indicates a method call has started
    action return; // returns from the method call
    action send; // sends data to the enterprise interface
    action throw; // returns from the method call with a throw
    var max_wait=1000; // the default timer value
    var eid=0; // the enterprise id
    var expected_value=""; // waited value
*/
diagram Balance;
Balance(Idle) {
  Error : true ? -> Idle
  Idle
        : method == "balance" ?
            timeout(max_wait),
            send(eid),
            send("balance:query")
            expected_value = "amount"
        -> Expect;
  Expect
        : receive == expected_value ?
            timeout(max_wait)
        -> Found
        | receive != expected_value ?
            throw("expected" ..expected_value
            .."but received"
            ..receive)
        -> Error
        | timeout ?
            throw("timeout while waiting for" ..expected_value)
        -> Error;
  Found
        : receive ?
            return(receive)
        -> Idle
        | timeout ?
            throw("timeout while waiting value")
        -> Idle;
}
```

Figure 29:
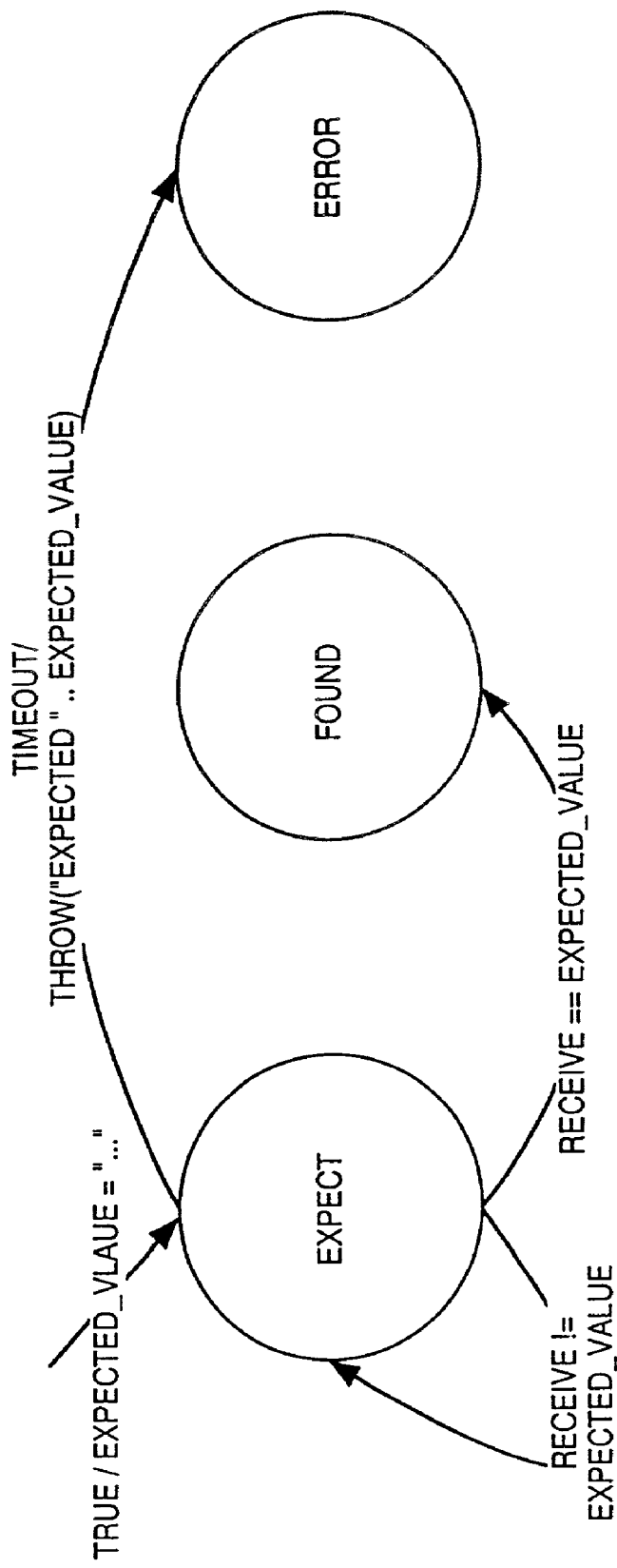
FIG. 29 conceptually illustrates a diagram with expect, found, and error states.

FIG. 29 conceptually illustrates a diagram including expect, found, and error states. As discussed, the service provider may interact with and expect something from the enterprise interface. Rather than creating a new state for each such "expect" string, a predefined set of states "Expect", "Found" and "Error" may be used. The state transitions defined are for the "Expect" state. A programmer may provide the arcs for the Error and Found states. The defined arcs of the Expect state may have a program similar to the one shown in the example for bank B1:

```
Expect
    : receive == expected_value ?
        timeout(max_wait)
    -> Found
    | receive != expected_value ?
        throw("expected" .. expected_value
        .."but received"
        .. receive)
    -> Error
    | timeout ?
        throw("timeout while waiting for" .. expected_value)
    -> Error;
```

Using the expect state for more than one string (more than one expected response) may include making use of the "extended" nature of the DOLSIB EFSM. Namely, global variables may be used to store the other dimension of state. This is shown with the second bank example using the variable "step".

Figure 30:
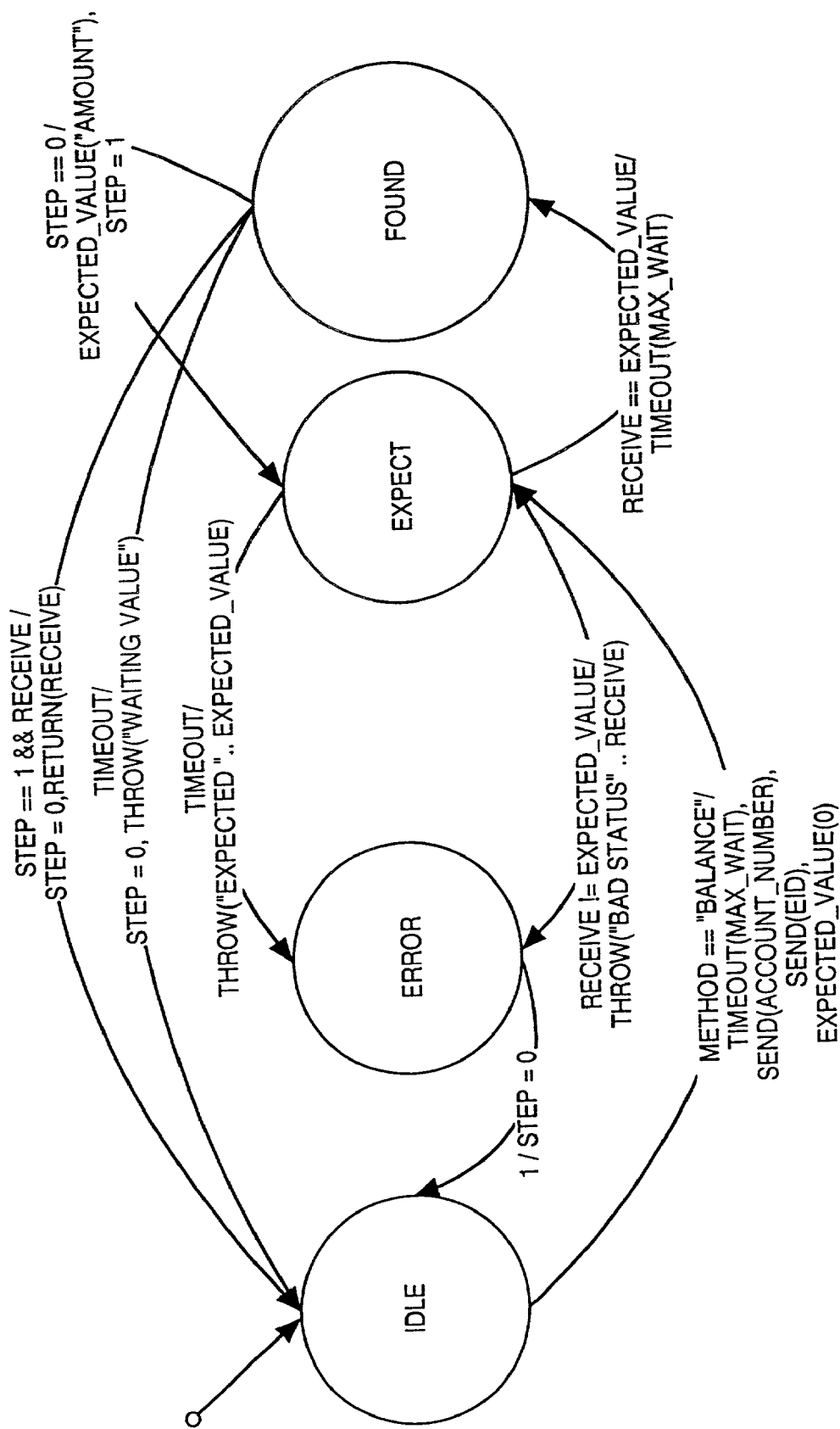
FIG. 30 conceptually illustrates an exemplary Distributed Online Service Information Base (DOLSIB) FSM diagram for another bank, according to one embodiment.

FIG. 30 conceptually illustrates an exemplary DOLSIB FSM diagram for balance for bank B2, according to one embodiment. The diagram produces a different "name-value" pair protocol. DOLSIB EISM language corresponding to the diagram may be as follows:

```
diagram Balance;
// two steps:
// 1) wait for status.
// 2) wait for "balance".
var step = 1;
Balance(Idle) {
  Error : true ? step = 1 -> Idle;
  Idle
        : method == "balance"?
            timeout(max_wait),
            send("account_number")
            send(eid),
            expected_value = 0
        -> Expect;
  Found
        : step == 1 ?
            expected_value = "balance",
            step = 1
        -> Expect
        | step == 2 && receive ?
            return(receive),
            step = 1
        -> Idle
        | timeout?
            throw("timeout while waiting balance"),
        -> Error;
}
```

Accordingly, the two bank examples illustrate how different service providers having different back-ends enterprise interactions may use the same business or management object.

The bank object class structure has been shown and described elsewhere. However, since this may be derived off of the CoreBusinessObject or Management Object the BankAccount object may need an object router definition. An exemplary definition assuming balance, withdraw and deposit methods is as follows:

beginclass BankAccount CoreBusinessObject
begindata
enddata
beginmethod
method const int balance
method void deposit {int amount}
method void withdraw {int amount}
endmethod
endclass Hooks may be added to provide method connections to the FSM for this business object:

```
int BankAccountSkel::balance( ) const {
    fsm_event("balance","");
    RWCString result = fsm_result( );
    return atoi(result);
}
```

The balance method calls the FSM event "balance" which starts the diagram transition from Idle to Expect (see FIG. 29). Typically, since results in the FSM are performed using strings, the string return type will be converted to an integer.

```
void BankAccountSkel::withdraw(int amount) {
    char a[20];
    sprintf(a,"%d",amount);
    fsm_event("withdraw",a);
    fsm_result();
}
void BankAccountSkel::deposit(int amount) {
    char a[20];
    sprintf(a,"%d",amount);
    fsm_event("deposit",a);
    fsm_result();
}
```

These examples show that the method fsm_result( ) is called even when not expecting a result. The reason for this is twofold: (1) the thread will block until result is actually called inside of the FSM, and (2) an error result will throw an exception within this fsm_result.

Figure 31:
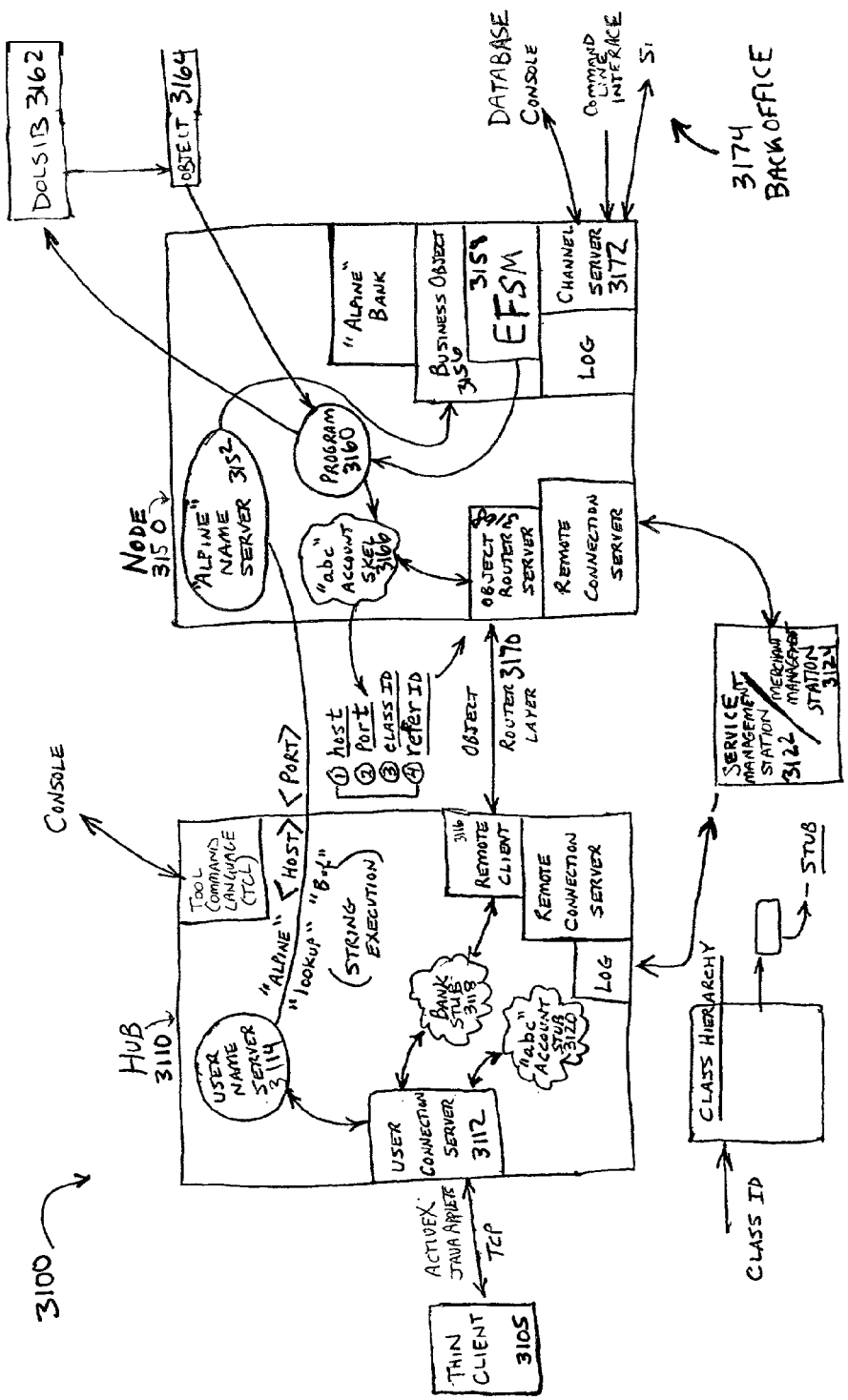
FIG. 31 conceptually illustrates operation of a hub and node service control system, according to one embodiment.

FIG. 31 conceptually illustrates operation of a system 3100 including a thin client, a hub, and node, according to one embodiment. A thin client 3102 (e.g., a client access device) accesses a hub 3110. The hub 3110 includes a user connection server 3112 that connects with a user name server 3114. The user name server 3114 connects with a specified node, in this case node 3150 corresponding to "Alpine" bank. In particular, the connection may include the hub 3110 communicating qualifying identifiers (e.g., <host>, <port>) to the node 3150.

The node 3150 includes a name server 3152 that after connection accesses a business object 3156. The business object 3156 includes an EFSM 3158 to access a DOLSIB 3162 via a program 3160. The DOLSIB 3162 allows identification of an object 3164. The program 3160 then is able to determine an appropriate "abc" account skeleton object 3166. Based on the qualifiers an object router server 3168 communicates via an object router layer 3170 with a remote client 3116 that uses a bank stub object 3118 to perform remote method execution of bank methods of the node 3150. In particular, an "abc" account stub 3120 may allow determination of an account balance including using a channel server 3172 to interface with a back office 3174. A service management station 3122 and a merchant management station 3124 may perform Events, Configuration, Accounting, Performance, and Security (ECAPS) processing for the hub and the node, respectively.

Figure 32:
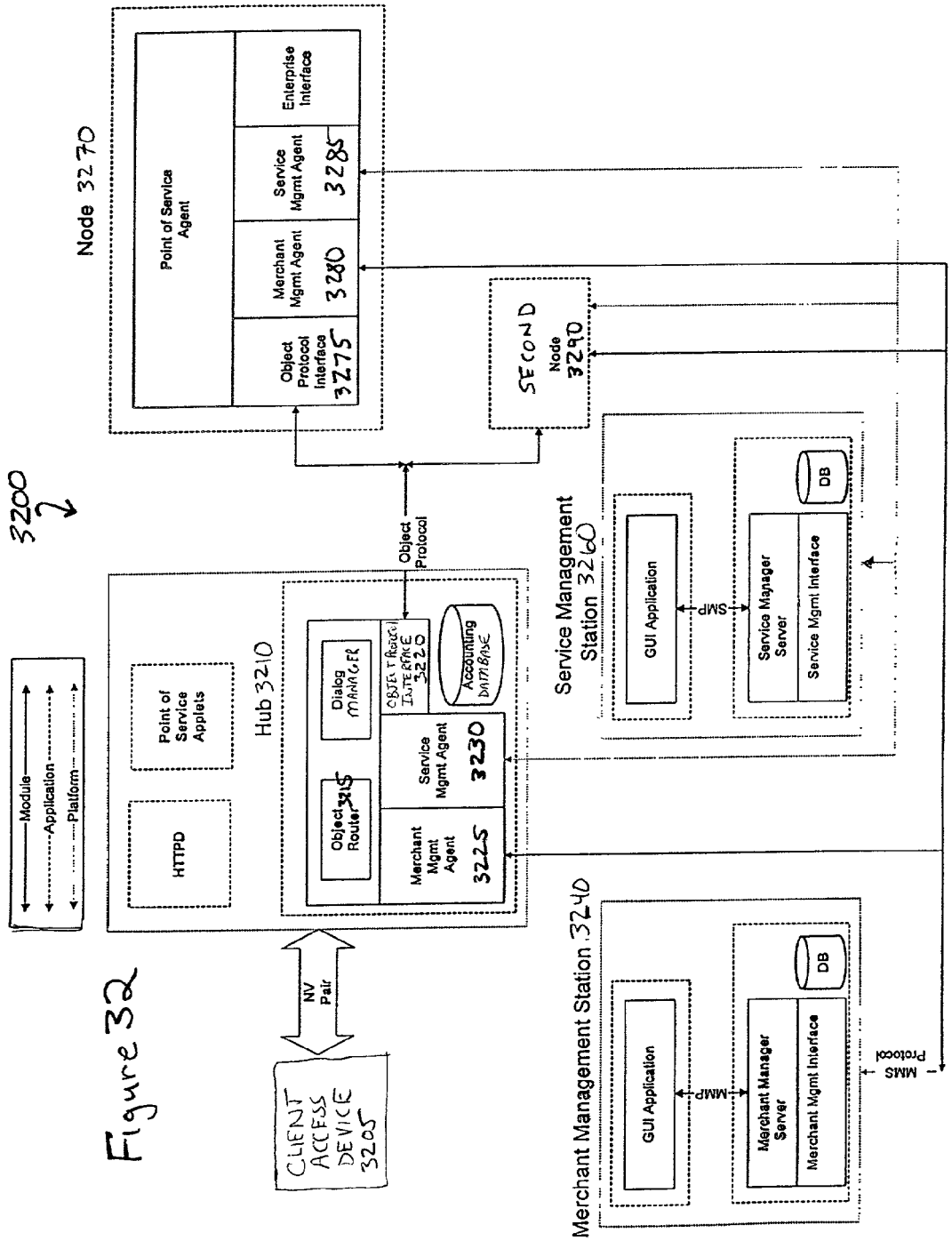
FIG. 32 conceptually illustrates an architecture, according to one embodiment, to manage a hub and node system.

FIG. 32 conceptually illustrates architecture 3200, according to one embodiment to provide management services, such as ECAPS services, to hub and a node. A client access device 3205 accesses a hub 3210 via a connection 3215 that may support a name-value pair. As shown, the hub 3210 may include a number of modules including an object router 3215 and an object protocol interface 3220 to perform object routing, and a merchant management agent 3225 and a service management agent 3230 to respectively correspond with a merchant management station 3240 and a service management station 3260.

A node 3270 may also comprise a number of components as shown, and as discussed elsewhere in the detailed discussion, including an object protocol interface 3275 to assist with object routing, and a merchant management agent 3280 and a service management agent 3285 to respectively interface with the merchant management station 3240 and the service management station 3260. Another node 3290 may be similarly connected with the stations 3240 and 3260 to support management that is desired for the intended application (e.g., ECAPS).

Exemplary Computer Architecture

As discussed herein, a "system" or "computer system", such as certain client access devices and a system to control a transaction involving multiple service providers, may be an apparatus including hardware and/or software for processing data. The system may include, but is not limited to, a computer (e.g., portable, laptop, desktop, server, mainframe, etc.), hard copy equipment (e.g., optical disk burner, printer, plotter, fax machine, etc.), and the like.

Figure 33:
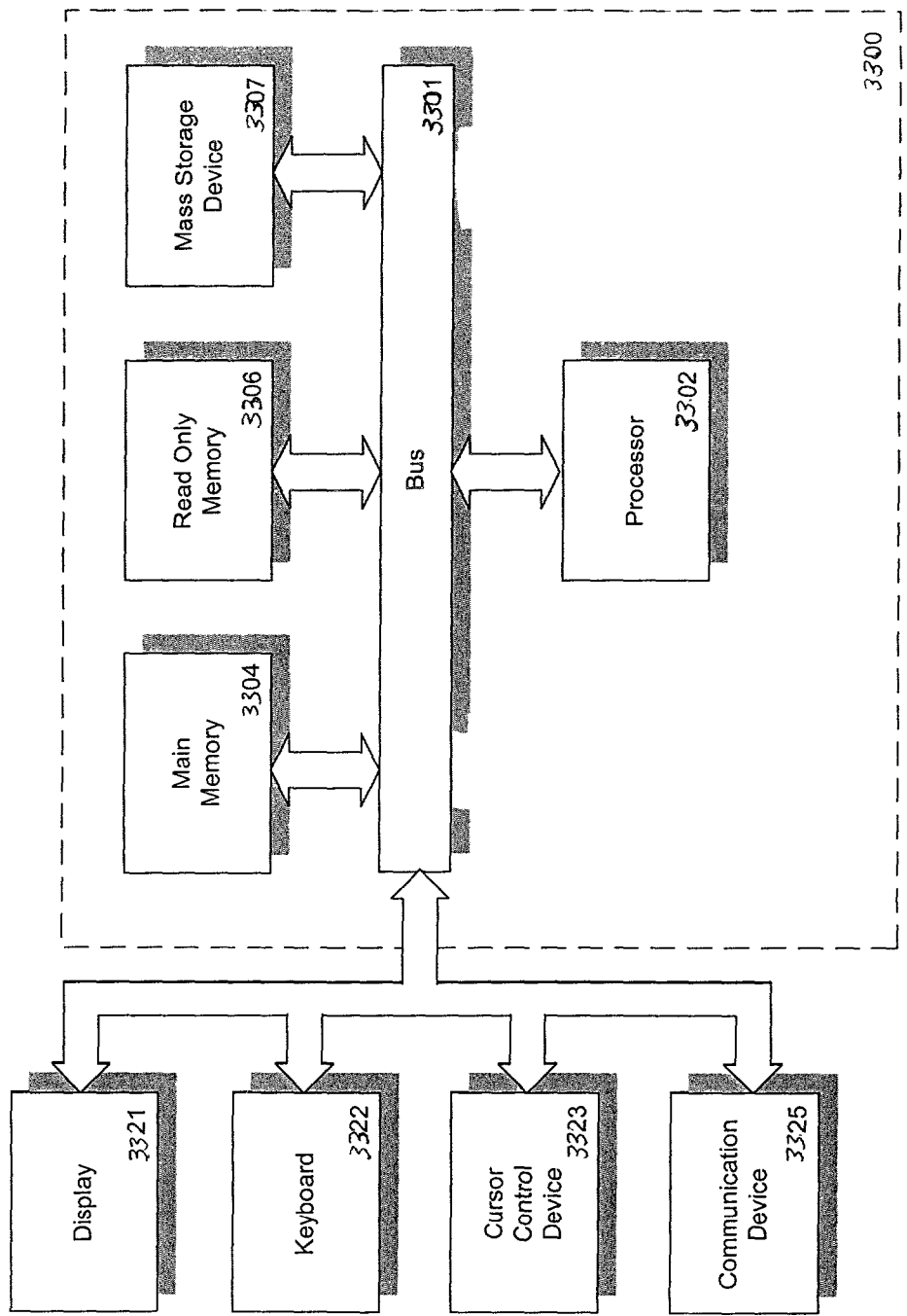
FIG. 33 is a block diagram of a computer system upon which one embodiment may be implemented.

A computer system 3300 representing an exemplary workstation, host, or server in which features of the present invention may be implemented will now be described with reference to FIG. 33. The computer system 3300 represents one possible computer system for implementing embodiments of the present invention, however other computer systems and variations of the computer system 3300 are also possible. The computer system 3300 comprises a bus or other communication means 3301 for communicating information, and a processing means such as processor 3302 coupled with the bus 3301 for processing information. The computer system 3300 further comprises a random access memory (AM) or other dynamic storage device 3304 (referred to as main memory), coupled to the bus 3301 for storing information and instructions to be executed by the processor 3302. The main memory 3304 also may be used for storing temporary variables or other intermediate information during execution of instructions by the processor 3302. In one embodiment, the main memory 3304 may be used for storing the operating system, software objects, data structures, coded instructions, rule sets, and other types of data. The computer system 3300 also comprises a read only memory (ROM) and other static storage devices 3306 coupled to the bus 3301 for storing static information and instructions for the processor 3302, such as the BIOS. A data storage device 3307 such as a magnetic disk, zip, or optical disc and its corresponding drive may also be coupled to the computer system 3300 for storing information and instructions.

The computer system 3300 may also be coupled via the bus 3301 to a display device 3321, such as a cathode ray tube (CRT) or Liquid Crystal Display (LCD), for displaying information to an end user. Typically, a data input device 3322, such as a keyboard or other alphanumeric input device including alphanumeric and other keys, may be coupled to the bus 3301 for communicating information and command selections to the processor 3302. Another type of user input device is a cursor control device 3323, such as a mouse, a trackball, or cursor direction keys for communicating direction information and command selections to the processor 3302 and for controlling cursor movement on the display 3321.

A communication device 3325 is also coupled to the bus 3301. Depending upon the particular implementation, the communication device 3325 may include a modem, a network interface card, or other well-known interface devices, such as those used for coupling to Ethernet, token ring, or other types of physical attachment for purposes of providing a communication link to support a local or wide area network, for example. In any event, in this manner, the computer system 3300 may be coupled to a number of clients or servers via a conventional network infrastructure, such as a company's intranet, an extranet, or the Internet, for example.

Embodiments of the invention are not limited to any particular computer system or environment. Rather, embodiments may be used on any stand alone, distributed, networked, or other type of computer system. For example, embodiments may be used on one or more computers compatible with NT, Linux, Windows, Windows NT, Macintosh, any variation of Unix, or others. Embodiments may support ActiveX Controls, Java, web browsers such as Internet Explorer, and standard Web server suites such as Netscapes' SuiteSpot, FastTrack, Microsoft's Normandy, Microsoft's Commercial Internet System, and others.

The present invention includes various operations, as described above. The operations of the present invention may be performed by hardware components or may be embodied in machine-executable instructions, which may be used to cause a general-purpose or special-purpose processor or logic circuits programmed with the instructions to perform the operations. The present invention may be provided as a computer-program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection). Alternatively, the operations may be performed by a combination of hardware and software.

In conclusion, the present invention provides an approach for controlling a network transaction involving multiple service providers.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A real-time on-line two-way transaction system, the system comprising:
    a first server comprising memory and a processor;
    a context manager executing on the first server supporting a first web page on the World Wide Web, the context manager allowing access by a user from a multi-media device through a Web application to a plurality of possible Web transactions from a plurality of Web merchants;
    a user transaction manager in the Web application allowing the user to enter into a first transaction using a second web page;
    an account settling manager in the Web application allowing the user to communicate with a payment program running on a second server remote from the first server, wherein the user can settle an account relating to the first transaction;
    a switching component in the Web application that temporarily switches the user from the first server to the second server to allow settling of the account, wherein the user directly communicates with the payment program on the second server via an object router, the object router allowing the user to perform a real-time transaction from the Web application with at least one of the Web merchants while providing interaction and management between the first and second servers.

2. The system of claim 1, wherein the switching component in the Web application switches the user back from the second server to the first server when the account is settled.

3. The system of claim 1, wherein the context manager also provides web advertising.

4. The system of claim 1, further comprising a routine in the Web application that redirects a user to a web page supported by a Web merchant running on a third server that offers additional possible Web transactions not visible on a web page on the first server.

5. The system of claim 1, further comprising a component in the Web application that monitors statistics and provides information about a Web merchant based on past Web transactions from at least one Web application by that Web merchant.

6. The system of claim 1, further comprising a component in the Web application that monitors statistics and provides information about a user based on past Web transactions from at least one Web application by that user.

7. The system of claim 1, wherein the user transaction manager allows the user to enter into a second Web transaction from at least one Web application on a third web page, and wherein the user simultaneously settles the account for both the first and second Web transactions from at least one Web application.

8. The system of claim 1, further comprising a merchandise manager in a Web application tracking a particular category of merchandise for a particular Web user, the merchandise manager sending a message to a Web user when the particular category of merchandise is available.

9. The system of claim 1, wherein the second web page contains a link to at least one other web page.

10. A computer implemented method of permitting a real-time, online transaction by a user with at least one computing device on the World Wide Web, the method comprising:
    presenting a first web page from a first server allowing a user to choose a Web transaction from a plurality of possible Web transactions;
    presenting a second web page allowing the user to display the second web page on the computing device and to interactively enter into the Web transaction with a particular Web merchant;
    switching the user transacting from a Web application on the first server to a payment server remote from the first server allowing the user to interactively settle the Web transaction in real-time, wherein the user directly communicates from a user device to the payment server; and
    allowing the user to perform the Web transaction from the Web application via an object router with the Web merchant, while providing interaction and management between the first server and the payment server.

11. The method of claim 10, further comprising switching the user from a Web application back from the payment server to the first server when the Web transaction is settled.

12. The method of claim 10, further comprising presenting a second web page allowing the user to interactively enter into a second Web transaction with a different particular Web merchant, and wherein the user interactively and simultaneously settles both Web transactions from at least one Web application.

13. The method of claim 10, further comprising notifying a Web user performing a Web transaction from a Web application when a particular item of merchandise is available.

14. The method of claim 10, wherein the second web page contains a link to at least one other web page.

15. The method of claim 10, wherein the first web page contains a link to at least one other web page.

16. A system for purchasing a vehicle on the World Wide Web, the system comprising:
- a first server comprising memory and a processor;
- a transaction manager system in a Web application running on the first server presenting a first web page on the World Wide Web allowing a buyer to choose a category of vehicle;
- a merchandise presentation system in the Web application for presenting a plurality of vehicles for sale in the category on a second web page;
- a switching component in the Web application providing content to the buyer from a financing service, the content being located on a server remote from the first server, the switching component in the Web application routing a quote from the financing service to the buyer in real-time, the buyer directly communicating from a user device to the financing service;
- a sales component in the Web application allowing the buyer to purchase the particular vehicle from the seller and obtain financing from the financing service in a real-time transaction; and
- a communications component that includes an object router allowing the buyer to perform the real-time transaction from the Web application, while providing interaction and management between the first server and the remote server.

17. The system of claim 16, wherein the financing service from a Web application provides real-time online approval over a service network atop the Web for the financing.

18. The system of claim 16, wherein the switching component in a Web application provides the financing service with information concerning the buyer.

19. The system of claim 16, further comprising a component in the Web application that monitors statistics and provides information about a Web merchant based on past Web transactions from at least one Web application by that Web merchant.

20. The system of claim 16, further comprising a component in a Web application that monitors statistics and provides information about a user based on past Web transactions from at least one Web application by that user.

21. The system of claim 16, wherein the third web page contains a link to at least one other web page.

22. A system for creating an online Web merchant, the system comprising:
- a first server comprising memory and a processor;
- a content manager running on the first web server presenting a web page on the World Wide Web and allowing a user to choose a category of services in a Web application on the web page from a plurality of categories, the content manager also allowing a Web merchant to present a plurality of merchandise selections on a Web merchant web page, wherein the merchandise selections belong to at least one of said categories, the content manager also allowing a user to select one of the categories and switching the user to the merchant web page upon selection of a particular category from the Web application;
- a transaction manager in the Web application allowing the user to enter into a real-time Web transaction with the Web merchant with respect to a first particular piece of merchandise, wherein the transaction manager switches the user to content from a web page provided by a transaction settlement service running on a second server remote from the first server, wherein the user can settle the Web transaction in real-time, and wherein the user directly communicates from a user device to the transaction settlement service; and
- an object router module that allows the user to perform the real-time Web transaction from the Web application with the Web merchant, while providing interaction and management between the first server and the second server.

23. The system of claim 22, further comprising a module in the Web application providing information concerning the Web merchant to the Web user.

24. The system of claim 22, further comprising a module in the Web application providing information concerning the Web user to the Web merchant.

25. The system of claim 22, wherein an advertisement is placed on the first web page.

26. The system of claim 22, wherein an advertisement is placed on the Web merchant web page.

27. The system of claim 22, wherein the transaction manager switches the Web user from a Web transaction from a Web application on a web page for a single product to the Web merchant web page.

28. The system of claim 22, wherein the first web page contains a link to the Web merchant web page.

29. The system of claim 22, wherein the content manager allows the user to select a second category of merchandise and the transaction manager allows the user to enter into a real-time Web transaction from a Web application for a second particular piece of merchandise different from the first particular piece of merchandise, and wherein the settlement service allows the user to simultaneously settle an account for both the first and second particular piece of merchandise.

30. The system of claim 22, further comprising a merchandise manager in a Web application for tracking a particular category of merchandise for a particular Web user, the merchandise manager sending a message to a Web user when the particular category of merchandise is available.

31. A real-time online, two-way transaction system, operating on the World Wide Web, the system comprising:
- a first server comprising memory and a processor;
- a content manager executing on the first server supporting a first web page on the World Wide Web, the content manager in a Web application on a web page allowing access by a user to a plurality of possible Web transactions from a plurality of Web merchants;
- a user transaction manager allowing the user to enter into a first real-time Web transaction using a second web page, the user transaction manager in the Web application also allowing the user to enter into a second real-time Web transaction using a third web page;
- an account settling manager in the Web application allowing the user to communicate with a payment program running on a second server remote from the first server, wherein the user can settle an account relating to the first Web transaction and the second Web transaction simultaneously;
- a switching component in the Web application that temporarily switches the user from the first server to the second server to allow settling of the account in real-time, wherein the user communicates directly from a user device to the payment program; and
- an object router module allowing the user to perform the real-time Web transactions from the Web application with at least one of the Web merchants while providing interaction and management between the first server and the second server.

32. The system of claim 31, wherein the switching component in the Web application switches the user back from the second server to the first server when the account is settled.

33. The system of claim 31, wherein the content manager in the Web application also provides web advertising.

34. The system of claim 31, further comprising a routine in the Web application that redirects a user to a web page supported by a Web merchant running on a third server that offers additional possible Web transactions not visible on a web page on the first server.

35. The system of claim 31, further comprising a component in a Web application that monitors statistics and provides information about a Web merchant based on past Web transactions from at least one Web application by that Web merchant.

36. The system of claim 31, further comprising a component in a Web application that monitors statistics and provides information about a Web user based on past Web transactions from at least one Web application by that Web user.

37. The system of claim 31, further comprising a module in the Web application allowing the Web user to receive information concerning the Web merchant.

38. The system of claim 31, further comprising a module in the Web application allowing the Web merchant to receive information concerning the Web user.

39. The system of claim 31, further comprising a merchandise manager in a Web application tracking a particular category of merchandise for a particular Web user, the merchandise manager sending a message to a Web user when the particular category of merchandise is available.

40. The system of claim 31, wherein either the second or third web page contains a link to some other web page.

* * * * *